(12) United States Patent
Sanches et al.

(10) Patent No.: US 10,324,609 B2
(45) Date of Patent: Jun. 18, 2019

(54) SYSTEM FOR PROVIDING DYNAMIC LINKED PANELS IN USER INTERFACE

(71) Applicant: Palantir Technologies Inc., Palo Alto, CA (US)

(72) Inventors: Jacob Sanches, San Francisco, CA (US); Noah Chen, New York City, NY (US); Calvin Fernandez, New York City, NY (US); Stephanie Yu, New York City, NY (US); Sixin Li, New York, NY (US); Geoff Cameron, New York, NY (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 25 days.

(21) Appl. No.: 15/250,678

(22) Filed: Aug. 29, 2016

(65) Prior Publication Data

US 2018/0024731 A1 Jan. 25, 2018

Related U.S. Application Data

(60) Provisional application No. 62/365,169, filed on Jul. 21, 2016.

(51) Int. Cl.
*G06F 3/0484* (2013.01)
*G06F 3/0481* (2013.01)
(Continued)

(52) U.S. Cl.
CPC ...... *G06F 3/04847* (2013.01); *G06F 3/04817* (2013.01); *G06F 8/38* (2013.01);
(Continued)

(58) Field of Classification Search
CPC ............ G06F 3/04847; G06F 3/04817; G06F 17/30554; G06F 17/30572; G06F 17/30643
See application file for complete search history.

(56) References Cited

U.S. PATENT DOCUMENTS 4,881,179 A 11/1989 Vincent
5,109,399 A 4/1992 Thompson
(Continued)

FOREIGN PATENT DOCUMENTS

AU 2013251186 11/2015
CN 102054015 5/2014
(Continued)

OTHER PUBLICATIONS

Harvey, "Excel 2010 All-in-One for Dummies," 2010, Wiley Publishing, Inc.*
(Continued)

*Primary Examiner* — Ryan Barrett
(74) *Attorney, Agent, or Firm* — Knobbe Martens Olson & Bear LLP

(57) ABSTRACT

A system is configured to provide a dashboard creation system. Panels associated with queries for retrieving information from a database are shown in a user interface. Various other user interfaces show query code, panel display settings, function code, dependencies, etc. The dependencies can be extracted and used to provide autocomplete and partial refreshing. A timing table shows execution times. Panel outputs and code updates can be shown and compared.

16 Claims, 37 Drawing Sheets

(51) Int. Cl.
*G06F 16/26* (2019.01)
*G06F 16/248* (2019.01)
*G06F 8/38* (2018.01)
*G06F 9/445* (2018.01)

(52) U.S. Cl.
CPC ............ *G06F 16/248* (2019.01); *G06F 16/26* (2019.01); *G06F 9/44505* (2013.01); *G06F 2203/04803* (2013.01)

(56) References Cited

U.S. PATENT DOCUMENTS

| | | |
|---|---|---|
| 5,241,625 A | 8/1993 | Epard et al. |
| 5,329,108 A | 7/1994 | Lamoure |
| 5,632,009 A | 5/1997 | Rao et al. |
| 5,670,987 A | 9/1997 | Doi et al. |
| 5,781,704 A | 7/1998 | Rossmo |
| 5,798,769 A | 8/1998 | Chiu et al. |
| 5,845,300 A | 12/1998 | Comer |
| 5,974,572 A * | 10/1999 | Weinberg ................ G06F 11/32 707/E17.116 |
| 5,999,911 A | 12/1999 | Berg et al. |
| 6,025,844 A * | 2/2000 | Parsons ................ G06F 3/0481 707/E17.013 |
| 6,057,757 A | 5/2000 | Arrowsmith et al. |
| 6,065,026 A | 5/2000 | Cornelia et al. |
| 6,091,956 A | 7/2000 | Hollenberg |
| 6,101,479 A | 8/2000 | Shaw |
| 6,161,098 A | 12/2000 | Wallman |
| 6,219,053 B1 | 4/2001 | Tachibana et al. |
| 6,232,971 B1 | 5/2001 | Haynes |
| 6,237,138 B1 | 5/2001 | Hameluck et al. |
| 6,243,706 B1 | 6/2001 | Moreau et al. |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,370,538 B1 | 4/2002 | Lamping et al. |
| 6,430,305 B1 | 8/2002 | Decker |
| 6,456,997 B1 | 9/2002 | Shukla |
| 6,523,019 B1 | 2/2003 | Borthwick |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,665,683 B1 | 12/2003 | Meltzer |
| 6,674,434 B1 | 1/2004 | Chojnacki et al. |
| 6,714,936 B1 | 3/2004 | Nevin, III |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,850,317 B2 | 2/2005 | Mullins et al. |
| 6,877,137 B1 | 4/2005 | Rivette et al. |
| 6,944,777 B1 | 9/2005 | Belani et al. |
| 6,944,821 B1 | 9/2005 | Bates et al. |
| 6,967,589 B1 | 11/2005 | Peters |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,065,714 B1 * | 6/2006 | Theel ................ G06F 17/30572 715/781 |
| 7,086,028 B1 | 8/2006 | Davis et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B1 | 1/2007 | Bertram |
| 7,171,427 B2 | 1/2007 | Witowski et al. |
| 7,174,377 B2 | 2/2007 | Bernard et al. |
| 7,188,317 B1 * | 3/2007 | Hazel ................ G06F 9/4443 715/804 |
| 7,194,680 B1 | 3/2007 | Roy et al. |
| 7,213,030 B1 | 5/2007 | Jenkins |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,392,254 B1 | 6/2008 | Jenkins |
| 7,426,654 B2 | 9/2008 | Adams et al. |
| 7,441,182 B2 | 10/2008 | Beilinson et al. |
| 7,441,219 B2 | 10/2008 | Perry et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,558,677 B2 | 6/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,716,140 B1 | 5/2010 | Nielsen et al. |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,765,489 B1 | 7/2010 | Shah |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,870,493 B2 | 1/2011 | Pall et al. |
| 7,877,421 B2 | 1/2011 | Berger et al. |
| 7,880,921 B2 | 2/2011 | Dattilo et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,336 B1 | 5/2011 | Robin-Jan |
| 7,958,147 B1 | 6/2011 | Turner et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,966,199 B1 | 6/2011 | Frasher |
| 7,970,240 B1 | 6/2011 | Chao et al. |
| 7,971,150 B2 | 6/2011 | Raskutti et al. |
| 7,984,374 B2 | 6/2011 | Caro et al. |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,073,857 B2 | 12/2011 | Sreekanth |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,191,005 B2 | 5/2012 | Baier et al. |
| 8,214,361 B1 | 7/2012 | Sandler et al. |
| 8,214,764 B2 | 7/2012 | Gemmell et al. |

(56) References Cited

U.S. PATENT DOCUMENTS

| | | |
|---|---|---|
| 8,225,201 B2 | 7/2012 | Michael |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,392,556 B2 | 3/2013 | Goulet et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,527,949 B1 | 9/2013 | Pleis et al. |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,682,696 B1 | 3/2014 | Shanmugam |
| 8,688,573 B1 | 4/2014 | Ruknoic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,732,574 B2 | 5/2014 | Burr et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,313 B2 | 8/2014 | Satlow |
| 8,799,799 B1 | 8/2014 | Cervelli et al. |
| 8,807,948 B2 | 8/2014 | Luo et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,930,874 B2 | 1/2015 | Duff et al. |
| 8,937,619 B2 | 1/2015 | Sharma et al. |
| 8,938,686 B1 | 1/2015 | Erenrich et al. |
| 8,984,390 B2 | 3/2015 | Aymeloglu et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,058,315 B2 | 6/2015 | Burr et al. |
| 9,116,975 B2 | 8/2015 | Shankar et al. |
| 9,165,100 B2 | 10/2015 | Begur et al. |
| 9,286,373 B2 | 3/2016 | Elliot et al. |
| 9,348,880 B1 | 5/2016 | Kramer et al. |
| 9,454,281 B2 | 9/2016 | Ward et al. |
| 10,157,200 B2 * | 12/2018 | Elliot .................. G06F 16/2423 |
| 2001/0021936 A1 | 9/2001 | Bertram |
| 2002/0032677 A1 | 3/2002 | Morgenthaler et al. |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0130907 A1 | 9/2002 | Chi et al. |
| 2002/0174201 A1 | 11/2002 | Ramer et al. |
| 2002/0194119 A1 | 12/2002 | Wright et al. |
| 2002/0196229 A1 | 12/2002 | Chen et al. |
| 2003/0028560 A1 | 2/2003 | Kudrolli et al. |
| 2003/0036927 A1 | 2/2003 | Bowen |
| 2003/0039948 A1 | 2/2003 | Donahue |
| 2003/0061132 A1 | 3/2003 | Mason et al. |
| 2003/0093755 A1 | 5/2003 | O'Carroll |
| 2003/0126102 A1 | 7/2003 | Borthwick |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0044648 A1 | 3/2004 | Anfindsen et al. |
| 2004/0064256 A1 | 4/2004 | Barinek et al. |
| 2004/0078451 A1 | 4/2004 | Dietz et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0163039 A1 | 8/2004 | McPherson et al. |
| 2004/0181554 A1 | 9/2004 | Heckerman et al. |
| 2004/0193600 A1 | 9/2004 | Kaasten et al. |
| 2004/0205492 A1 | 10/2004 | Newsome |
| 2004/0221223 A1 | 11/2004 | Yu et al. |
| 2004/0236688 A1 | 11/2004 | Bozeman |
| 2004/0236711 A1 | 11/2004 | Nixon et al. |
| 2004/0243555 A1 * | 12/2004 | Bolsius ............. G06F 17/30471 |
| 2004/0260702 A1 | 12/2004 | Cragun et al. |
| 2004/0267746 A1 | 12/2004 | Marcjan et al. |
| 2005/0004911 A1 * | 1/2005 | Goldberg .......... G06F 17/30398 |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039116 A1 | 2/2005 | Slack-Smith |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0091186 A1 | 4/2005 | Elish |
| 2005/0125715 A1 | 6/2005 | Franco et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0053097 A1 | 3/2006 | King et al. |
| 2006/0053170 A1 | 3/2006 | Hill et al. |
| 2006/0059139 A1 | 3/2006 | Robinson |
| 2006/0059423 A1 | 3/2006 | Lehmann et al. |
| 2006/0074866 A1 | 4/2006 | Chamberlain et al. |
| 2006/0074881 A1 | 4/2006 | Vembu et al. |

(56) References Cited

U.S. PATENT DOCUMENTS

| | | |
|---|---|---|
| 2006/0080139 A1 | 4/2006 | Mainzer |
| 2006/0080619 A1 | 4/2006 | Carlson et al. |
| 2006/0093222 A1 | 5/2006 | Saffer et al. |
| 2006/0106847 A1* | 5/2006 | Eckardt, III ...... G06F 17/30696 |
| 2006/0129746 A1 | 6/2006 | Porter |
| 2006/0136513 A1 | 6/2006 | Ngo et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0149596 A1 | 7/2006 | Surpin et al. |
| 2006/0155654 A1 | 7/2006 | Plessis et al. |
| 2006/0178915 A1 | 8/2006 | Chao |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader et al. |
| 2006/0242630 A1 | 10/2006 | Koike et al. |
| 2006/0265417 A1 | 11/2006 | Amato et al. |
| 2006/0271277 A1 | 11/2006 | Hu et al. |
| 2006/0277460 A1 | 12/2006 | Forstall et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0016363 A1 | 1/2007 | Huang et al. |
| 2007/0018986 A1 | 1/2007 | Hauser |
| 2007/0028142 A1* | 2/2007 | Elsner ................. H04L 43/045 714/25 |
| 2007/0038646 A1 | 2/2007 | Thota |
| 2007/0038962 A1 | 2/2007 | Fuchs et al. |
| 2007/0043686 A1 | 2/2007 | Teng et al. |
| 2007/0057966 A1 | 3/2007 | Ohno et al. |
| 2007/0061752 A1 | 3/2007 | Cory |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0113164 A1 | 5/2007 | Hansen et al. |
| 2007/0136095 A1 | 6/2007 | Weinstein |
| 2007/0150369 A1 | 6/2007 | Zivin |
| 2007/0168871 A1 | 7/2007 | Jenkins |
| 2007/0174760 A1 | 7/2007 | Chamberlain et al. |
| 2007/0185850 A1 | 8/2007 | Walters et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0245339 A1 | 10/2007 | Bauman et al. |
| 2007/0266336 A1 | 11/2007 | Nojima et al. |
| 2007/0284433 A1 | 12/2007 | Domenica et al. |
| 2007/0294643 A1 | 12/2007 | Kyle |
| 2007/0299697 A1 | 12/2007 | Friedlander et al. |
| 2008/0016155 A1 | 1/2008 | Khalatian |
| 2008/0016216 A1 | 1/2008 | Worley et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0091693 A1 | 4/2008 | Murthy |
| 2008/0104019 A1 | 5/2008 | Nath |
| 2008/0109714 A1 | 5/2008 | Kumar et al. |
| 2008/0126951 A1 | 5/2008 | Sood et al. |
| 2008/0148398 A1 | 6/2008 | Mezack et al. |
| 2008/0155440 A1 | 6/2008 | Trevor et al. |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0249820 A1 | 10/2008 | Pathria |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288475 A1 | 11/2008 | Kim et al. |
| 2008/0301643 A1 | 12/2008 | Appleton et al. |
| 2008/0306711 A1* | 12/2008 | Bansal ................ G06F 11/3419 702/182 |
| 2008/0313132 A1 | 12/2008 | Hao et al. |
| 2008/0313243 A1 | 12/2008 | Poston et al. |
| 2009/0002492 A1 | 1/2009 | Velipasalar et al. |
| 2009/0024962 A1 | 1/2009 | Gotz |
| 2009/0027418 A1 | 1/2009 | Maru et al. |
| 2009/0030915 A1 | 1/2009 | Winter et al. |
| 2009/0031401 A1 | 1/2009 | Cudich et al. |
| 2009/0043801 A1 | 2/2009 | LeClair |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0089651 A1 | 4/2009 | Herberger et al. |
| 2009/0106178 A1 | 4/2009 | Chu |
| 2009/0112678 A1 | 4/2009 | Luzardo |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150868 A1 | 6/2009 | Chakra et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0199106 A1 | 8/2009 | Jonsson et al. |
| 2009/0216562 A1 | 8/2009 | Faulkner et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0313463 A1 | 12/2009 | Pang et al. |
| 2009/0319891 A1 | 12/2009 | MacKinlay |
| 2010/0004857 A1 | 1/2010 | Pereira et al. |
| 2010/0011282 A1 | 1/2010 | Dollard et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070844 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076813 A1 | 3/2010 | Ghosh et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0191563 A1 | 7/2010 | Schlaifer et al. |

(56) References Cited

U.S. PATENT DOCUMENTS

| | | |
|---|---|---|
| 2010/0198684 A1 | 8/2010 | Eraker et al. |
| 2010/0198796 A1* | 8/2010 | Beresniewicz ...... G06F 17/30961 707/688 |
| 2010/0199225 A1 | 8/2010 | Coleman et al. |
| 2010/0223260 A1 | 9/2010 | Wu |
| 2010/0228812 A1 | 9/2010 | Uomini |
| 2010/0238174 A1 | 9/2010 | Haub et al. |
| 2010/0250412 A1 | 9/2010 | Wagner |
| 2010/0262901 A1 | 10/2010 | DiSalvo |
| 2010/0280851 A1 | 11/2010 | Merkin |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0306722 A1 | 12/2010 | LeHoty et al. |
| 2010/0313119 A1 | 12/2010 | Baldwin et al. |
| 2010/0313239 A1 | 12/2010 | Chakra et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0029526 A1 | 2/2011 | Knight et al. |
| 2011/0047159 A1 | 2/2011 | Baid et al. |
| 2011/0047540 A1 | 2/2011 | Williams et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074788 A1 | 3/2011 | Regan et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce et al. |
| 2011/0099133 A1 | 4/2011 | Chang et al. |
| 2011/0107196 A1 | 5/2011 | Foster |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0161409 A1 | 6/2011 | Nair |
| 2011/0167105 A1 | 7/2011 | Ramakrishnan et al. |
| 2011/0167710 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0179048 A1 | 7/2011 | Satlow |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0225482 A1 | 9/2011 | Chan et al. |
| 2011/0238495 A1 | 9/2011 | Kang |
| 2011/0238553 A1 | 9/2011 | Raj et al. |
| 2011/0251951 A1 | 10/2011 | Kolkowtiz |
| 2011/0258158 A1 | 10/2011 | Resende et al. |
| 2011/0270705 A1 | 11/2011 | Parker |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0004894 A1 | 1/2012 | Butler |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0059853 A1 | 3/2012 | Jagota |
| 2012/0065987 A1 | 3/2012 | Farooq et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084184 A1 | 4/2012 | Raleigh |
| 2012/0106801 A1 | 5/2012 | Jackson |
| 2012/0117082 A1 | 5/2012 | Koperda et al. |
| 2012/0123989 A1 | 5/2012 | Yu et al. |
| 2012/0131512 A1 | 5/2012 | Takeuchi et al. |
| 2012/0137235 A1 | 5/2012 | Ts et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173985 A1 | 7/2012 | Peppel |
| 2012/0180002 A1 | 7/2012 | Campbell et al. |
| 2012/0188252 A1 | 7/2012 | Law |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0197657 A1 | 8/2012 | Prodanovic |
| 2012/0197660 A1 | 8/2012 | Prodanovic |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226590 A1 | 9/2012 | Love et al. |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0284345 A1 | 11/2012 | Costenaro et al. |
| 2012/0284670 A1 | 11/2012 | Kashik et al. |
| 2012/0290879 A1 | 11/2012 | Shibuya et al. |
| 2012/0296907 A1 | 11/2012 | Long et al. |
| 2012/0304244 A1 | 11/2012 | Xie et al. |
| 2012/0311684 A1 | 12/2012 | Paulsen et al. |
| 2012/0323829 A1 | 12/2012 | Stokes et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0055264 A1 | 2/2013 | Burr et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0097482 A1 | 4/2013 | Marantz et al. |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0124567 A1 | 5/2013 | Balinsky et al. |
| 2013/0101159 A1 | 6/2013 | Rosen |
| 2013/0150004 A1 | 6/2013 | Rosen |
| 2013/0151148 A1 | 6/2013 | Parundekar et al. |
| 2013/0151305 A1 | 6/2013 | Akinola et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0187922 A1* | 7/2013 | Sexton .................. G06T 11/206 345/440 |
| 2013/0224696 A1 | 8/2013 | Wolfe et al. |
| 2013/0225212 A1 | 8/2013 | Khan |

(56) References Cited

U.S. PATENT DOCUMENTS

| | | |
|---|---|---|
| 2013/0226318 A1 | 8/2013 | Procyk |
| 2013/0226953 A1 | 8/2013 | Markovich et al. |
| 2013/0232045 A1 | 9/2013 | Tai |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0288719 A1 | 10/2013 | Alonzo |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0311375 A1 | 11/2013 | Priebatsch |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0089339 A1 | 3/2014 | Siddiqui et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129261 A1 | 5/2014 | Bothwell et al. |
| 2014/0129936 A1 | 5/2014 | Richards et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0208281 A1 | 7/2014 | Ming |
| 2014/0214579 A1 | 7/2014 | Shen et al. |
| 2014/0222521 A1 | 8/2014 | Chait |
| 2014/0222793 A1 | 8/2014 | Sadkin et al. |
| 2014/0244284 A1 | 8/2014 | Smith |
| 2014/0244388 A1 | 8/2014 | Manouchehri et al. |
| 2014/0267294 A1 | 9/2014 | Ma |
| 2014/0267295 A1 | 9/2014 | Sharma |
| 2014/0279824 A1 | 9/2014 | Tamayo |
| 2014/0282187 A1* | 9/2014 | Mackinlay ............ G06F 3/0484 715/771 |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0358829 A1 | 12/2014 | Hurwitz |
| 2015/0019394 A1 | 1/2015 | Unser et al. |
| 2015/0026622 A1 | 1/2015 | Roaldson et al. |
| 2015/0046870 A1 | 2/2015 | Goldenberg et al. |
| 2015/0073954 A1 | 3/2015 | Braff |
| 2015/0089353 A1 | 3/2015 | Folkening |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0112998 A1* | 4/2015 | Shankar ............ G06F 17/30312 707/741 |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0186483 A1 | 7/2015 | Tappan et al. |
| 2015/0186821 A1 | 7/2015 | Wang et al. |
| 2015/0187036 A1 | 7/2015 | Wang et al. |
| 2015/0212663 A1 | 7/2015 | Papale et al. |
| 2015/0227295 A1 | 8/2015 | Meiklejohn et al. |
| 2015/0227299 A1* | 8/2015 | Pourshahid ......... G06F 3/04847 715/771 |
| 2015/0254220 A1 | 9/2015 | Burr et al. |
| 2015/0278315 A1* | 10/2015 | Baumgartner .... G06F 17/30554 715/763 |
| 2015/0302051 A1* | 10/2015 | Baumgartner ...... G06F 3/04842 707/754 |
| 2015/0309719 A1 | 10/2015 | Ma et al. |
| 2015/0317342 A1 | 11/2015 | Grossman et al. |
| 2015/0324868 A1 | 11/2015 | Kaftan et al. |
| 2016/0062555 A1 | 3/2016 | Ward et al. |
| 2016/0098176 A1 | 4/2016 | Cervelli et al. |
| 2016/0110369 A1 | 4/2016 | Cervelli et al. |
| 2016/0162519 A1 | 6/2016 | Stowe et al. |

FOREIGN PATENT DOCUMENTS

| | | |
|---|---|---|
| DE | 102014103482 | 9/2014 |
| DE | 102014215621 | 2/2015 |
| EP | 1 672 527 | 6/2006 |
| EP | 2551799 | 1/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2884439 | 6/2015 |
| EP | 2884440 | 6/2015 |
| EP | 2891992 | 7/2015 |
| EP | 2911078 | 8/2015 |
| EP | 2911100 | 8/2015 |
| EP | 2940603 | 11/2015 |
| EP | 2940609 | 11/2015 |
| EP | 2993595 | 3/2016 |
| EP | 3002691 | 4/2016 |
| EP | 3009943 | 4/2016 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 00/009529 | 2/2000 |
| WO | WO 01/025906 | 4/2001 |
| WO | WO 01/088750 | 11/2001 |
| WO | WO 02/065353 | 8/2002 |
| WO | WO 2005/104736 | 11/2005 |
| WO | WO 2007/133206 | 11/2007 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2010/030914 | 3/2010 |
| WO | WO 2012/119008 | 9/2012 |
| WO | WO 2013/010157 | 1/2013 |
| WO | WO 2013/102892 | 7/2013 |

OTHER PUBLICATIONS

Red Gate, "SQL Dependency Tracker 2.5," Dec. 22, 2010, https://web.archive.org/web/20101215135515/http://www.red-gate.com/products/sql-development/sql-dependency-tracker/.*

(56) References Cited

OTHER PUBLICATIONS

Red Gate, "Analyzing change impact with SQL Dependency Tracker," Dec. 22, 2010, https://web.archive.org/web/20101222043638/http://www.red-gate.com/products/sql-development/sql-dependency-tracker/screenshots.*

Red Gate, "Understanding the diagram," May 14, 2015, https://web.archive.org/web/20150514124543/http://documentation.red-gate.com/display/SDT2/Understanding+the+diagram.*

Red Gate, "Worked example—a simple analysis," Dec. 2, 2014, https://web.archive.org/web/20141202121918/http://documentation.red-gate.com/display/SDT2/Worked+example+-++a+simple+analysis.*

Cox et al., "Step by Step Microsoft Access 2013," 2013, Microsoft Press.*

Groh, "Microsoft Access 2010 Bible," 2010, Wiley Publishing Inc.*

Sempf, "Visual Basic 2005 for Dummies," 2006, Wiley Publishing Inc.*

Simpson, "Access VBA Programming for Dummies," 2004, Wiley Publishing Inc.*

Thornber et al., "Source Navigator NG," Apr. 5, 2014, https://sourceforge.net/projects/sourcenav/files/NG4.4/.*

Thornber et al., "Include Browser," Apr. 5, 2014, https://sourceforge.net/projects/sourcenav/files/NG4.4/ (second download file "sourcenavigator-NG4.4-i686-opt.tar.bz2") /SN-NG4.4/share/snavigator/html/userguide/inclbrws.html.*

ServiceNow, "Access dependency maps," Apr. 14, 2017, https://docs.servicenow.com/bundle/geneva-it-operations-management/page/product/discovery/task/t_AccessDependencyMaps.html.*

"A First Look: Predicting Market Demand for Food Retail using a Huff Analysis," TRF Policy Solutions, Jul. 2012, pp. 30.

"A Quick Guide to UniProtKB Swiss-Prot & TrEMBL," Sep. 2011, pp. 2.

"A Word About Banks and the Laundering of Drug Money," Aug. 18, 2012, http://www.golemxiv.co.uk/2012/08/a-word-about-banks-and-the-laundering-of-drug-money/.

Abbey, Kristen, "Review of Google Docs," May 1, 2007, pp. 2.

About 80 Minutes, "Palantir in a Number of Parts—Part 6—Graph," Mar. 21, 2013, pp. 1-6.

Acklen, Laura, "Absolute Beginner's Guide to Microsoft Word 2003," Dec. 24, 2003, pp. 15-18, 34-41, 308-316.

Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.

Alur et al., "Chapter 2: IBM InfoSphere DataStage Stages," IBM InfoSphere DataStage Data Flow and Job Design, Jul. 1, 2008, pp. 35-137.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Ananiev et al., "The New Modality API," http://web.archive.org/web/20061211011958/http://java.sun.com/developer/technicalArticles/J2SE/Desktop/javase6/modality/ Jan. 21, 2006, pp. 8.

Bluttman et al., "Excel Formulas and Functions for Dummies," 2005, Wiley Publishing, Inc., pp. 280, 284-286.

Boyce, Jim, "Microsoft Outlook 2010 Inside Out," Aug. 1, 2010, retrieved from the internet https://capdtron.files.wordpress.com/2013/01/outlook-2010-inside_out.pdf.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Canese et al., "Chapter 2: PubMed: The Bibliographic Database," The NCBI Handbook, Oct. 2002, pp. 1-10.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-c553-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Conner, Nancy, "Google Apps: The Missing Manual," May 1, 2008, pp. 15.

Definition "Identify", downloaded Jan. 22, 2015, 1 page.

Definition "Overlay", downloaded Jan. 22, 2015, 1 page.

Delcher et al., "Identifying Bacterial Genes and Endosymbiont DNA with Glimmer," BioInformatics, vol. 23, No. 6, 2007, pp. 673-679.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

Ferreira et al., "A Scheme for Analyzing Electronic Payment Systems," Basil 1997.

Galliford, Miles, "SnagIt Versus Free Screen Capture Software: Critical Tools for Website Owners," http://www.subhub.com/articles/free-screen-capture-software, Mar. 27, 2008, pp. 11.

Gesher, Ari, "Palantir Screenshots in the Wild: Swing Sightings," The Palantir Blog, Sep. 11, 2007, pp. 1-12.

GIS-NET 3 Public_Department of Regional Planning. Planning & Zoning Information for Unincorporated LA County. Retrieved Oct. 2, 2013 from http://gis.planning.lacounty.gov/GIS-NET3_Public/Viewer.html.

Goswami, Gautam, "Quite Writly Seid!," One Brick at a Time, Aug. 21, 2005, pp. 7.

"GrabUp—What a Timesaver!" http://atlchris.com/191/grabup/, Aug. 11, 2008, pp. 3.

Griffith, Daniel A., "A Generalized Huff Model," Geographical Analysis, Apr. 1982, vol. 14, No. 2, pp. 135-144.

Gu et al., "Record Linkage: Current Practice and Future Directions," Jan. 15, 2004, pp. 32.

Hansen et al., "Analyzing Social Media Networks with NodeXL: Insights from a Connected World", Chapter 4, pp. 53-67 and Chapter 10, pp. 143-164, published Sep. 2010.

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.

Hibbert et al., "Prediction of Shopping Behavior Using a Huff Model Within a GIS Framework," Healthy Eating in Context, Mar. 18, 2011, pp. 16.

Hogue et al., "Thresher: Automating the Unwrapping of Semantic Content from the World Wide Web," 14th International Conference on World Wide Web, WWW 2005: Chiba, Japan, May 10-14, 2005, pp. 86-95.

Hua et al., "A Multi-attribute Data Structure with Parallel Bloom Filters for Network Services", HiPC 2006, LNCS 4297, pp. 277-288, 2006.

Huang et al., "Systematic and Integrative Analysis of Large Gene Lists Using David Bioinformatics Resources," Nature Protocols, 4.1, 2008, 44-57.

Huff et al., "Calibrating the Huff Model Using ArcGIS Business Analyst," ESRI, Sep. 2008, pp. 33.

Huff, David L., "Parameter Estimation in the Huff Model," ESRI, ArcUser, Oct.-Dec. 2003, pp. 34-36.

JetScreenshot.com, "Share Screenshots via Internet in Seconds," http://web.archive.org/web/20130807164204/http://www.jetscreenshot.com/, Aug. 7, 2013, pp. 1.

Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.

Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.

Keylines.com, "KeyLines Datasheet," Mar. 2014, http://keylines.com/wp-content/uploads/2014/03/KeyLines-datasheet.pdf downloaded May 12, 2014 in 2 pages.

(56) References Cited

OTHER PUBLICATIONS

Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Kitts, Paul, "Chapter 14: Genome Assembly and Annotation Process," The NCBI Handbook, Oct. 2002, pp. 1-21.
Kwout, http://web.archive.org/web/20080905132448/http://www.kwout.com/ Sep. 5, 2008, pp. 2.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," http://www.mozilla.org/editor/ui_specs/FileSaveDialogs.html, Jan. 20, 1999, pp. 7.
Map Builder, "Rapid Mashup Development Tool for Google and Yahoo Maps!" http://web.archive.org/web/20090626224734/http://www.mapbuilder.net/ printed Jul. 20, 2012 in 2 pages.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Microsoft Windows, "Microsoft Windows Version 2002 Print Out 2," 2002, pp. 1-6.
Microsoft, "Registering an Application to a URI Scheme," http://msdn.microsoft.com/en-us/library/aa767914.aspx, printed Apr. 4, 2009 in 4 pages.
Microsoft, "Using the Clipboard," http://msdn.microsoft.com/en-us/library/ms649016.aspx, printed Jun. 8, 2009 in 20 pages.
Mizrachi, Ilene, "Chapter 1: GenBank: The Nuckeotide Sequence Database," The NCBI Handbook, Oct. 2002, pp. 1-14.
"Money Laundering Risks and E-Gaming: A European Overview and Assessment," 2009, http://www.cf.ac.uk/socsi/resources/Levi_Final_Money_Laundering_Risks_egaming.pdf.
Nierman, "Evaluating Structural Similarity in XML Documents", 6 pages, 2002.
Nitro, "Trick: How to Capture a Screenshot As PDF, Annotate, Then Share It," http://blog.nitropdf.com/2008/03/04/trick-how-to-capture-a-screenshot-as-pdf-annotate-it-then-share/, Mar. 4, 2008, pp. 2.
Nolan et al., "MCARTA: A Malicious Code Automated Run-Time Analysis Framework," Homeland Security, 2012 IEEE Conference on Technologies for, Nov. 13, 2012, pp. 13-17.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Online Tech Tips, "Clip2Net—Share files, folders and screenshots easily," http://www.online-tech-tips.com/free-software-downloads/share-files-folders-screenshots/, Apr. 2, 2008, pp. 5.
O'Reilly.com, http://oreilly.com/digitalmedia/2006/01/01/mac-os-x-screenshot-secrets.html published Jan. 1, 2006 in 10 pages.
Palantir Technologies, "Palantir Labs_Timeline," Oct. 1, 2010, retrieved from the internet https://www.youtube.com/watch?v=JCgDW5bru9M.
Palmas et al. "An Edge-Bunding Layout for Interactive Parallel Coordinates" 2014 IEEE Pacific Visualization Symposium, pp. 57-64.
Perdisci et al., "Behavioral Clustering of HTTP-Based Malware and Signature Generation Using Malicious Network Traces," USENIX, Mar. 18, 2010, pp. 1-14.
"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf
Quest, "Toad for Oracle 11.6—Guide to Using Toad," Sep. 24, 2012, pp. 1-162.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Rouse, Margaret, "OLAP Cube," http://searchdatamanagement.techtarget.com/definition/OLAP-cube, Apr. 28, 2012, pp. 16.
Schroder, Stan, "15 Ways to Create Website Screenshots," http://mashable.com/2007/08/24/web-screenshots/, Aug. 24, 2007, pp. 2.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
SnagIt, "SnagIt 8.1.0 Print Out," Software release date Jun. 15, 2006, pp. 6.
SnagIt, "SnagIt 8.1.0 Print Out 2," Software release date Jun. 15, 2006, pp. 1-3.
SnagIt, "SnagIt Online Help Guide," http://download.techsmith.com/snagit/docs/onlinehelp/enu/snagit_help.pdf, TechSmith Corp., Version 8.1, printed Feb. 7, 2007, pp. 284.
Symantec Corporation, "E-Security Begins with Sound Security Policies," Announcement Symantec, Jun. 14, 2001.
"The FASTA Program Package," fasta-36.3.4, Mar. 25, 2011, pp. 29.
Thompson, Mick, "Getting Started with GEO," Getting Started with GEO, Jul. 26, 2011.
Umagandhi et al., "Search Query Recommendations Using Hybrid User Profile with Query Logs," International Journal of Computer Applications, vol. 80, No. 10, Oct. 1, 2013, pp. 7-18.
"Using Whois Based Geolocation and Google Maps API for Support Cybercrime Investigations," http://wseas.us/e-library/conferences/2013/Dubrovnik/TELECIRC/TELECIRC-32.pdf.
Wang et al., "Research on a Clustering Data De-Duplication Mechanism Based on Bloom Filter," IEEE 2010, 5 pages.
Warren, Christina, "TUAW Faceoff: Screenshot apps on the firing line," http://www.tuaw.com/2008/05/05/tuaw-faceoff-screenshot-apps-on-the-firing-line/, May 5, 2008, pp. 11.
Wikipedia, "Federated Database System," Sep. 7, 2013, retrieved from the internet on Jan. 27, 2015 http://en.wikipedia.org/w/index.php?title=Federated_database_system&oldid=571954221.
Wright et al., "Palantir Technologies VAST 2010 Challenge Text Records_Investigations into Arms Dealing," Oct. 29, 2010, pp. 1-10.
Yang et al., "HTML Page Analysis Based on Visual Cues", A129, pp. 859-864, 2001.
Notice of Acceptance for Australian Patent Application No. 2013251186 dated Nov. 6, 2015.
Notice of Acceptance for Australian Patent Application No. 2014250678 dated Oct. 7, 2015.

(56) References Cited

OTHER PUBLICATIONS

Notice of Allowance for U.S. Appl. No. 12/556,318 dated Apr. 11, 2016.
Notice of Allowance for U.S. Appl. No. 12/556,318 dated Nov. 2, 2015.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/148,568 dated Aug. 26, 2015.
Notice of Allowance for U.S. Appl. No. 14/192,767 dated Dec. 16, 2014.
Notice of Allowance for U.S. Appl. No. 14/192,767 dated Apr. 20, 2015.
Notice of Allowance for U.S. Appl. No. 14/225,084 dated May 4, 2015.
Notice of Allowance for U.S. Appl. No. 14/265,637 dated Feb. 13, 2015.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/326,738 dated Nov. 18, 2015.
Notice of Allowance for U.S. Appl. No. 14/473,552 dated Jul. 24, 2015.
Notice of Allowance for U.S. Appl. No. 14/473,860 dated Jan. 5, 2015.
Notice of Allowance for U.S. Appl. No. 14/486,991 dated May 1, 2015.
Notice of Allowance for U.S. Appl. No. 14/504,103 dated May 18, 2015.
Notice of Allowance for U.S. Appl. No. 14/552,336 dated Nov. 3, 2015.
Notice of Allowance for U.S. Appl. No. 14/616,080 dated Apr. 2, 2015.
Notice of Allowance for U.S. Appl. No. 14/676,621 dated Feb. 10, 2016.
Notice of Allowance for U.S. Appl. No. 14/961,481 dated May 2, 2016.
Official Communication for Australian Patent Application No. 2013251186 dated Mar. 12, 2015.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for Canadian Patent Application No. 2831660 dated Jun. 9, 2015.
Official Communication for European Patent Application No. 12181585.6 dated Sep. 4, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189344.6 dated Feb. 29, 2016.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 14199182.8 dated Mar. 13, 2015.
Official Communication for European Patent Application No. 15155845.9 dated Oct. 6, 2015.
Official Communication for European Patent Application No. 15155846.7 dated Jul. 8, 2015.
Official Communication for European Patent Application No. 15165244.3 dated Aug. 27, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15183721.8 dated Nov. 23, 2015.
Official Communication for European Patent Application No. 15188106.7 dated Feb. 3, 2016.
Official Communication for European Patent Application No. 15190307.7 dated Feb. 19, 2016.
Official Communication for Great Britain Patent Application No. 1404457.2 dated Aug. 14, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Great Britain Patent Application No. 1404499.4 dated Aug. 20, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2011729 dated Aug. 13, 2015.
Official Communication for Netherlands Patent Application No. 2012437 dated Sep. 18, 2015.
Official Communication for Netherlands Patent Application No. 2012438 dated Sep. 21, 2015.
Official Communication for Netherlands Patent Application No. 2013306 dated Apr. 24, 2015.
Official Communication for New Zealand Patent Application No. 622473 dated Jun. 19, 2014.
Official Communication for New Zealand Patent Application No. 622473 dated Mar. 27, 2014.

(56) References Cited

OTHER PUBLICATIONS

Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/556,318 dated Jul. 2, 2015.
Official Communication for U.S. Appl. No. 12/556,321 dated Feb. 25, 2016.
Official Communication for U.S. Appl. No. 12/556,321 dated Jun. 6, 2012.
Official Communication for U.S. Appl. No. 12/556,321 dated Dec. 7, 2011.
Official Communication for U.S. Appl. No. 12/556,321 dated Jul. 7, 2015.
Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/669,274 dated Aug. 26, 2015.
Official Communication for U.S. Appl. No. 13/669,274 dated May 2, 2016.
Official Communication for U.S. Appl. No. 13/669,274 dated May 6, 2015.
Official Communication for U.S. Appl. No. 13/827,491 dated Jun. 22, 2015.
Official Communication for U.S. Appl. No. 13/827,491 dated Oct. 9, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/102,394 dated Mar. 27, 2014.
Official Communication for U.S. Appl. No. 14/108,187 dated Apr. 17, 2014.
Official Communication for U.S. Appl. No. 14/108,187 dated Mar. 20, 2014.
Official Communication for U.S. Appl. No. 14/134,558 dated Oct. 7, 2015.
Official Communication for U.S. Appl. No. 14/135,289 dated Apr. 16, 2014.
Official Communication for U.S. Appl. No. 14/135,289 dated Jul. 7, 2014.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/192,767 dated Sep. 24, 2014.
Official Communication for U.S. Appl. No. 14/192,767 dated May 6, 2014.
Official Communication for U.S. Appl. No. 14/196,814 dated Aug. 13, 2014.
Official Communication for U.S. Appl. No. 14/196,814 dated May 5, 2015.
Official Communication for U.S. Appl. No. 14/222,364 dated Dec. 9, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/265,637 dated Sep. 26, 2014.
Official Communication for U.S. Appl. No. 14/268,964 dated Jul. 11, 2014.
Official Communication for U.S. Appl. No. 14/268,964 dated Sep. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,596 dated Aug. 5, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Sep. 14, 2015.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Feb. 19, 2015.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Mar. 11, 2015.

(56) References Cited

OTHER PUBLICATIONS

Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/332,306 dated May 20, 2016.
Official Communication for U.S. Appl. No. 14/473,552 dated Feb. 24, 2015.
Official Communication for U.S. Appl. No. 14/479,160 dated Apr. 20, 2016.
Official Communication for U.S. Appl. No. 14/486,991 dated Mar. 10, 2015.
Official Communication for U.S. Appl. No. 14/490,612 dated Aug. 18, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/552,336 dated Jul. 20, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/715,834 dated Apr. 13, 2016.
Official Communication for U.S. Appl. No. 14/715,834 dated Feb. 19, 2016.
Official Communication for U.S. Appl. No. 14/726,353 dated Sep. 10, 2015.
Official Communication for U.S. Appl. No. 14/741,256 dated Feb. 9, 2016.
Official Communication for U.S. Appl. No. 14/800,447 dated Dec. 10, 2015.
Official Communication for U.S. Appl. No. 14/800,447 dated Mar. 3, 2016.
Official Communication for U.S. Appl. No. 14/800,447 dated Jun. 6, 2016.
Official Communication for U.S. Appl. No. 14/813,749 dated Sep. 28, 2015.
Official Communication for U.S. Appl. No. 14/841,338 dated Feb. 18, 2016.
Official Communication for U.S. Appl. No. 14/842,734 dated Nov. 19, 2015.
Official Communication for U.S. Appl. No. 14/871,465 dated Apr. 11, 2016.
Official Communication for U.S. Appl. No. 14/871,465 dated Feb. 9, 2016.
Official Communication for U.S. Appl. No. 14/883,498 dated Mar. 17, 2016.
Official Communication for U.S. Appl. No. 14/883,498 dated Dec. 24, 2015.
Official Communication for U.S. Appl. No. 14/961,481 dated Mar. 2, 2016.
Official Communication for U.S. Appl. No. 14/975,215 dated May 19, 2016.
Restriction Requirement for U.S. Appl. No. 13/839,026 dated Apr. 2, 2015.
Elias et al., "Exploration Views: Understanding Dashboard Creation and Customization for Visualization Novices," Sep. 5, 2011, Network and Parallel Computing, pp. 274-291.
Notice of Allowance for U.S. Appl. No. 15/252,021 dated Sep. 14, 2017.
Official Communication for European Patent Application No. 17182418.8 dated Dec. 19, 2017.
Official Communication for European Patent Application No. 15183721.8 dated Jan. 13, 2017.
Official Communication for U.S. Appl. No. 15/252,021 dated May 19, 2017.

* cited by examiner

Document 1

Queries | Global Variables | Document CSS

PANELS p1
p2
p3 . . .

COMPANY STOCK PRICE $125,000

YOUR EQUITY VALUE:

COMPANY VALUATION: $9 BILLION

| GLOBAL VARIABLES | | —x |
|---|---|---|
| NAME | DEFAULT VALUE | x |
| options | 100000 | x |
| strike | 4.75 | |

COMPANY A
$23 BILLION

COMPANY D
$370 BILLION

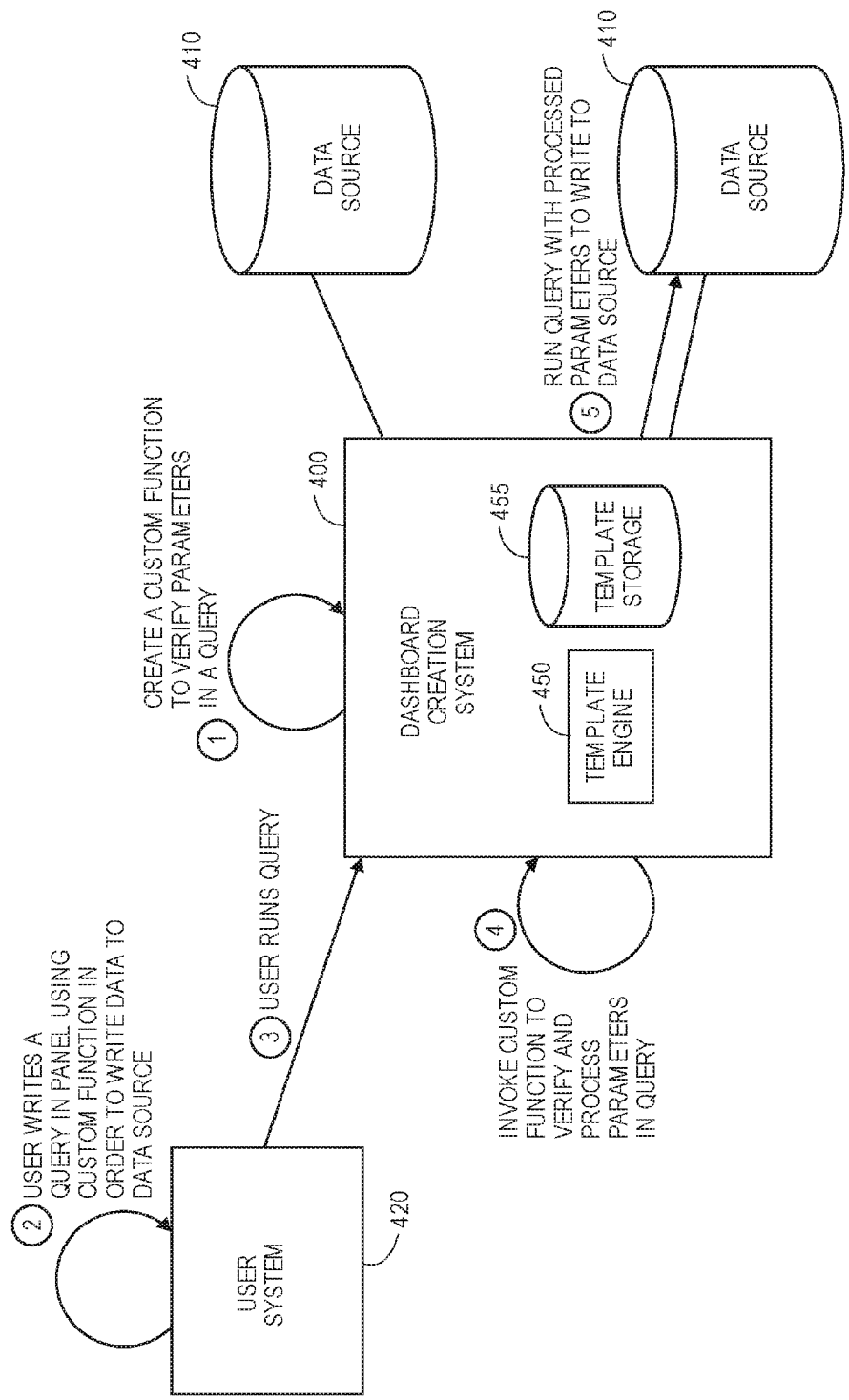

FIG. 11A

```
1100 →
1101  QUERIES | FUNCTIONS | DATA | DEPENDENCIES                    _ □ ×
1102                      NAME  child        SOURCE  SQL Database 1  ▽   ⚙ ▷Run  ✓Updated
      Query 1  ✓                                1106                          1114    1116
      Query 2  ✓           1  select                      1110   1112
      Query 3  ✓           2   *,
      Query 4  ✓           3   status_color{x.readiness} as color
      Query 5  ✓           4  from (select unit.id, name, shortname, readiness
      Query 6  ✓           5  from unit
      Query 7  ✓           6  join unit_relationship on unit.id,unit_relationship.child
      Query 8  ✓           7  join unit_value_cache on unit_relationship.
      Query 9  ✓              child=unit_value_cache.id
                           8  where unit_relationship.parent = {(param id)}::bigint
      + New Query          9  and unit_value_cache.months={(param months)}::int
      1104                10  order by unit.id asc)as x limit 12;
                                                              1108           Preview
      No Partials available
      1118
      + New Partial
```

FIG. 11B

```
QUERIES  FUNCTIONS  DATA  DEPENDENCIES                                    _ ☐ ×
         ⊙  NAME  readinessCards    SOURCE  SQL Database 1        ▷Run  ✓Updated
Function 1                       1146                             1150    1152
Function 2   1  /#return{
Function 3   2  "title": ["TO 80% READINESS", "TO FULL READINESS"],
             3  "VALUES" : [{{timeready.time80}}, {{timeready.timfull}}],
             4  "cost" : [{{costready.cost80}}, {{costready.costfull}}]
             5  }#}
             6
             7  return {
             8  "one": ["TO 80% READINESS" , {{timeready.time80}},
                {{costReady.cost80}}],
             9  }#}
            10  "two": ["TO FULL READINESS" , {{timeready.timefull}},
                {{costReady.costfull}}],
            11  }
            12
            13                           1148                     Preview + New Function
1144
```

1140
1101
1142

1180

| STYLES | VARIABLES | _ × |
|---|---|---|
| NAME | DEFAULT VALUE | |
| id | 0 | × |
| months | 24 | × |
| th | 80 | × |
| lm | 50 | × |

1182 — STYLES
1184 — NAME
1186 — +Add New Variable

FIG. 11C

| QUERIES | FUNCTIONS | DATA | DEPENDENCIES | | 1610 | 1612 | 1614 | 1616 | |
|---|---|---|---|---|---|---|---|---|---|
| Data_file.csv ⊗ | | NAME UntitledData1 | | | + Column | + Row | ⊕ Upload | ⟳ Update | _ ☐ ✕ |
| | | E_Type | E_Return_ID | Email | IP | E_Filling_Data | | | Hash |
| | 0 | Data_file | 10000053887085 | abc@gmail.com | 192.168.1.0 | 2015-02-07T13:19:42-0500 | | | 61177 8456258 |
| | 1 | Data_file | 10000073726435 | bcd@gmail.com | 192.168.1.1 | 2015-03-14T21:04:12-0400 | | | c444825d5003 |
| | 2 | Data_file | 10000073726435 | cde@gmail.com | 192.168.1.2 | 2014-03-22T13:14:16-0400 | | | 00cd2dac8984 |
| | 3 | Data_file | 10000109900994 | def@gmail.com | 192.168.1.3 | 2015-03-02T19:42:43-0500 | | | acdb17b46dcb |
| | 4 | Data_file | 10000162167165 | efg@gmail.com | 192.168.1.4 | 2015-01-27T15:16:56-0500 | | | c0331d91642d |
| | 5 | Data_file | 10000171738965 | fgh@gmail.com | 192.168.1.5 | 2014-01-27T15:16:56-0500 | | | 98aZa410abcd |
| | 6 | Data_file | 10000172223044 | ghi@gmail.com | 192.168.1.6 | 2015-02-03T17:16:16-0500 | | | 8c8e0c090206 |
| | 7 | Data_file | 10000322035635 | hij@gmail.com | 192.168.1.7 | 2015-03-29T21:22:01-0400 | | | 675c5c616bca |
| | 8 | Data_file | 10000343250545 | ijk@gmail.com | 192.168.1.8 | 2015-03-29T19:34:56-0400 | | | 4084c100a94s |
| | 9 | Data_file | 10001012576135 | jkl@gmail.com | 192.168.1.9 | 2015-02-28T17:49:33-0500 | | | 71420a0ccb72 |
| | 10 | Data_file | 10001077130325 | klm@gmail.com | 192.168.1.10 | 2015-01-21T19:37:16-0500 | | | 0ab653d24a1a |
| | 11 | Data_file | 10001103451685 | lmn@gmail.com | 192.168.1.11 | 2014-03-29T09:20:05-0400 | | | 367ccc172db2 |
| | 12 | Data_file | 10001156230944 | mno@gmail.com | 192.168.1.12 | 2015-02-24T17:31:52-0500 | | | d11036581364 |
| | 13 | Data_file | 10001181194665 | opq@gmail.com | 192.168.1.13 | 2015-02-24T22:14:30-0500 | | | 0aa11749db29 |
| | 14 | Data_file | 10001187969905 | pqr@gmail.com | 192.168.1.14 | 2015-04-06T16:11:48-0400 | | | b179aabd9854 |
| | 15 | Data_file | 10001198927405 | qrs@gmail.com | 192.168.1.15 | 2015-03-13T10:16:08-0400 | | | 8b39c224b224 |
| | 16 | Data_file | 10001298122535 | rst@gmail.com | 192.168.1.16 | 2015-04-07T16:56:21-0400 | | | c8371c076806 |
| | 17 | Data_file | 10001360085214 | stu@gmail.com | 192.168.1.17 | 2015-06-17T12:23:42-0400 | | | 8b39c226b22b |
| | 18 | Data_file | 10002157903515 | tuv@gmail.com | 192.168.1.18 | 2015-04-18T14:16:20-0400 | | | 6979aa51ac69 |
| | 19 | Data_file | 10002202810984 | uvw@gmail.com | 192.168.1.19 | 2014-03-05T16:48:48-0500 | | | c3911a1c481c |
| | 20 | Data_file | 10002207450395 | vwx@gmail.com | 192.168.1.20 | 2015-02-24T06:34:17-0500 | | | 1717a7876 1a |
| | 21 | Data_file | 10002302284335 | wxy@gmail.com | 192.168.1.21 | 2015-03-05T22:33:36-0500 | | | 1399a7874a71 |
| | 22 | Data_file | 10002310711985 | xyz@gmail.com | 192.168.1.22 | 2015-04-14T17:51:28-0400 | | | 64a713896429 |
| + New Data | | | | | | | | | |

SYSTEM FOR PROVIDING DYNAMIC
LINKED PANELS IN USER INTERFACE

INCORPORATION BY REFERENCE

This application claims the benefit of U.S. Provisional Patent Application No. 62/365,169, filed Jul. 21, 2016, the entire disclosure of which is hereby made part of this specification as if set forth fully herein and incorporated by reference for all purposes, for all that it contains.

TECHNICAL FIELD

The present disclosure relates to systems and techniques for data integration, analysis, and visualization. More specifically, the present disclosure relates to dynamic linked panels associated with queries performed on data sources and visualization of results of the queries.

BACKGROUND

Organizations and/or companies are producing increasingly large amounts of data. Such data may be queried and presented in a user interface.

SUMMARY

The systems, methods, and devices described herein each have several aspects, no single one of which is solely responsible for its desirable attributes. Without limiting the scope of this disclosure, several non-limiting features will now be discussed briefly.

Developing online documents can require collaboration by many designers who possess great deal of technical knowledge, including knowledge of markup languages such as HTML, database languages such as SQL, scripting languages such as JavaScript, graphic design skills, and other technical knowledge. One aspect features providing panels coded to query a database and display the queried data according to one or more display settings. Panels can be used to create online documents without needing the same depth of technical skill. Panels can display representations of data queried from a database and dynamically interact with other panels. Certain features address the varying amount of time that database queries and interactions can take. A dependency web shows dependencies, a timing table shows how long certain actions take to perform, and a timeout graphic shows up to indicate panels that take a long or abnormally long time to load. These help developers optimize and restructure code to speed up performance. Dependency information can be stored and used when rerunning documents to refresh dependent documents without needing to refresh independent elements. Using local applications and data allows offline simulations without disturbing databases in use. A diff tool shows not only code changes, but also document output changes affected by code changes.

In one embodiment, a computer system configured to display data from one or more data sources comprises: one or more hardware computer processors configured to execute code in order to cause the system to: generate user interface data configured to be rendered as a user interface, the user interface including at least a first display portion and a second display portion; receive an input indicating a relationship between the first panel of the plurality of panels and a second panel of the plurality of panels, wherein the relationship is indicated by associating a variable of the first panel with a query of the second panel; and in response to the input: updating a visual representation of data displayed in the second panel by executing the query of the second panel using a value of the variable of the first panel to retrieve updated data from the database; and updating the graphical visualization included in the second display to include an edge connecting a first node representing the first panel to a second node representing the second panel. The first display portion includes a plurality of panels comprising a first panel configured to generate a visual representation of data according to display settings for the first panel, wherein the data is retrievable from a database according to a query associated the first panel, wherein the first panel is associated with one or more variables, and the second display portion includes a graphical visualization of relationships among the plurality of panels, the graphical visualization including nodes and edges, at least some of the nodes representing respective ones of the plurality of panels, at least some of the nodes representing respective ones of the one or more variables, at least some of the edges representing relationships among respective pairs of the plurality of panels.

According to certain aspects, the first and second display portions are displayed simultaneously in the user interface. Additional display portions can include lists of queries, code associated with panels, queries, functions, variables. Additional elements can be represented in the graphical visualization. Selecting a panel can cause the corresponding nodes in the graphical visualization to be highlighted. Selecting a node can cause the corresponding panels to be highlighted.

In one embodiment, a computer system configured to display data from one or more data sources comprises one or more hardware computer processors configured to execute code in order to cause the system to: generate user interface data configured to be rendered as a user interface, the user interface including at least a first display portion and a second display portion, receive an input modifying a relationship between the first panel of the plurality of panels and a second panel of the plurality of panels, wherein the relationship is modified by associating a variable of the first panel with a query of the second panel; and in response to the input: updating the visualization of time to change the time that it takes to process the first panel and the time that it takes to process at least one dependency of the panel. The first display portion includes a plurality of panels comprising a first panel configured to generate a visual representation of data according to display settings for the panel, wherein the data is retrievable from a database according to a query associated the first panel, wherein the first panel is associated with one or more variables, and the second display portion includes a visualization of time that it takes to process the first panel and a time that it takes to process at least one dependency of the panel, wherein the dependency comprises at least one of the query, a function in the query, or a variable in the query that is defined by a second panel.

In one embodiment, a computer system configured to display data from one or more data sources comprises: one or more hardware computer processors configured to execute code in order to cause the system to: generate a user interface configured to display a plurality of panels including a first panel and a second panel, each of the plurality of panels having respective display settings and queries including code for querying one more data sources; execute a first query associated with the first panel; display the first panel in the user interface based on first display settings of the first panel, the first panel displaying at least a portion of the result of the first query, the result of the first query being associated with a variable; execute a second query associated with the second panel, wherein the second query refers to the variable associated with the first query of the first panel; display the second panel in the user interface based on second display settings of the second panel, the second panel displaying at least a portion of the result of the second query; and in response to user input changing the displayed result in the first panel: re-execute the second query associated with the second panel; and update the display of the second panel in the user interface based on results of the re-executed second query of the second panel.

According to certain aspects, the code can be further configured to: receive a third query from the first panel for writing data to the one or more data sources; process one or more parameters in the third query by invoking a function; and perform the third query with the processed one or more parameters to write data to the one or more data sources. The processing of the one or more parameters in the third query may be performed at least in part by: replacing the one or more parameters with respective placeholders; and storing respective values corresponding to the one or more parameters in an array. The processing of the one or more parameters in the third query may be performed at least in part by changing respective values corresponding to the one or more parameters to string format. Each of the plurality of panels can be referenced as a template that is rendered by a template engine, and the function can be registered with the template engine. The code may be further configured to: prior to running the query of the first panel, invoke one or more functions to determine whether a table, a row, or a column referenced in the query exists in the one or more data sources.

In another embodiment, a method of displaying data from one or more data sources comprises: using one or more hardware computer processors: generating a user interface configured to display a plurality of panels including a first panel and a second panel, each of the plurality of panels having respective display settings and queries including code for querying one more data sources; executing a first query associated with the first panel; displaying the first panel in the user interface based on first display settings of the first panel, the first panel displaying at least a portion of the result of the first query, the result of the first query being associated with a variable; executing a second query associated with the second panel, wherein the second query refers to the variable associated with the first query of the first panel; displaying the second panel in the user interface based on second display settings of the second panel, the second panel displaying at least a portion of the result of the second query; and in response to user input changing the displayed result in the first panel: re-executing the second query associated with the second panel; and updating the display of the second panel in the user interface based on results of the re-executed second query of the second panel.

According to certain aspects, the method may further comprise: receiving a third query from the first panel for writing data to the one or more data sources; processing one or more parameters in the third query by invoking a function; and performing the third query with the processed one or more parameters to write data to the one or more data sources. Said processing the one or more parameters in the third query can comprise: replacing the one or more parameters with respective placeholders; and storing respective values corresponding to the one or more parameters in an array. Said processing the one or more parameters in the third query can comprise changing respective values corresponding to the one or more parameters to string format. Each of the plurality of panels may be referenced as a template that is rendered by a template engine, and the function may be registered with the template engine. The method may further comprise: prior to running the query of the first panel, invoking one or more functions to determine whether a table, a row, or a column referenced in the query exists in the one or more data sources.

In some embodiments, a non-transitory compute readable medium comprises instructions for displaying data from one or more data sources that cause a computer processor to: generate a user interface configured to display a plurality of panels including a first panel and a second panel, each of the plurality of panels having respective display settings and queries including code for querying one more data sources; execute a first query associated with the first panel; display the first panel in the user interface based on first display settings of the first panel, the first panel displaying at least a portion of the result of the first query, the result of the first query being associated with a variable; execute a second query associated with the second panel, wherein the second query refers to the variable associated with the first query of the first panel; display the second panel in the user interface based on second display settings of the second panel, the second panel displaying at least a portion of the result of the second query; and in response to user input changing the displayed result in the first panel: re-execute the second query associated with the second panel; and update the display of the second panel in the user interface based on results of the re-executed second query of the second panel.

According to certain aspects, the instructions can be further configured to cause the computer processor to: receive a third query from the first panel for writing data to the one or more data sources; process one or more parameters in the third query by invoking a function; and perform the third query with the processed one or more parameters to write data to the one or more data sources. The processing of the one or more parameters in the third query may be performed at least in part by: replacing the one or more parameters with respective placeholders; and storing respective values corresponding to the one or more parameters in an array. The processing of the one or more parameters in the third query may be performed at least in part by changing respective values corresponding to the one or more parameters to string format. Each of the plurality of panels can be referenced as a template that is rendered by a template engine, and the function can be registered with the template engine. The instructions may be further configured to cause the computer processor to: prior to running the query of the first panel, invoke one or more functions to determine whether a table, a row, or a column referenced in the query exists in the one or more data sources.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed. In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIGS. 2A-2D illustrate one embodiment of a user interface of a dashboard creation system for creating a dynamic panel.

FIG. 4 is a data flow diagram illustrative of the interaction between the various components of a dashboard creation system configured to write to data sources using dynamic panels, according to one embodiment.

FIGS. 11A-11C illustrate embodiments of user interfaces of a dashboard creation system for creating a dynamic panel.

FIG. 16 illustrates one embodiment of a dataset shown in a user interface.

FIG. 22 illustrates one embodiment of a user interface comprising dynamic panels for displaying results of queries performed on one or more data sources.

DETAILED DESCRIPTION

Figure 1:
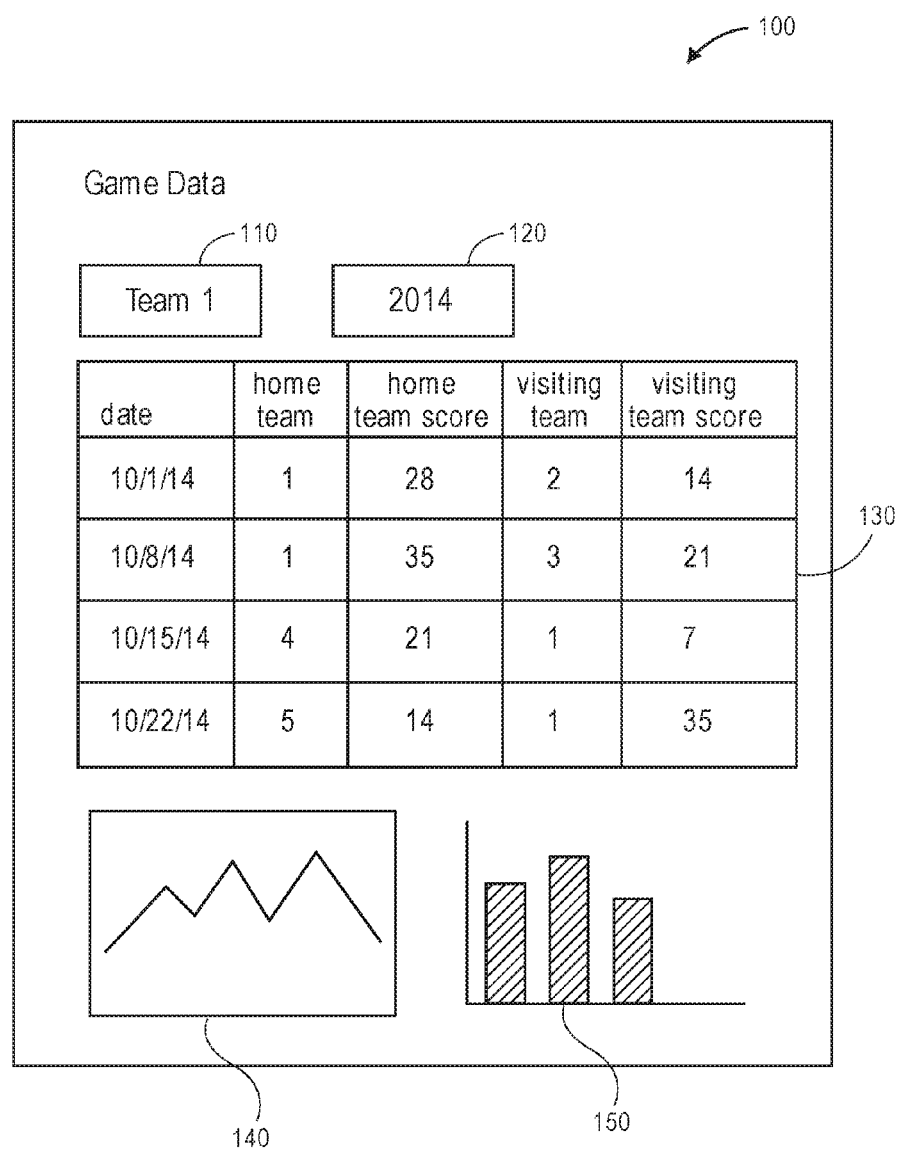
FIG. 1 illustrates one embodiment of a user interface comprising dynamic panels for displaying results of queries performed on one or more data sources.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide exemplary definitions.

Overview

Disclosed herein are various systems and methods for providing a plurality of dynamic panels in a user interface (UI). Examples of additional user interfaces are described in U.S. patent application Ser. No. 14/841,338 titled "SYSTEM FOR PROVIDING DYNAMIC LINKED PANELS IN USER INTERFACE," filed Aug. 31, 2015, which is made a part of this specification as if fully set forth herein and is hereby incorporated by reference in its entirety for all purposes, for all that it contains. The dynamic panels (or "panels") can display different pieces of data from one or more data sources. For example, a query can be run on one or more data sources, and different parts of the result from the query can be output using different dynamic panels. For instance, each dynamic panel can be associated with a variable to output. Different types of dynamic panels can be provided, such as charts (e.g., line chart, bar chart, etc.), controls (e.g., dropdown, multiselect box, search box, etc.), maps, tables, text boxes, etc. The panels can be data source agnostic. For example, the panels can be associated with data from different types of data sources, such as relational databases (e.g., SQL Server), Elasticsearch, etc. In some embodiments, individual panels may each be referred to as "widgets." In some embodiments, the user interface including multiple panels may be referred to as a "dashboard."

Developing online documents can require collaboration by many designers who possess great deal of technical knowledge, including knowledge of markup languages such as HTML, database languages such as SQL, scripting languages such as JavaScript, graphic design skills, and other technical knowledge. One aspect features providing panels coded to query a database and display the queried data according to one or more display settings. Panels can be used to create online documents without needing the same depth of technical skill. Panels can display representations of data queried from a database and dynamically interact with other panels. Certain features address the varying amount of time that database queries and interactions can take. A dependency web shows dependencies, a timing table shows how long certain actions take to perform, and a timeout graphic shows up to indicate panels that take a long or abnormally long time to load. These help developers optimize and restructure code to speed up performance. Dependency information can be stored and used when rerunning documents to refresh dependent documents without needing to refresh independent elements. The dependency information can include the elements (e.g., panels, variables, queries, functions, datasets) in a user interface and their relationships. The dependency information can include information used to generate the graphical visualization of dependencies. When updates occur (e.g., a user provides an input), the stored dependency information can be referenced to determine elements dependent on the update. Accordingly, dependent elements of the user interface can be executed (e.g., running queries, evaluating functions, re- determining variables, refreshing panels). Using local applications and data allows offline simulations without disturbing databases in use. A diff tool shows not only code changes, but also document output changes affected by code changes.

Figure 7A:
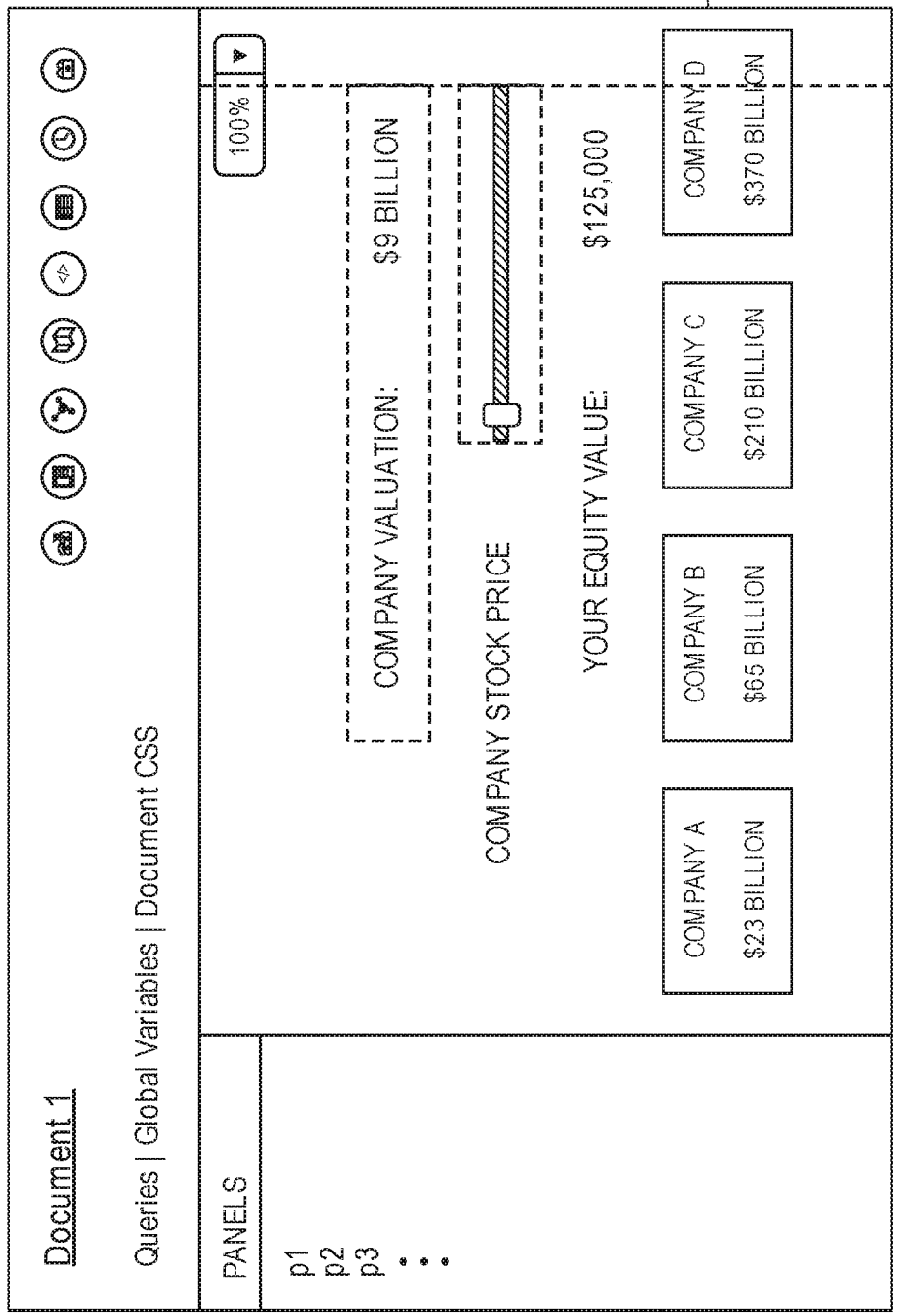
FIGS. 7A-7C illustrate various examples of panels and features provided by a dashboard creation system, according to certain embodiments.
Figure 7B:
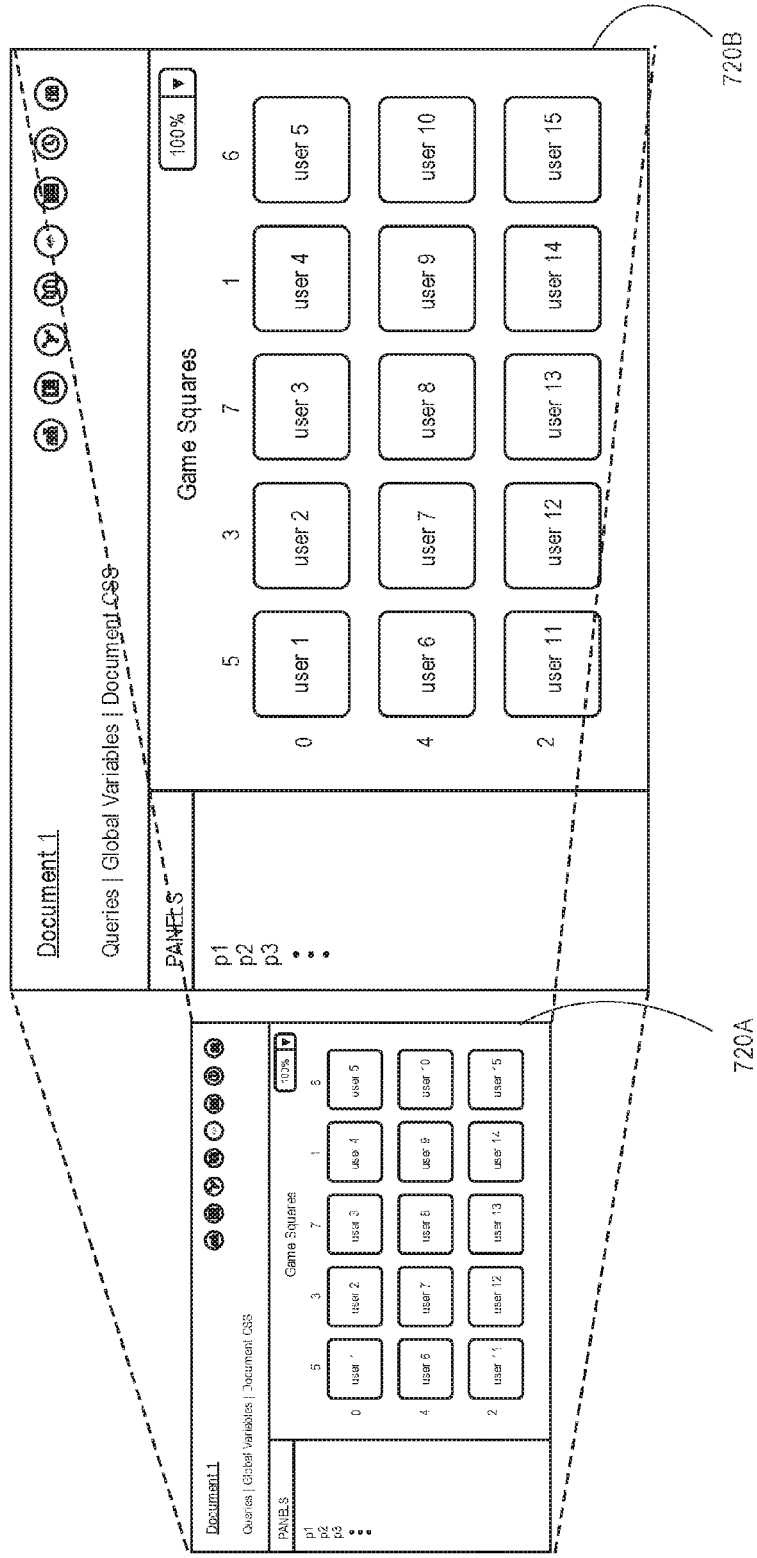
Figure 7C:
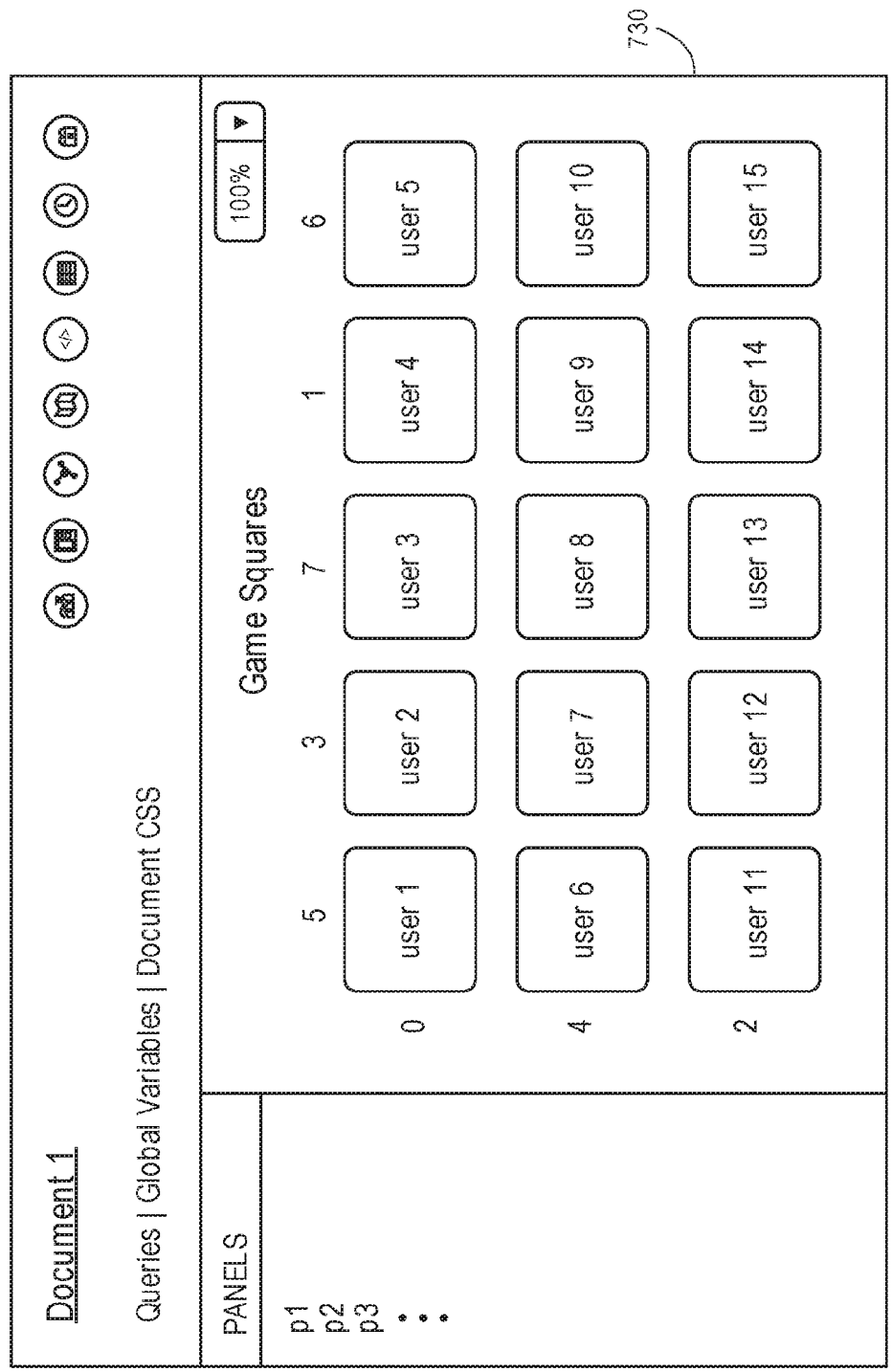

FIG. 1 illustrates one embodiment of a user interface 100 comprising dynamic panels for displaying results of queries performed on one or more data sources. Panels 110 through 150 are some examples of different types of panels that can be included in the user interface 100. Panel 110 and panel 120 are dropdown control panels; panel 130 is a table panel; panel 140 is a line chart panel; and panel 150 is a bar chart panel. Many different types of panels can be included in the user interface 100, depending on the embodiment. For instance, as explained above, types of panels can include charts, controls, graphs, maps, etc. Examples of chart panels may include a bar chart, line chart, pie chart, scatter plot, etc. Examples of control panels may include a date picker, dropdown control, button (e.g., export button, query button, etc.), input box, multiselect box, slider, text area, timeline, etc. Other examples of panels may include a card, image, link (e.g., hyperlink), list, text, graphs, maps, etc. FIGS. 7A-7C illustrate additional examples of types of panels.

A dynamic panel can be linked to one or more other dynamic panels. As mentioned above, the output of a panel can be used in another panel. When the data of a panel depends or relies on the data of another panel, if the data in the source panel changes, the data in the panel that relies on the source panel may also change or be refreshed. For example, in FIG. 1, an example query obtains data regarding National Football League teams from multiple data sources. Panel 110 can be a dropdown control that selects the team to view. Panel 120 can be a dropdown control that selects the season for which to display the games. Panel 130 can be a table that displays the games for the team selected in panel 110 for the season selected in panel 120. Changes to the selected team in panel 110 or the selected season in panel 120 can update the games displayed in panel 130. In some embodiments, panel 140 and panel 150 display statistics related to the games displayed in panel 130; when games displayed in panel 130 change, panel 140 and panel 150 update accordingly.

The query and the settings relating to the display of particular panels can be managed separately. For example, a user interface can provide a section for entering the query and another section for entering display related settings. Separate management of the query and the display settings can allow the panels to be easily updated within the user interface and allow reuse of queries. The page that contains the panels may be referred to as a "document."

In this manner, multiple panels can be used to display different aspects of the result from a query. One query can be run to obtain the needed information, and the result can be parsed and displayed using multiple panels. Display of information can be simplified by using multiple panels. Also, the query can be reused across panels since each panel can extract a portion of the result to display. In certain embodiments, each panel may have its own query and display the result of the query. The panels can also be linked together so that the data from one panel can be used to display the data in another panel.

Example User Interface of Dashboard Creation System

Figure 2A:
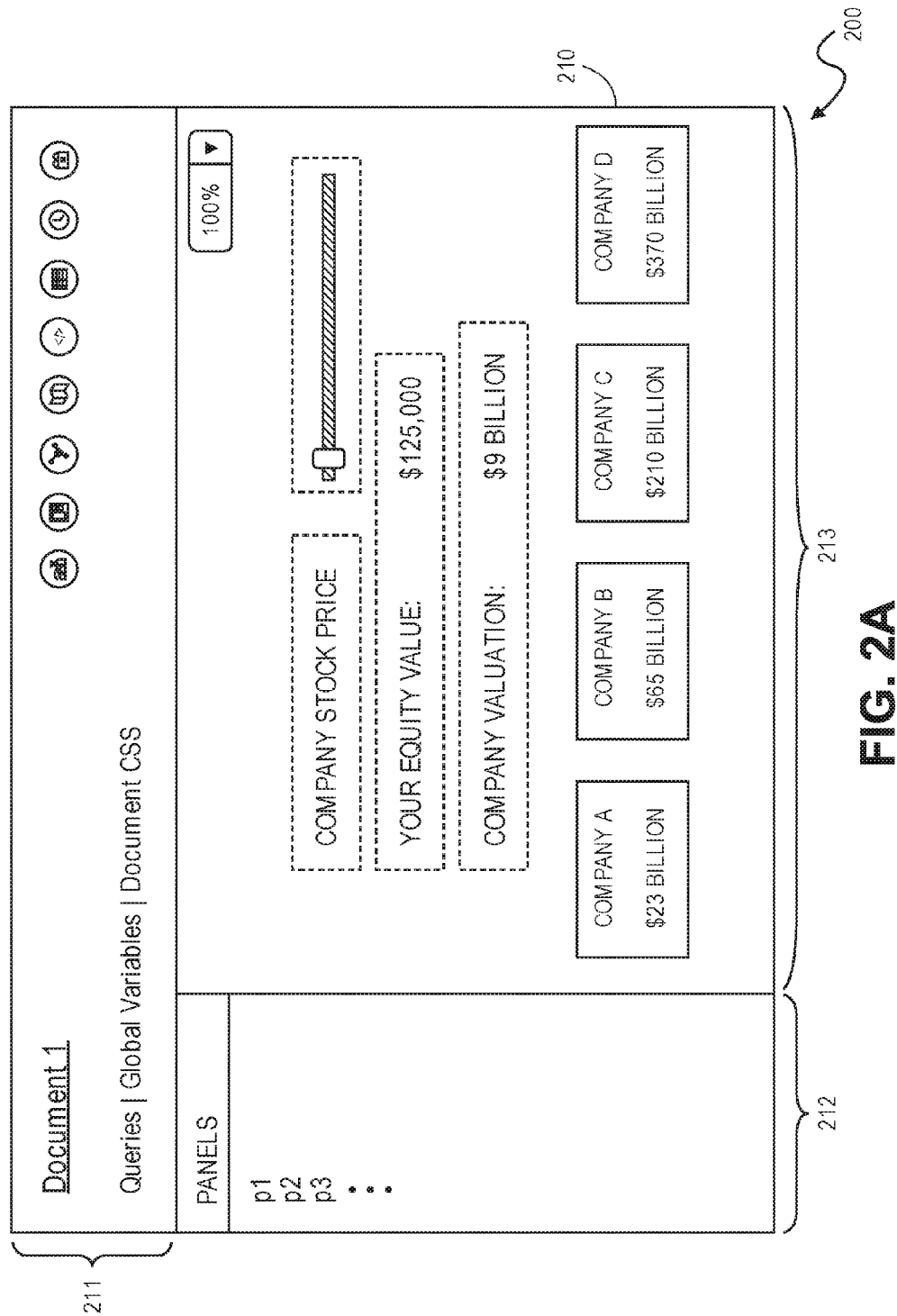
Figure 2B:
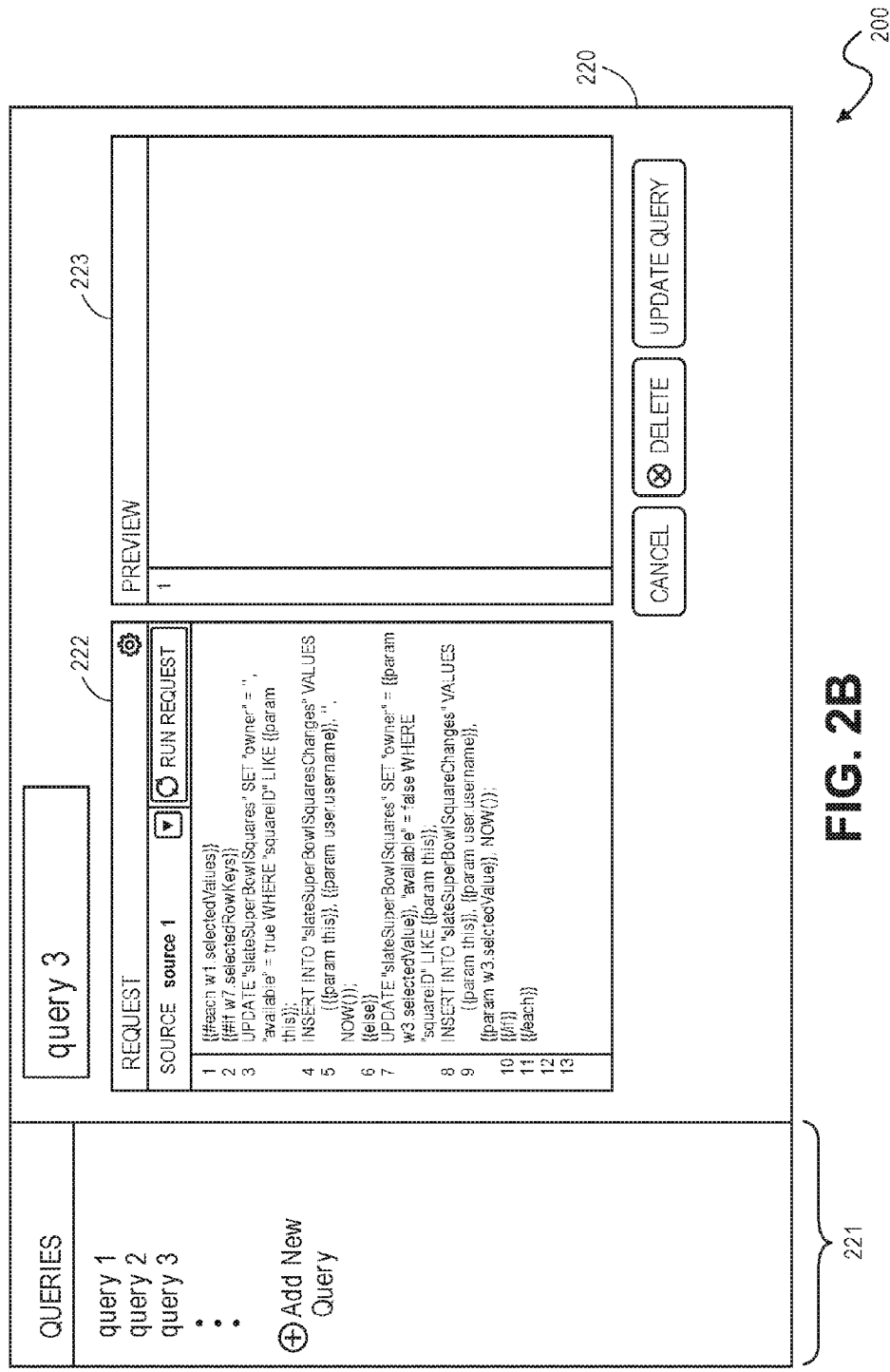
Figure 2D:

FIGS. 2A-2D illustrate one embodiment of a user interface 200 of a dashboard creation system for creating one or more dynamic panels for use in a dashboard. For example, the user interface 200 can provide functionalities for custom styling, query editing and/or previewing, defining query sub-properties, etc. of panels. FIG. 2A illustrates one embodiment of the main page 210 of the user interface 200. FIG. 2B illustrates one embodiment of the query page 220. FIG. 2C illustrates one embodiment of the global variables page 230. FIG. 2D illustrates one embodiment of the document Cascading Style Sheets (CSS) page 240.

Using the main page 210, the user can create, edit, delete, and manage one or more panels. In one embodiment, the main page 210 includes a top section 211 that displays the name of the document selected, if any; links to the query page 220 (FIG. 2B), the global variables page 230 (FIG. 2C), and the document CSS page 240 (FIG. 2D); and various icons for creating panels and for other features. The main page 210 also includes a panels section 212 that displays the list of panels included in the document. The main page 210 includes a design section 213 where the user can create, organize, and edit panels. In the example of FIG. 2A, the user creates Document 1, which contains panels p1, p2, p3, etc. A panel can be referred to by its name, and the name of the panel can be displayed when the cursor is over a particular panel. For illustrative purposes, certain items in design section 213 are marked with dashed lines to indicate that they are panels; for example, the slider in the top right corner of design section 213 is a panel. Four blocks at the bottom of design section 213 (listing company name and dollar value) are also examples of panels; these panels are shown in solid lines because they have borders.

Moving to FIG. 2B, the query page 220 allows the user to enter a query. For example, a query can be associated with a panel. The example query page 220 may appear when the user clicks on the link to the query page 220 on the main page 210 (FIG. 2A). The query page 220 can display a list of queries 221, for example, stored queries in a database (e.g., template storage 355, 455 in FIGS. 3 and 4). In some embodiments, a query may be reused in other documents. For example, the user can select a query from the list of queries or create a new query. In the example of FIG. 2B, the query page includes a button for adding a new query. The query page 220 can include a code section 222 for entering the query and a preview section 223 for previewing results of execution of the query in code section 222. The user may update or delete a query from the query page 220. The example query in FIG. 2B relates to the panel shown in FIG. 7C and updates the data source(s) to reflect availability of individual squares or cards and to add information relating to the squares or cards (e.g., insert username, time, etc.).

FIG. 2C illustrates the global variables page 230, which allows the user to define global variables associated with a document and/or a panel. The global variables can be referred to by the panels in the document. In addition, the user may also define variables associated with a panel. The variables can be used to link two or more panels together. For instance, the query for a panel may reference a variable in one or more other panels. The panels may be linked in the sense that when the data in a particular linked panel updates, the data in the panels that reference the particular panel also updates. The global variables page 230 can appear when the user clicks on the link to the global variables page 230 on the main page 210 (FIG. 2A). The global variables page 230 can be a pop-up window as illustrated in FIG. 2C or a separate page, for example, like the query page 220. In the example of FIG. 2C, the global variables page 230 shows two variables "options" and "strike." In some embodiments, a global variable is defined for a panel. The panel global variable may be referenced using the format "<panel name>.<global variable name>." For example, if "options" variable is associated with panel p1, and the user can refer to "options" variable as "p1.options." The panel global variables may also be used to link two or more panels together. In some embodiments, global variables may be used to link two or more panels. In one embodiment, global variables may be referred to in a uniform resource locator (URL). The global variables may be modified by changing the values associated with the global variables in the URL.

FIG. 2D illustrates the document CSS page 240 that allows the user to define the style for a document and the panels in the document. The document CSS page 240 can appear when the user clicks on the link to the document CSS page 240 on the main page 210 (FIG. 2A). The document CSS page 240 can be a pop-up window as illustrated in FIG. 2D or a separate page, for example, like the query page 220. Different styles can be applied at various levels of granularity; for example, a style can apply to individual elements within the document or the panel. The document CSS page 240 may also specify the dimensions of the document and the panels in the document. The same CSS may be applied to various panels by referring to a panel's number, title, or type (e.g., dropdown, text, etc.).

In some embodiments, the user interface 200, including the various pages illustrated in FIGS. 2A-2D, can be a web interface. The system may also provide different types or modes of user interfaces for authoring and editing documents and panels. For example, more advanced users can use an interface for directly entering the query, and beginner users can use a simpler interface that allows selection of values for various aspects of a panel (e.g., x value and y value of a chart). Users can share documents with other users and can give other users permission to edit, read only, etc. For example, the system can provide an edit mode (or "author mode"), in which the user can edit all aspects of a panel, e.g., the query for the panel, the display settings for the panel, etc. The system can also provide a read only mode (or "consumer mode"), in which the user can interact with the panels (e.g., select a value for a dropdown control), but may not edit other aspects of panels. In certain embodiments, users can edit panels within a web authoring environment. For example, users may use web technologies to edit the panels and may edit the panels within a web page or web interface.

In one embodiment, the user interface 200 can have two viewing modes: a WYSIWYG (What You See Is What You Get) editor mode and a corresponding read-only consumer mode. In editor mode, built-in panels like bar charts, scatter plots, time series plots, tables, dropdown menus, text boxes, etc. can be added and arranged on the canvas or page. The user can author and edit data queries via a rich editor UI, which can support quickly previewing results for quick debugging. Queries may natively support templating (e.g., via Handlebars) to link to panels, URL parameters, or data from other queries. Panels can also be templatized to link to data from the queries and coordinate with other panels. Additionally, the editor can customize styling for a particular page or document, or deployment. The read-only consumer mode may allow finished web pages to be shared to a set of users that can interact with a page but not edit its layout or setup.

Querying and Displaying Data in Data Sources Using Dynamic Panels

Figure 3:
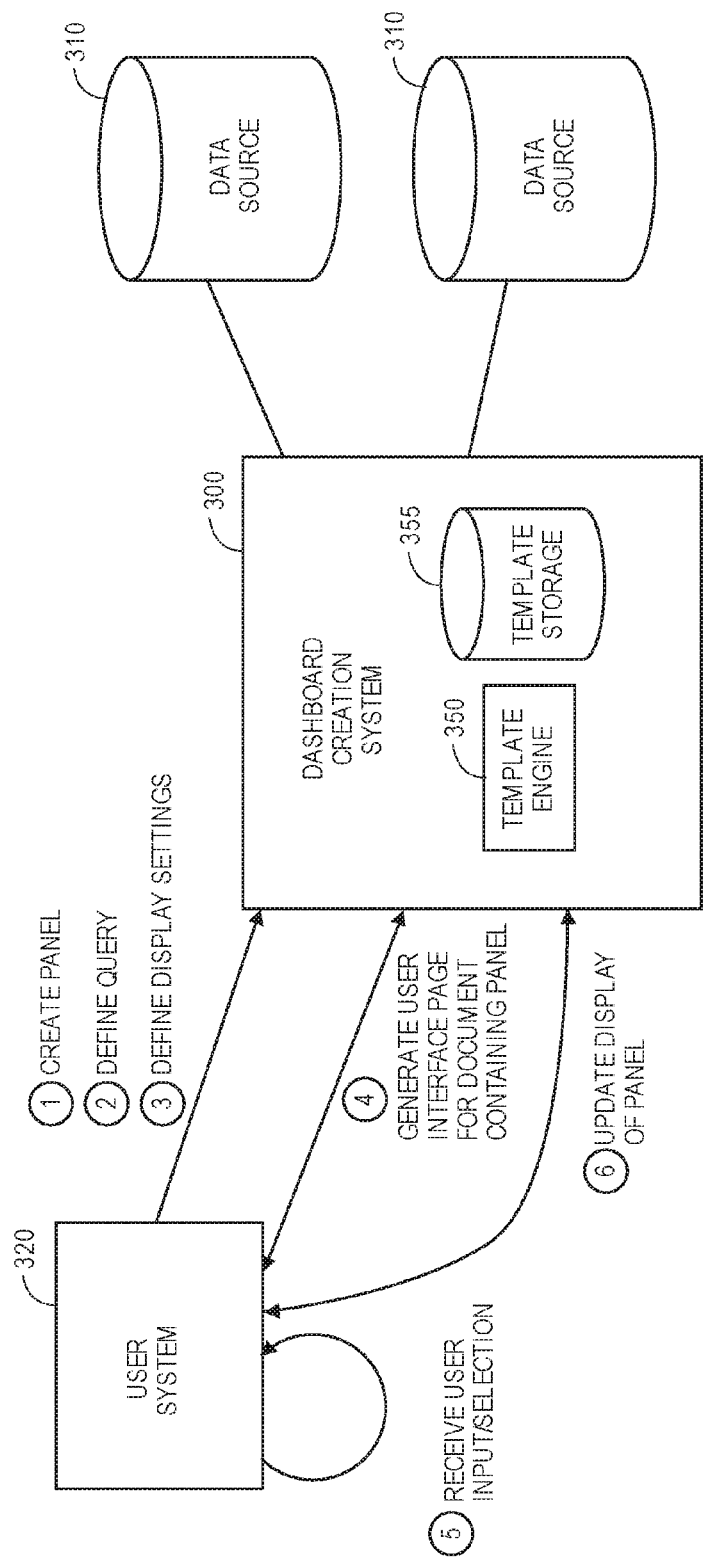
FIG. 3 is a data flow diagram illustrative of the interaction between the various components of a dashboard creation system configured to create and display dynamic panels, according to one embodiment.

FIG. 3 is a data flow diagram illustrative of the interaction between the various components of a dashboard creation system 300 configured to create and display dynamic panels, according to one embodiment. The system 300 can be connected to one or more data sources 310, such as databases. The system 300 may include a template engine 350 and template storage 355. A template system may allow creation of templates that can be used to generate user interface pages, such as web pages. A template system can combine templates and data from data sources to generate user interface pages. For example, a template engine or processor of the template system can render the templates and data from data sources into finished pages. The template engine 350 can render user interface pages based on the documents and/or data in data sources 310. In some embodiments, a template is any text that contains a template placeholder(s) (e.g., double curly brackets: "{{" and "}}"), and the template engine 350 processes the template text with a template context (e.g., an object) and renders the template text to provide the final output. The output can be incorporated into query backends or be used to drive other panels. The template storage 355 can store templates and related information. In certain embodiments, the template storage 355 can also store documents, panels included in documents, and related information. Some examples of template systems may include Handlebars, Mustache, etc. FIG. 3 shows the template engine 350 and the template storage 355 as a part of the system 300, but they may reside in a separate computing system or on separate computing devices from the system 300. For example, the template engine 350 can be external to the system 300. The system 300 may communicate with a user system 320, such as a desktop computer, laptop, mobile phone, tablet, mobile devices, etc. For example, the user system 320 displays user interface pages rendered by the template engine 350. The system 300 may include additional or different components, depending on the embodiment.

At data flow action 1, the user creates a panel. As explained above, a panel can have a query associated with it and display settings associated with it.

At data flow action 2, the user defines a query associated with the panel. As mentioned above, the panels can be data source agnostic and can be associated with data from different types of data sources, such as relational databases SQL, Elasticsearch, etc. The system 300 can connect to and query data from any data source that supports a text-based query language. The system 300 can support different types of query languages and/or tools, depending on the embodiment. In certain embodiments, Handlebars can be used for the queries. In some embodiments, JSON (JavaScript Object Notation) can be used for the queries. In other embodiments, the system 300 can include one adapter for SQL databases and another adapter for REST backends (e.g., Elasticsearch), which may be provided as default adapters. The system 300 can additionally allow the user to transform and selectively extract data out of query results. For example, the user can extract data from JSON query responses using JSONPath.

At data flow action 3, the user defines display settings associated with the panel. The user can define the display settings in the document CSS for the panel. The user can create additional panels and define the query and display settings for each panel. One or more panels may be added to a container. A container may function as a holder for panels. A container can act as a collection of panels that move as a unit. The user can define the layout of the panels within the container, and also define behavior for the container, which can apply to all the panels in the container as a group. The user may add tabs for a container. For example, a container may include multiple tabs, and the user can switch between tabs to view different content. Each tab can act as a separate content space and hold different panels.

At data flow action 4, the system 300 generates the user interface page for the document that contains the panel. When the system 300 receives a request from the user system 320 for a particular document, the system 300 can obtain the requested document, for example, from the template storage 350 and run the query associated with the panels in the documents. The template engine 350 may combine the document, the panels, and the query results in order to generate finished user interface pages. As explained above, one query can be used to obtain data, and different parts of the query can be associated with different panels. For instance, a query q returns columns c1, c2, c3, and c4, and the system 300 creates a text panel whose text is {{q.c1}}, a dropdown panel whose values is {{q.c2}}, and a chart panel whose x values and y values are {{q.c3}} and {{q.c4}}, respectively. Or each panel may have a query associated with it and the result of the query can be associated with the particular panel. The finished user interface pages can be then sent to the user system 320 to be displayed in a user interface.

At data flow action 5, the user system 320 receives user input/selection in the user interface. The user may change the displayed result in the user interface of the user system 320. For example, the user may select a particular value in a dropdown control. Or the user may select a particular panel or an item within a panel. The user input or selection is sent to the system 300.

At data flow action 6, the system 300 updates the display of the panel. For instance, the query may be rerun or the query result may be filtered based on the selected value in a dropdown control. Or actions may be associated with a panel or an item within a panel, and such actions may be performed. For example, selection of a panel or an item within a panel can display options or attributes related to the panel or the item. In one example, the selection of a table row in one panel is linked to another panel that contains more detailed information about the selected row. A table shows a list of games as in FIG. 1, and selecting a game in the table shows more detailed statistics on the selected game in a different panel. Certain details relating to FIG. 3 are further explained below in connection with FIG. 3A.

The system 300 can be highly extensible, and panels can be easily created, edited, and/or removed. In one embodiment, a new panel can be added by creating a web module (e.g., an AngularJS module). A simple web module may be easily created by a suitable module generator (e.g., via Yeoman generator). Similarly, data adapters for new types of data sources can be easily added (e.g., via a java jar).

Linking of Dynamic Panels

Figure 3A:
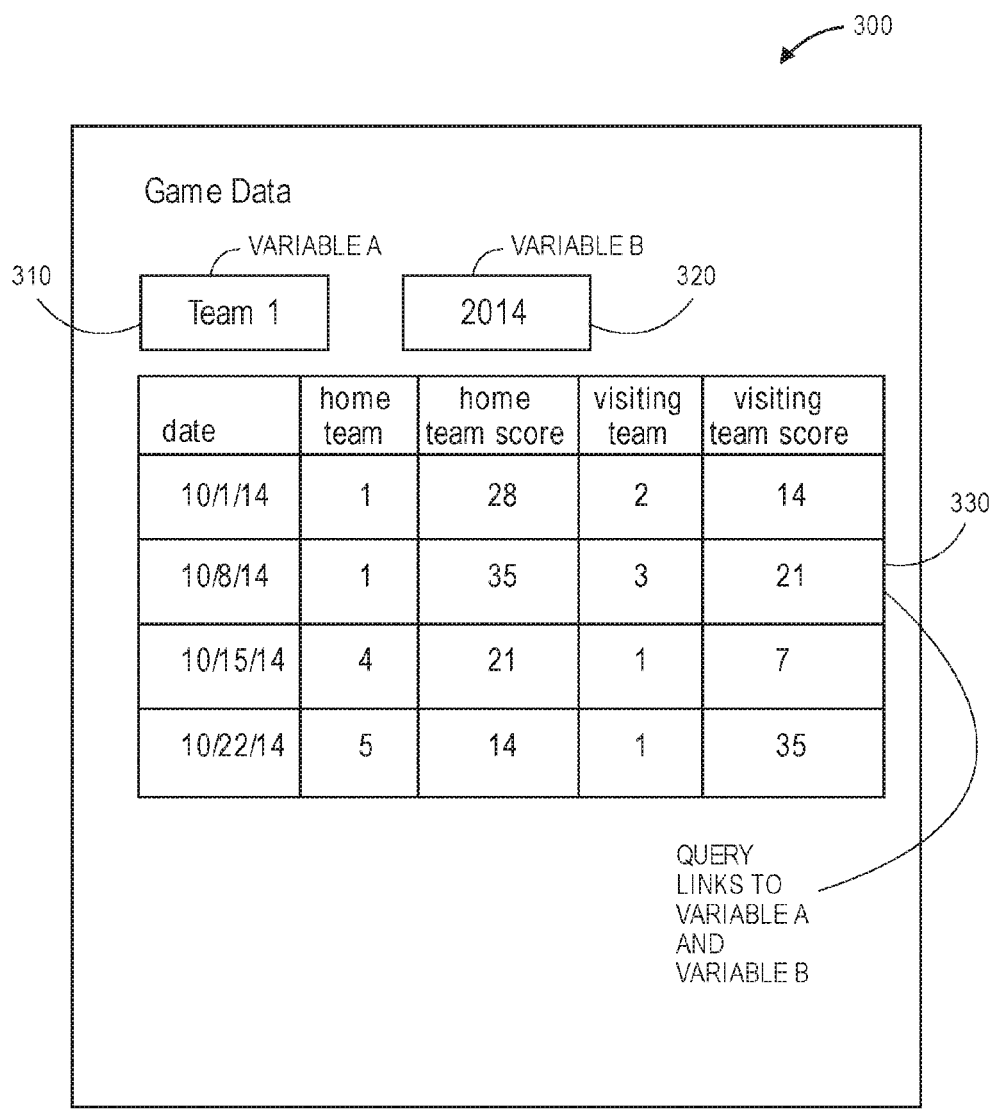
FIG. 3A illustrates one example of linking multiple dynamic panels.

FIG. 3A illustrates one example of linking multiple dynamic panels. In the example of FIG. 3, panels 310, 320, and 330 are similar to panels 110, 120, and 130 in FIG. 1. Panels 310, 320, and 330 may be named p1, p2, and p3, respectively. As mentioned in connection with FIG. 1, panel 310 can be a dropdown control that selects the team to view; panel 320 can be a dropdown control that selects the season for which to display the games; and panel 330 can be a table that displays the games for the team selected in panel 310 for the season selected in panel 320. For example, panels 310 and 320 can have a selected value variable associated with them since they are dropdown controls. The variables may be referenced as p1.selectedValue and p2.selectedValue. The query of panel 330 can reference p1.selectedValue and p2.selectedValue in the WHERE clause of a SELECT statement. For example, the query can be as follows: SELECT column FROM table WHERE team=p1.selectedValue AND season=p2.selectedValue. In the example of FIG. 3A, p1.selectedValue="Team 1" and p2.selectedValue="2014."

The query may refer to panels, variables of panels, and/or global variables as templates, and a template system or language can process the queries and replace any templates with corresponding values. For example, a template can be indicated by double curly brackets "{{" and "}}" in a template system or language, such as Handlebars and Mustache. In the example above, p1.selectedValue and p2.selectedValue may be enclosed in double curly brackets to indicate that they are templates. Therefore, the query for the example above can be written as: SELECT column FROM table WHERE team={{p1.selectedValue}} AND season={{p2.selectedValue}}. The template engine 350 can process and replace the templates with their corresponding values at the time of generating the finished user interface pages. In certain embodiments, the system 300 builds a graph of all the references from the templates and associates the references such that if any of the references change, the corresponding templates are regenerated or refreshed. Templates may also refer to objects other than panels, depending on the embodiment. Using double curly brackets to indicate templates is described above as an example, and any other syntax elements can be used to indicate templates.

In some embodiments, the user can define variables associated with the panels that can be referenced in a query. For example, the user can define variable A for panel 310 and variable B for panel 320, and the query for panel 330 can reference variable A and variable B in the query. For example, variable A and variable B can be associated with the selected value of panel 310 and panel 320, respectively. As explained above, in some embodiments, panels can have global variables associated with them.

Writing to Data Sources Using Dynamic Panels

FIG. 4 is a data flow diagram illustrative of the interaction between the various components of a dashboard creation system 400 configured to write to data sources using dynamic panels, according to one embodiment. The system 400 and corresponding components of FIG. 4 may be similar to or the same as the system 300 and similarly named components of FIG. 3. The system 400 may include additional or different components, depending on the embodiment.

In some cases, it may be useful to allow users to write to or update the data sources through the panels. For example, the user may want to change the data in a panel and reflect the changes to the data source. The user could also save some selected rows from a table in one document for later use in other documents, or save notes from different users to a table for later reference. In certain cases, the user may also want to rename a portfolio in a database.

The system 400 can allow the users to update the data sources 410 through queries. For example, SQL queries or JSON queries can be used. SQL queries and JSON queries can refer to the panels as templates, and a template system or language like Handlebars or Mustache can process the queries and replace any templates with corresponding values. However, in certain cases, directly replacing the templates with the corresponding values can lead to unintended consequences. For instance, the user may specify an always true condition as the value to be replaced with a template in the WHERE clause of a SQL query, which can result in changing all data. In one example, the user creates a query as follows: UPDATE table SET text="newText" WHERE id={{p1.text}}. If the value of p1.text is "1=1," replacing the template {{p1.text}} with "1=1 would update every row in the table. Accordingly, the system 400 make the queries secure by using a custom function as explained below.

At data flow action 1, the system 400 creates a custom function to verify parameters in a query. For example, an administrator of the system 400 can create the custom function.

In some embodiments, the system 400 uses SQL queries and processes the SQL queries using Handlebars. The custom function can be a Handlebars helper. For example, the custom function can be named "param" and registered with Handlebars. Handlebars can invoke the custom function when processing the SQL queries. The user can use the custom function when using templates in SQL queries.

In one embodiment, the custom function prevents use of text values in templates and only allows parameter values in templates. For example, a variable of a panel used in a template should be a parameter value. Supposing that the variable of the panel referred to in a template is p1.property, the custom function checks whether p1.property is an array. If p1.property is not an array, the custom function replaces "{{param p1.property}}" with a "?" and saves the value of p1.property for reference, for example, in a reference array. If p1.property is an array with a length of n, the custom function replaces "{{param p1.property}}" with a string containing n question marks separated by commas and saves the value of each of element in the array for reference, for example, in a reference array. In this way, the custom function can help create parameterized queries, which contain placeholders such as "?" that can be inserted in query parameters. The SQL engine would escape and not evaluate these parameters, and therefore, parameterized queries can prevent SQL injection. For instance, the expression "1=1" would be escaped and would not be evaluated as a boolean expression; rather it is evaluated as a string.

For example, if p1.property is equal to 1, the custom function processes the SQL query UPDATE table SET text="newText" WHERE id={{param p1.property}} to UPDATE table SET text="newText" WHERE id=?, and stores 1 in the reference array. In another example, if p1.property is equal to an array [1, 2], the custom function processes the SQL query UPDATE table SET text="newText" WHERE id={{param p1.property}} to UPDATE table SET text="newText" WHERE id=(?, ?), and stores 1 and 2 in the reference array. The processed query and parameters can be prepared as a JDBC statement and run against one or more data sources 410. Types of parameters can be preserved (e.g., whether the parameter is a number or a string) by using additional Handlebars helpers.

In other embodiments, the system 400 uses JSON queries and processes the JSON queries using Handlebars and/or Mustache. A JSON query can include three parts: path, method, and body. The path and the body can use templates; since the method generally has a few options, templates may not be used with the method. In order to have different rules for the use of templates, the path, method, and body can be separated into different components of the query. For example, the path and method can be considered as metadata, and the body can be considered as the template.

The custom function can be used on the body of a JSON query. The custom function can be a Handlebars helper. For example, the custom function can be named "{{esc}}" and registered with Handlebars. Handlebars can invoke the custom function when processing JSON queries. The user can use the custom function when using templates in JSON queries. The custom function may verify that all values for templates are valid JSON values (e.g., string, number, object, array, boolean, null, etc.). The custom function can convert the value of templates to string format (e.g., using JSON stringify function). For example, {value: {{esc p1value}}} where p1.value is "a" (chars [a]) is evaluated to be {value: "a"}.

The system 400 can also create an additional custom function for string interpolation or for cases where the user wants to use another Handlebars helper (e.g., the join helper). The additional custom function can be a block helper; for example, it can be referred to as {{#esc}}{{/esc}} block helper. In one embodiment, the block helper can evaluate the templates within the block helper, take the result as one string, and convert the one string to string format. In other embodiments, Handlebars evaluates what is inside the block helper, and the helpers within the block helper can convert the result to string format. In certain embodiments, the block helper or helpers convert the result to string format (e.g., by calling JSON stringify function) for security. In one embodiment, JSON stringify function can be called on block helpers for security. Various embodiments described in this disclosure may be implemented separately or in combination as appropriate.

The system 400 may also define rules and features to be implemented in association with the custom function(s). In one example, for the path, the system 400 can require that values for templates are uniform resource identifier (URI) unreserved characters and are not periods. This can prevent the template value from going outside of the intended space in the path (e.g., intended directory). In some embodiments, the system 400 may not allow quotes around templates to avoid a string object from being closed accidentally. The system 400 may also require that all other non-block helpers are nested inside the {{esc}} helper or used inside the {{#esc}}{{/esc}} block helper.

At data flow action 2, the user writes a query in a panel using the custom function in order to write data to a data source 410. The system 400 can require users to use the custom functions when writing queries to write to a data source 410. For instance, the system 400 can return errors for queries that do not use the custom functions or do not use the custom functions properly.

At data flow action 3, the user runs the query. The user can associate the query with a query button panel. The user may run the query by clicking on the query button. The user system 420 can send the user query to the system 400.

At data flow action 4, the system 400 invokes the custom function to verify and process the parameters in the query. Upon receiving the user query from the user system 420, the system 400 can invoke the custom function on the query and format the query appropriately. If the processed query does not conform to the rules associated with the custom function, the system 400 can return an error.

At data flow action 5, the system 400 runs the query with the processed parameters to write to the data source 410. If the processed query is properly written and/or conforms to the rules associated with the custom function, the system 400 runs the query against the data source 410.

In certain embodiments, the system 400 also implements custom functions to verify parameters of queries for reading data. For example, the system 400 can create custom functions (e.g., Handlebars helpers) for verifying table names, column names, alias table names, alias column names, etc. In one embodiment, the system 400 creates Handlebars helpers "table," "column," and "alias" to make sure the table, column, or alias actually exists in the data sources 410. The system 400 can verify a table name or column name by checking that the table name or column name is within the schema of the database. The user can register the alias table name or column name, and the system 400 may verify an alias name by checking that it is registered.

Figure 5:
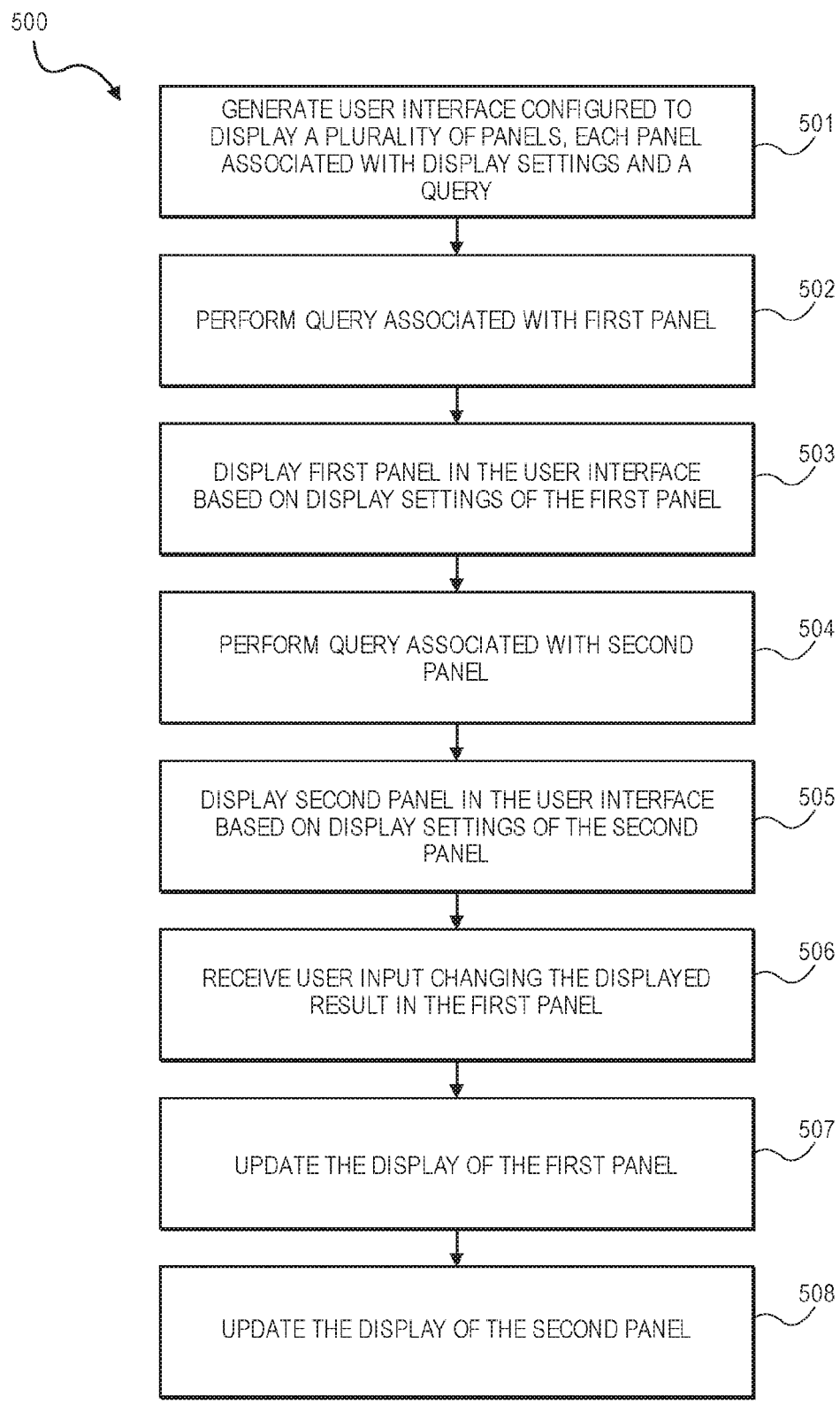
FIG. 5 illustrates a flowchart for creating and displaying dynamic panels in a user interface, according to certain embodiments.

FIG. 5 illustrates a flowchart for creating and displaying dynamic panels in a user interface, according to certain embodiments. The process 500 may be implemented by one or more systems described with respect to FIGS. 3 and 4. For illustrative purposes, the process 500 is explained below in connection with the system 300 in FIG. 3 and the example of FIG. 3A. Certain details relating to the process 500 are explained in more detail with respect to FIGS. 1-4. Depending on the embodiment, the process 500 may include fewer or additional blocks, and the blocks may be performed in an order that is different than illustrated.

At block 501, the system 300 generates a user interface configured to display a plurality of panels, each panel associated with display settings and a query. At block 502, the system 300 performs the query associated with a first panel. The first panel can be panel 310 in FIG. 3A.

At block 503, the system 300 displays the first panel in the user interface based on the display settings of the first panel. The query of panel 310 can be run to obtain the list of teams to display in panel 310. The list of teams can be displayed according the document CSS of panel 310. One team from the list of teams may be displayed in panel 310 as the default value. For example, panel 310 shows the first team in the list.

Similarly, the system 300 can perform the query associated with panel 320 and display panel 320 in the user interface based on the display settings of panel 320. One season from the list of seasons may be displayed in panel 320 as the default value. For example, panel 320 shows the most current season in the list.

At block 504, the system 300 performs the query associated with a second panel. The second panel can be panel 330 in FIG. 3A.

At block 505, the system 300 displays the second panel in the user interface based on the display settings of the second panel. The query of panel 330 can be run to obtain the list of games to display in panel 330. As explained above, the query of panel 330 obtains the list of games to display for the team selected in panel 310 and the season selected in panel 320. The list of games can be displayed according the document CSS of panel 330.

At block 506, the system 300 receives user input changing the displayed result in the first panel. For example, the user selects Team 1 from the list of teams in panel 310, and panel 310 is updated to show Team 1 as selected. The user selection is sent to the system 300.

At block 507, the system 300 updates the display of the first panel. If there are any changes to be made to panel 310, the system 300 can refresh panel 310, e.g., by rerunning the query and/or regenerating panel 310 through the template engine 350. In the example of FIG. 3A, panel 310 is a dropdown control, so the system 300 may not have to update panel 310.

At block 508, the system 300 updates the display of the second panel. Since the query of panel 330 links to panel 310, panel 330 is also updated to display games for Team 1 for the season selected in panel 320. For example, the query for panel 330 can be rerun. In this manner, linked panels can be updated dynamically.

Figure 6:
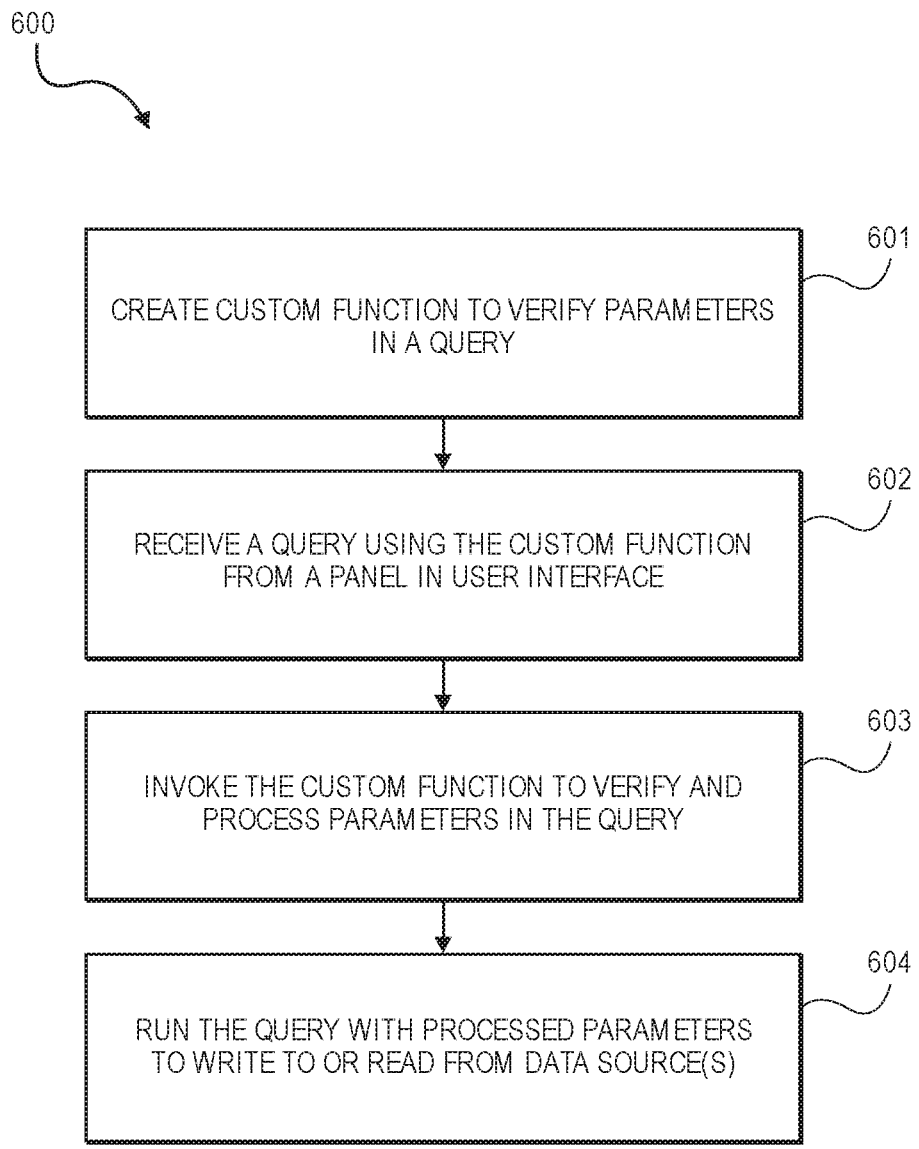
FIG. 6 illustrates a flowchart for writing to data sources using dynamic panels, according to certain embodiments.

FIG. 6 illustrates a flowchart for writing to data sources using dynamic panels, according to certain embodiments. The process 600 may be implemented by one or more systems described with respect to FIGS. 3 and 4. For illustrative purposes, the process 600 is explained below in connection with the system 400 in FIG. 4. Certain details relating to the process 600 are explained in more detail with respect to FIGS. 1-5. Depending on the embodiment, the process 600 may include fewer or additional blocks, and the blocks may be performed in an order that is different than illustrated.

At block 601, the system 400 creates a custom function to verify parameters in a query. The custom functions may be Handlebars helpers explained above, such as param helper, {{esc}} helper, {{#esc}}{{/esc}} block helper, etc.

At block 602, the system 400 receives a query using the custom function from a panel in the user interface. The user writes a query that uses the custom function.

At block 603, the system 400 invokes the custom function to verify and process parameters in the query. In one embodiment, the custom function replaces the parameters with respective placeholders and stores respective values corresponding to the parameters in an array. In another embodiment, the custom function changes respective values corresponding to the parameters to string format.

At block 604, the system 400 runs the query with the processed parameters to write to or read from the data source(s) 410.

FIGS. 7A-7C illustrate various examples of panels and features provided by a dashboard creation system, according to certain embodiments. FIG. 7A illustrates the alignment indicator feature for panels. As the user moves a panel within the user interface, other panels that line up with the panel being moved can be distinguished in the user interface to indicate that they are aligned. For example, the borders of the other panels can be highlighted, displayed in a different color, etc. In one embodiment, one or more guidelines appear to show that the panels are lined up (e.g., at one edge).

FIG. 7B illustrates the auto zoom feature for panels. When the finished user interface pages are displayed in the user interface, the user may resize the window of the user interface. In such case, the document and/or the panels in the user interface pages may be resized based on the width of the window. For example, if the window size is increased, the size of the document and/or the panels in the UI pages increase to fit the width of the window. Or if the window size is decreased, the size of the document and/or the panels in the UI pages decrease to fit the width of the window. This can be different from typical web pages where the content of the web pages remains the same regardless of whether the window of the browser is resized or not.

FIG. 7C illustrates another example of a panel 730. This panel may be referred to as a "card" panel since it includes one or more cards that can be selected. A card panel may refer to visualization of certain information within a card-like display. Either a single card or multiple cards can be selected, and the selections can be linked to other panels. In the example of FIG. 7C, different cards indicate a particular score combination for the outcome of a game. Users may sign up for a particular score combination in order to predict the outcome, and the user names are listed in the card they sign up for.

In certain embodiments, the user login information may be saved as global variables so that they can be accessible within the document. The user login information can include the group, email address, name, etc. of the user. The user login information may be used in queries, for example, to check permissions, etc.

Dashboard Creation Application

The system for providing a plurality of dynamic panels in a user interface as explained above may also be referred to as a "Dashboard Creation Application." The Dashboard Creation Application (DCA) can be an extensible WYSI-WYG (What You See Is What You Get) web application for quickly and easily creating interactive, data-driven web pages. For example, the Dashboard Creation Application can easily create interactive dashboards which support light-weight filtering and drill-down operations on top of arbitrary data storage systems or data sources.

In one embodiment, the Dashboard Creation Application enables analysts to author dashboards of visualizations for easy consumption by end users. It will provide a number of panels like charts, tables, and images, in a pluggable architecture so analysts can add custom panels for particular deployments. For example, a standard plug-in structure can be used across systems and products. Panels will be interactive and coordinated, and support filtering/aggregations to create drill-down style analysis. The dashboard author will have fine control over the layout and styling of the panels contained in each Dashboard Creation Application dashboard. The Dashboard Creation Application will be deployable on top of any collection of other products for presentation and dashboarding use cases because it is agnostic to the underlying data store.

In various embodiments, the Dashboard Creation Application may perform one or more of the functions noted below:
  Create dashboards which use Elasticsearch or SQL data sources
  Add chart, table, text, dropdown, map, multi-select, etc. panels to dashboards
  Create custom panels
  Create basic links between panels
  Move and resize panels via the UI
  Edit the query template associated with a panel through the UI
  Create/manage new documents through the UI
  Flexibility around which portions of a JSON response can be accessed and used as data for the panels
  Share a pool of queries/variables across all panels to make it easier to build dashboards
  Abstracting out features across backends into the "basic" or "beginner" UI In some embodiments, the Dashboard Creation Application integrates closely with other products so that more use cases can be covered by combining the tools appropriately. The numbers and types of users reached can be increased by improving the usability and expressiveness of the UI available to end users for building dashboards. In various embodiments, the Dashboard Creation Application may implement one or more of the functions noted below:
  Expansion of the formatting UI—users can make very specific visual edits to the panels through the UI
  Filters and/or panels from other applications or web-based applications can be dropped into and used inside Dashboard Creation Application.

Example Implementation Mechanisms

Figure 8:
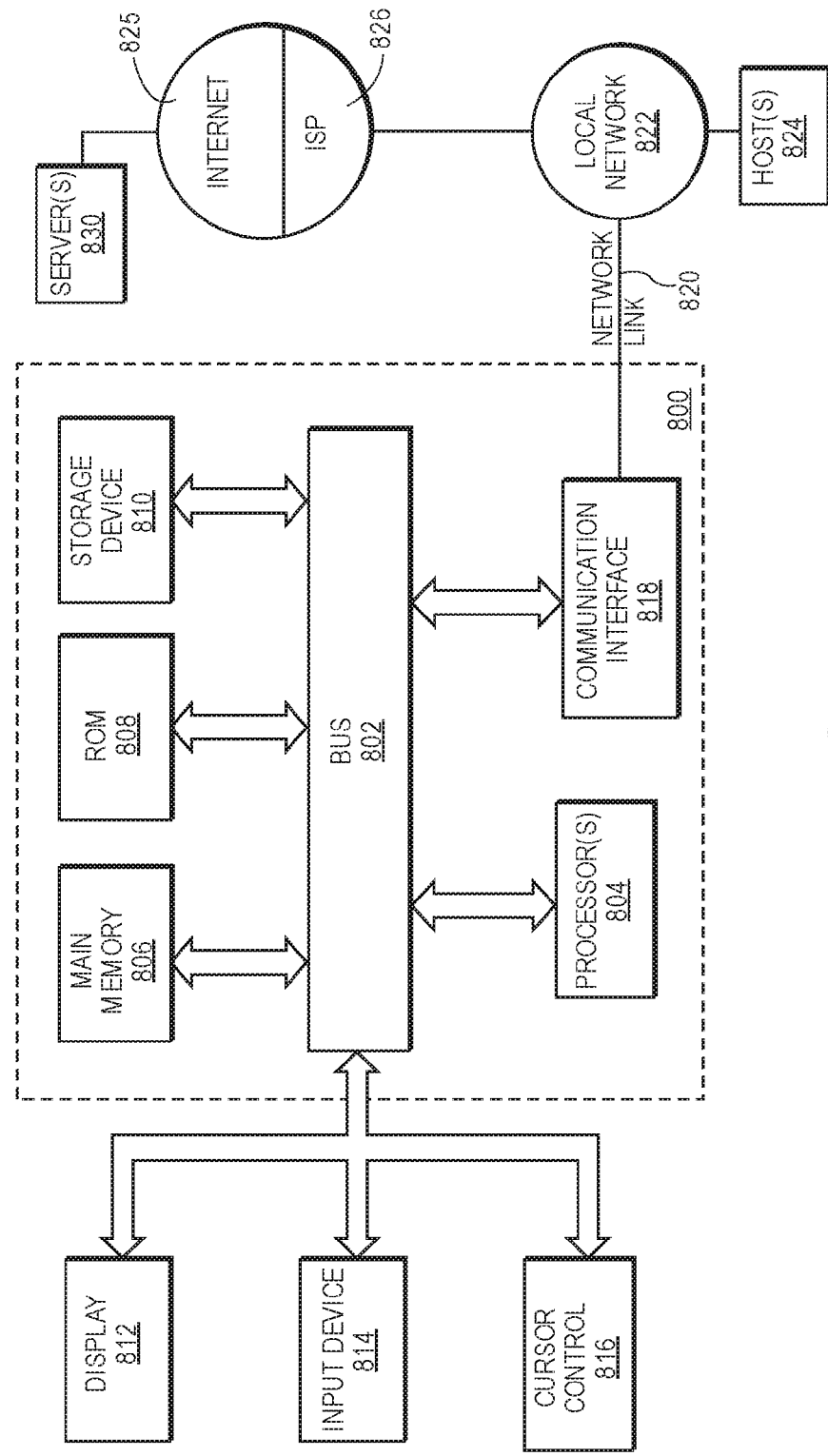
FIG. 8 illustrates a computer system with which certain methods discussed herein may be implemented.

For example, FIG. 8 shows a block diagram that illustrates a computer system 800 upon which an embodiment may be implemented. For example, the computing system 800 may comprise a system for providing a plurality of dynamic panels in a user interface. Other computing systems discussed herein may include any portion of the circuitry and/or functionality discussed with reference to system 800. For instance, the system 300 and/or 400 can each include some or all of the components and/or functionality of the system 800.

Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as executable software codes that are executed by the computing device(s).

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hardwired circuitry may be used in place of or in combination with software instructions.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicate with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 825. Local network 822 and Internet 825 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 825, ISP 826, local network 822 and communication interface 818.

The received code may be executed by processor 804 as it is received, and/or stored in storage device 810, or other non-volatile storage for later execution.

Example Dashboard Creation System

Figure 9:
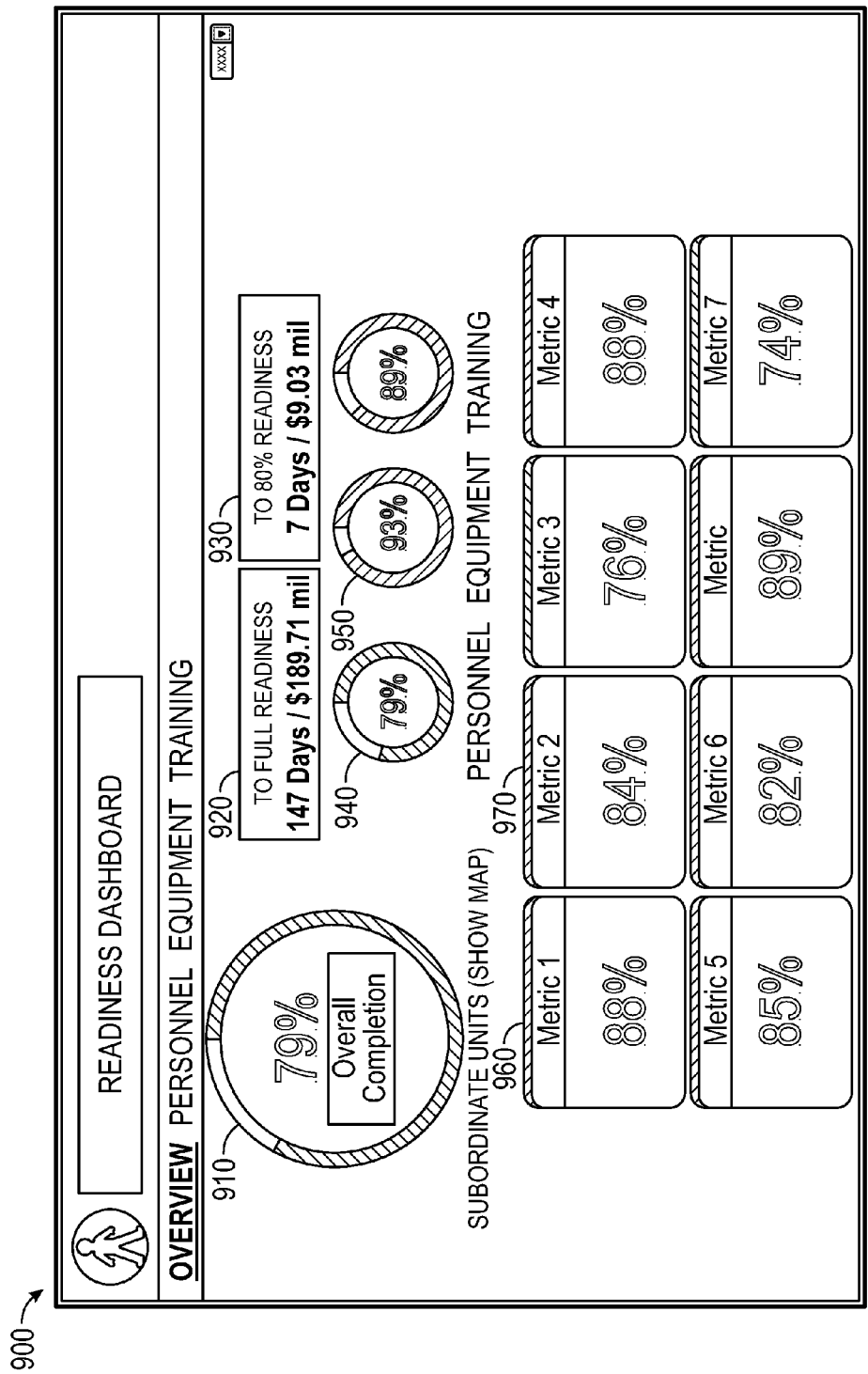
FIG. 9 illustrates one embodiment of a user interface comprising dynamic panels for displaying results of queries performed on one or more data sources.

FIG. 9 illustrates one embodiment of a user interface 900 comprising dynamic panels for displaying results of queries performed on one or more data sources. Panels 910, 920, 930, 940, 950, 960, and 970 are some examples of different types of panels that can be included in the user interface 900. Panels 910, 940, and 950 show progress as a bar and as a percentage. Panels 920 and 930 show countdown progress as a number of days and as budget remaining. Panels 960 and 970 show the progress of certain metrics as percentages.

Like the panels described with respect to FIG. 1, the panels in FIG. 9 can be linked to one or more other dynamic panels. The panels in FIG. 9 can also output data to other panels, are associated with query code for retrieving data, output a visualization based on the queried data and selected display settings, and update when the underlying data changes. Furthermore, in addition to the panels being associated with query code, the panels can use one or more variables, be defined with one or more styles, have a number of HTML or CSS properties, be dependent on data from other panels, or output data used by other dependent panels.

Figure 10:
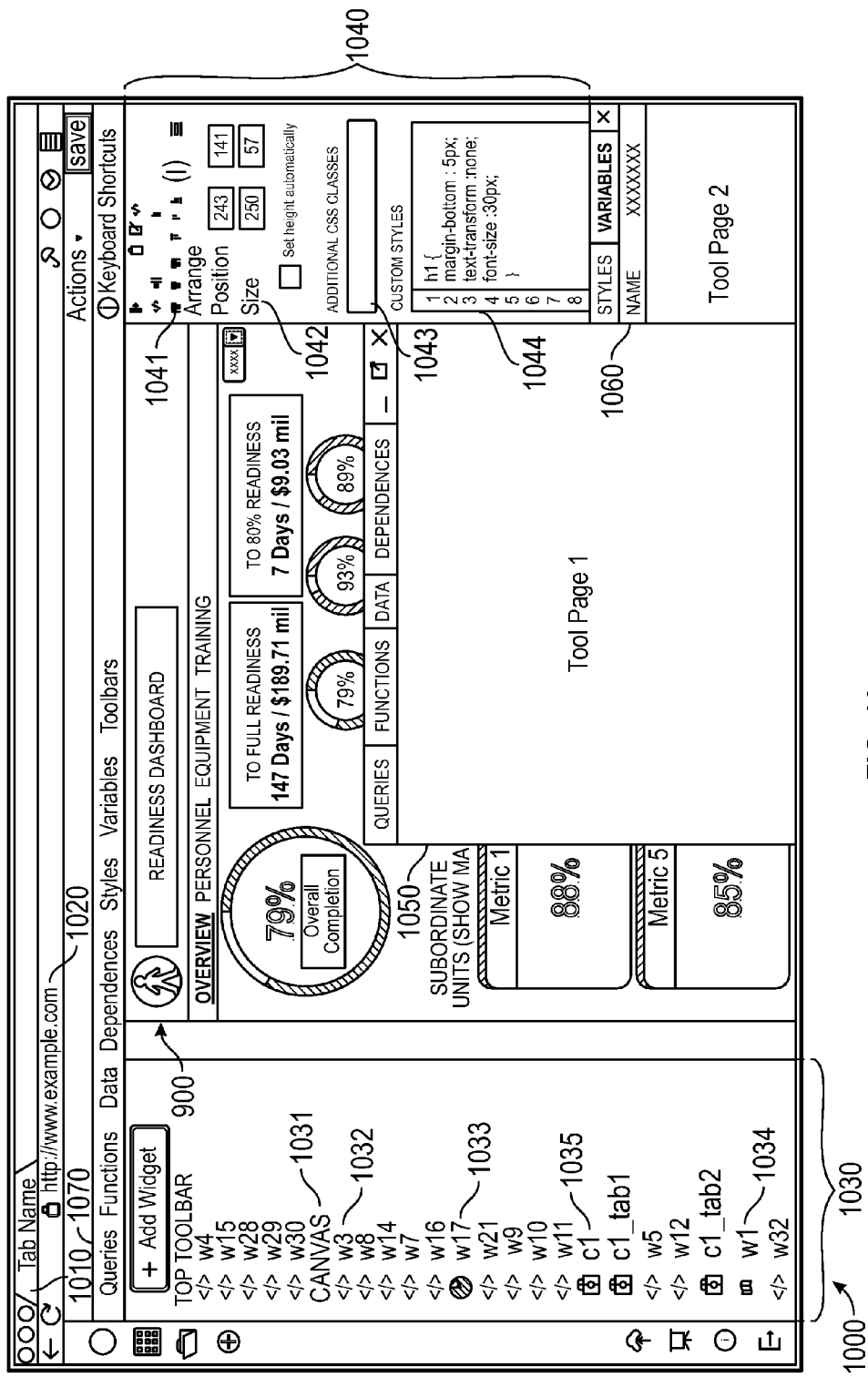
FIG. 10 illustrates one embodiment of a user interface of a dashboard creation system comprising dynamic panels for displaying results of queries performed on one or more data sources with editing tools.

FIG. 10 illustrates one embodiment of a user interface 1000 of a dashboard creation system comprising dynamic panels for displaying results of queries performed on one or more data sources with editing tools. FIG. 10 includes the user interface 900 from FIG. 9 in a dashboard creation system with tool pages 1030, 1040, 1050, and 1060 in a browser 1010. The example embodiment of FIG. 10 shows other embodiments for displaying a number of elements shown and discussed with respect to FIGS. 2A-2D.

The user interface 1000 can be accessed as a through a browser or as a standalone program. As shown in FIG. 10, the example user interface 1000 is accessed in a browser 1010 by accessing a website address 1020. In some embodiments, the user interface 1000 can be accessed through a local program, which can be helpful for using the dashboard creation system when internet access is not available. A toolbar 1070 at the top of the page includes buttons to access tool pages related to queries, functions, data, dependencies, styles, variables, and other toolbars. In some embodiments, the tool pages can be shown as standalone pages or as tool pages overlaid on top of interfaces (for example, FIG. 2B shows a query page 220 while FIG. 2C shows a global variables page 230 as a tool page overlaid on top of main page 210). Although FIG. 10 shows tool pages 1030, 1040, 1050, and 1060 beside or overlaid on user interface 900, different embodiments may also show the tool pages as separate pages.

Tool pages 1050 and 1060 include tabs indicating the type of tool pages that are available. Tool page 1050 includes tabs for queries, functions, data, and dependencies. Tool page 1060 includes tabs for styles and variables.

The user interface 1000 also includes tool pages 1030 and 1040 in column format along the left and right sides of the user interface 900. Tool page 1030 includes a number of selectable interface elements such as layout group 1031, coded element 1032 indicated by a "</>" tag icon, visualization 1033 indicated by a pie chart icon, map 1034 indicated by a map icon, and other types of elements 1035 indicated by other icons. Tool page 1030 can include the structural divisions of main page 900, including structural divisions for the header, body, comments, tables, paragraphs, div, etc., and elements listed in tool page 1030 can be nested to reflect those structural divisions. Tool page 1040 includes multiple icons 1041 for alignment and fields 1042 for arrangement. Tool page 1040 can also include CSS associations 1043 and custom styles 1044 where a style can be defined for any element or group of elements on a page. The icons 1041, fields 1042, CSS associations 1043, and custom styles 1044 can be interacted with to cause properties to change in the coding of the user interface 900, such as in the HTML, CSS, or script coding.

The document of FIG. 9 can be easily created and edited using the interface shown in FIG. 10. Querying documents, interacting with variables, defining styles, formatting element layouts, and displaying queried data can require technical skills including programming in database languages such as SQL and other languages JSON, XML, HTML, CSS, Javascript, as well as graphic design skills. However, the panels provide a template that already incorporates much of the technical backbone so that users do not need in-depth technical skills. Properties of panels manipulated in the tool pages automatically generate the corresponding code, greatly simplifying the document development process. Fields still provide the ability to manipulate panels by code-level edits.

Example Tool Pages

Figure 11C:
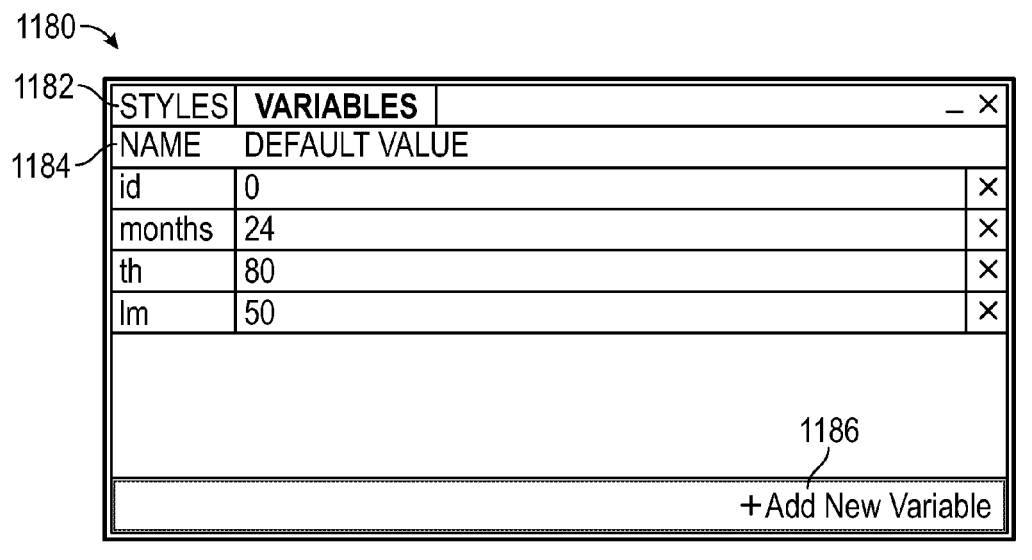

FIGS. 11A-11C illustrates embodiments of user interfaces of a dashboard creation system for creating a dynamic panel. The user interfaces in 11A-11C can be overlaid on top of other interfaces. For example, the user interfaces in 11A-11C, 12-16, and 19-20 can be displayed as tool pages 1050 and 1060 in FIG. 10. In some embodiments, the user interfaces 11A-11C are displayed as standalone pages.

The user interface in FIG. 11A shows a query page 1100 that allows a user to enter and edit a query associated with a panel. Query page 1100 can appear when the user clicks on the query link in the toolbar 1070 of FIG. 10 or on the query link in the toolbar 1101 at the top of the query page 1100 of FIG. 11A. The query page 1100 can display a list of queries 1102. The queries in the list of queries 1102 can be queries that are stored in a database and can be reused across different panels and different documents. A user can select a query from the list of queries or create a new query by clicking a button 1104. The query page 1100 can also include a code section 1106 for entering the query and a preview section 1108. The user may update or delete any query from the query page 1100. Selecting a query from the list of queries 1102 can cause the code section 1106 to show the code associated with that query. Selecting a panel (such as panels 910, 920, 930, 940, 950, 960, and 970 of FIG. 9) can cause the query associated with the selected panel to be displayed in the code section 1106. The query may read from or write to one or more databases that can be selected from database dropdown list 1112, which can auto-populate with a list of available databases and databases referenced by any of the queries in the query list 1102. The example database selection in the database dropdown list is SQL Database 1. A run button 1114 can be clicked to execute the query. In some embodiments, the run button 1114 can execute the query selected in the list of queries 1102 or displayed in code section 1106 along with any dependent queries. A preview section 1108 shows a preview of results of the execution of the query in code section 1106. An update button 1116 can update the query or the output when clicked and also indicated if the query or output is updated. Clicking the update button can also cause variables, panels, widgets, and functions that depend on the edited query to also update. Determining the dependent relationships is further discussed with respect to other figures such as FIG. 12. A button 1118 can also be provided to include partials, which are parts of reusable code.

The user interface in FIG. 11B shows a function page 1140 that allows a user to enter and edit a function. Function page 1140 can appear when the user clicks on the function link in the toolbar 1070 of FIG. 10 or on the function link in the toolbar 1101 at the top of the function page 1140 of FIG. 11B. The function page 1140 can display a list of functions 1142. The functions in the list of functions 1142 can be functions that are stored in a database and can be reused across different queries and different documents. A user can select a function from the list of queries or create a new function by clicking a button 1144. The function page 1100 can also include a code section 1146 for entering the function and a preview section 1148. The user may update or delete any function from the function page 1100. Selecting a function from the list of functions 1142 can cause the code section 1146 to show the code associated with that function. Selecting function code used in a query can provide an option to display the function code in code section 1146. The function shown in the code section 1146 can be written in a template syntax that is different from the language of the query shown in code section 1106. A run button 1150 can be clicked to execute the function. In some embodiments, the run button 1150 can execute the function selected in the list of functions 1142 or displayed in code section 1146 along with any queries that are dependent on the function. A preview section 1148 shows a preview of the function's output. An update button 1152 can update the function or the output when clicked and also shows a checkmark to indicate if the function successfully runs on a page load. An "X" or other indicator can show when the function fails to successfully run.

The user interface in FIG. 11C shows a variables page 1180 that allows a user to view and edit variables, similar to the global variables page 230 of FIG. 2C. Variables page 1180 can appear when the user clicks on the variables link in the toolbar 1070 of FIG. 10 or on the variables link in the toolbar 1182 at the top of the variables page 1180 of FIG. 11C. The function page 1180 can display a list of variables 1184 and the value of the variables. The variables in the list of variables 1142 can be local variables. In some embodiments, the variables in the list of variables 1142 can be global variables that can be reused across different queries. In some embodiments, the variables in the list of variables 1142 can be global variables that can be reused across different documents. A user can create a new variable by clicking a button 1186. Selecting a variable used in a query or function can provide an option to display the variable in variable page 1180.

The tool pages shown in FIG. 11A to 11C provide helpful, code-level editing tools. This way, documents can be edited and scripted at code-level details so that technically skilled document developers are not limited to templated functionalities.

Example Dependency Tool Pages

Figure 12:
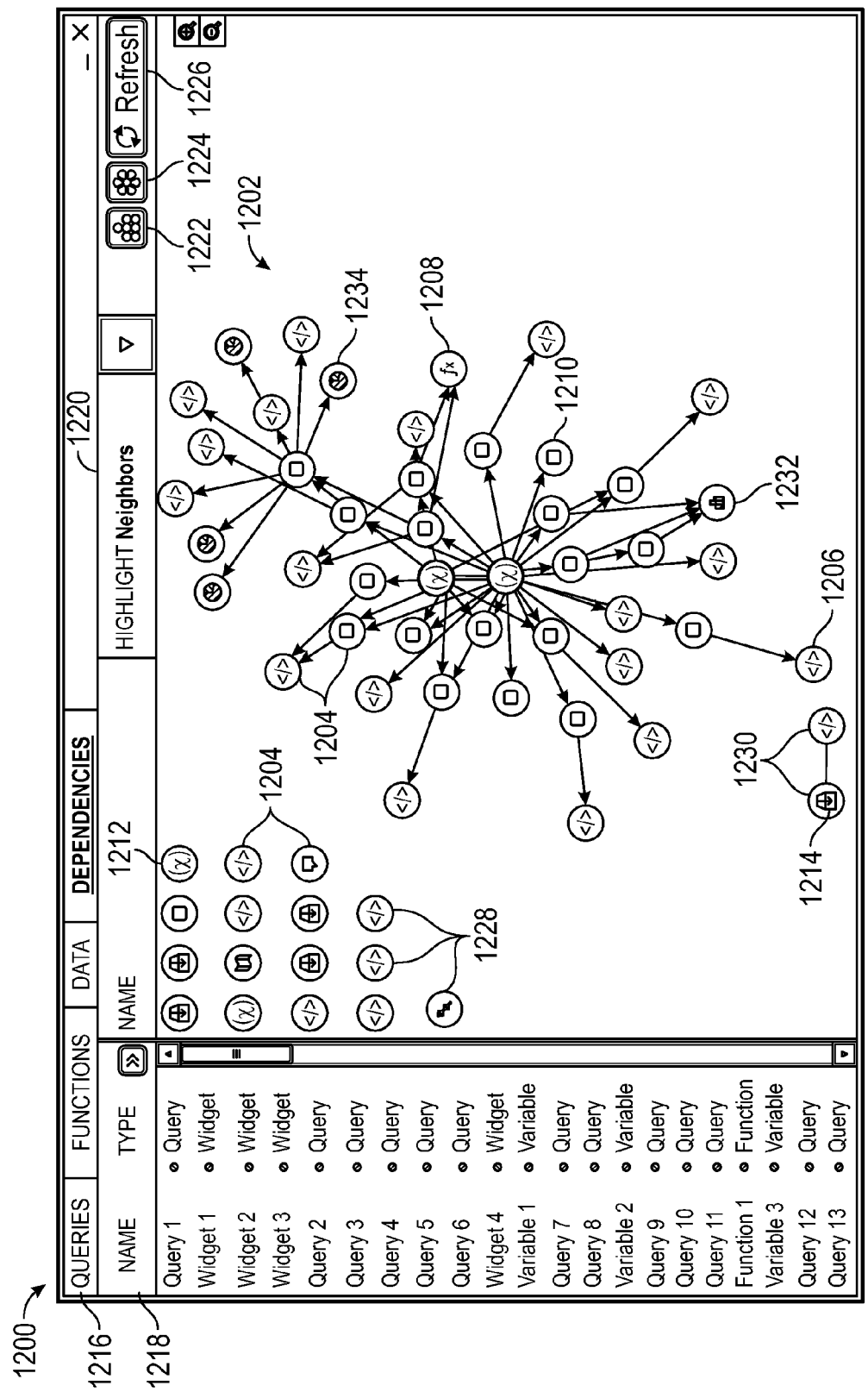
FIG. 12 illustrates one embodiment of a user interface comprising a visual indication of dependencies.

FIG. 12 illustrates one embodiment of a user interface comprising a visual indication of dependencies. The user interface shows a dependency page 1200 that shows visualization 1202 of dependencies of, or relationships among, queries, functions, variables, widgets, and/or the like. As used herein, a first element is "dependent" on a second element if the first element cannot be executed, completed, or known until the second element is known, completed, or executed and provided to the first element. For example, a panel configured to show the sum of a variable value added to a number queried from a database is dependent on both the variable and the query result.

The graphical visualization is shown as a layout of graphical nodes (e.g., icons, shapes, etc.). As used herein, the term "node" is a broad term that encompasses its ordinary and customary meaning, and includes but is not limited to any representation or indication of a data item (e.g., an element) or a group of data items. For example, the term "node" may refer to any type of graphical representation of a data item, e.g., as shown in the visualization 1202. In another example, the term "node" may refer to any type of logical representation of any data item, e.g., a digital representation of a data item as stored in a database or otherwise stored in a computer readable storage medium. The nodes can be connected by one or more edges (which may be directional or not). Accordingly, the visualization 1202 comprises a visual representation of a type of mathematical graph. Thus, the dependency visualization 1202 may also be referred to as a "dependency graph" or simply a "graph."

The nodes in the graph 1202 are represented as icons 1204 with arrows (or edges) indicating the direction of dependencies. As used herein, the term "edge" is a broad term that encompasses its ordinary and customary meaning, and includes but is not limited to any representation or indication of a relationship or reference link among two or more nodes (e.g., two or more elements or groups of elements). For example, the term "edge" may refer to any type of graphical representation of a relationship or dependency between two nodes, e.g., as shown in the visualization 1202. In another example, the term "edge" may refer to any type of logical representation of a relationship among two or more nodes, e.g., a digital representation of a relationship among two or more nodes (e.g., data items) as stored in a database or otherwise stored in a computer readable storage medium.

The different icons represent different elements of a document, similar to the icons shown in FIG. 10. The dependency page 1200 in FIG. 12 can include icons for coded elements 1206 such as widgets, functions 1208, queries 1210, variables 1212, and packages 1214. The icons can be color coded. For example, the widget icons 1206 can be blue, the function icons 1208 can be yellow, and the variable icons can be purple. Icons can further be broken down to show subtypes. For example, icon 1206 can be a blue circle with "</>" to show a widget, icon 1232 can be a blue circle with a bar graph to show a bar graph widget, and icon 1234 can be a blue circle with a pie chart to show a pie chart widget. Some elements in a document have neither upstream nor downstream dependency. Several icons 1228 shown in the top left corner have no dependent arrows because the elements underlying the icons are independent and have no downstream dependencies. Some groups of elements in a document can have a separate dependency chain. Icons 1230 show a small dependency chain separate from the main web.

Dependency page 1200 can appear when the user clicks on the dependency link in the toolbar 1070 of FIG. 10 or on the dependency link in the toolbar 1216 at the top of the dependency page 1200 of FIG. 12. The dependency page 1200 can display a list of elements 1218 included in the graphical visualization 1202. The list 1218 can show both the name and type of element. In some embodiments, a user can select an element in either the list 1218 or the visualization 1202 to show or highlight the element in the other of the list 1218 or the visualization 1202. In some embodiments, selecting an element in either the list 1218 or the visualization 1202 will show or highlight the element in a different user interface. For example, selecting a panel in the list 1218 or panel icon in the visualization 1202 can bring up panel 910 for display in the user interface 900 of FIG. 9 or FIG. 10 or bring up a query and query code associated with the selected panel in a query page 1100 of FIG. 11A. As another example, selecting a variable in the list of elements 1218 or a variable icon in the visualization 1202 can cause a variable page 1180 to display or highlight the selected variable. As another example, selecting a query in the list of elements 1218 or a query icon in the visualization 1202 can cause a query page 1100 to display the code of the selected query. As another example, selecting a variable in the list of elements 1218 or a variable icon in the visualization 1202 can cause a query page 1100 to display where in the query the code the selected variable is used.

Figure 13:
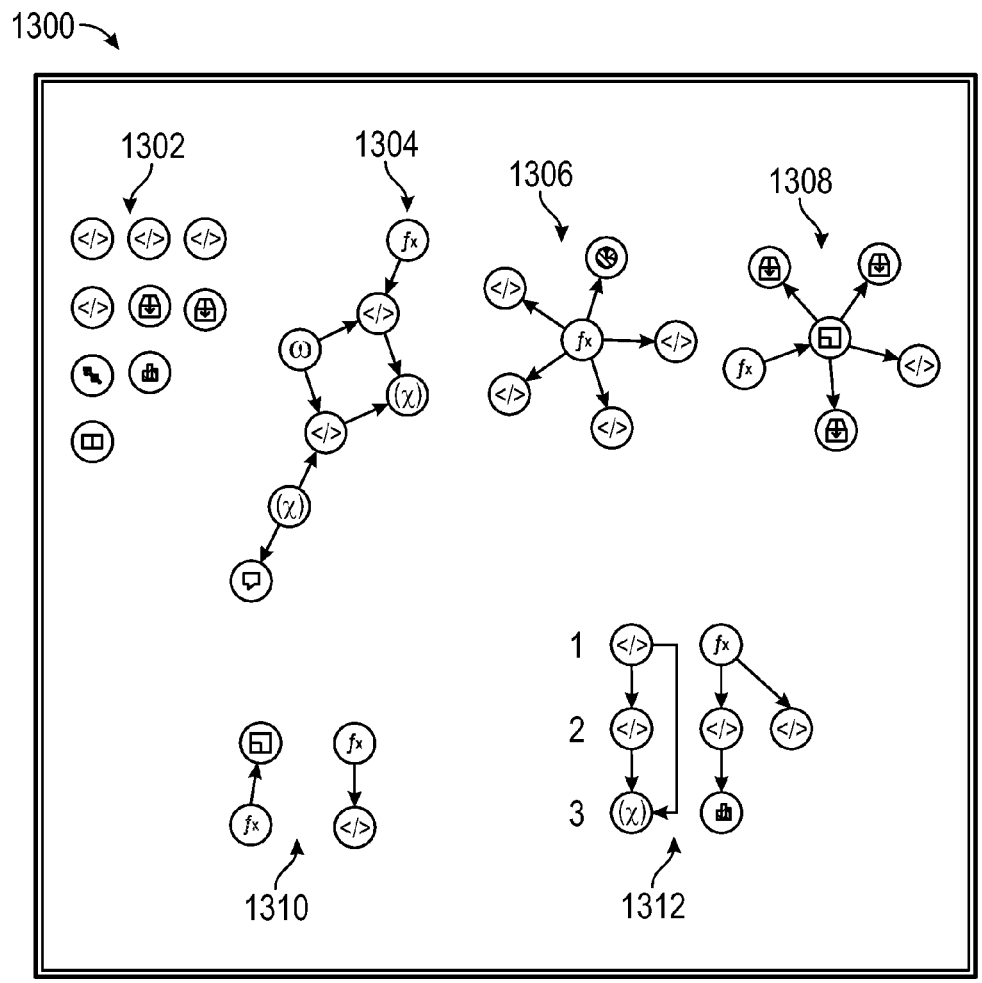
FIG. 13 illustrates embodiments of visual indications of dependencies.

The example dependency page also includes a dropdown menu 1220, a hierarchy view button 1222, a web view button 1224, and a refresh button 1226 along the top. The dropdown menu 1220 allows certain features to be highlighted in the visualization 1202 and is further described with respect to FIGS. 14 and 20. Clicking the hierarchy view button 1222 causes the icons in the visualization 1202 to display in an arrangement according to levels of dependency depth, with independent elements in a first area, elements with one level of dependency in a second area (such as below the first area), and so on. An example hierarchy is shown in FIG. 13. Clicking the web view button causes the icons in the visualization to display in the web-like arrangement shown in FIG. 12. In the web view, icons of the lowest level dependencies extending out as a chain of icons from icons of upstream elements. The refresh button can be clicked to re-determine dependencies and update the visualization 1202.

Figure 20:
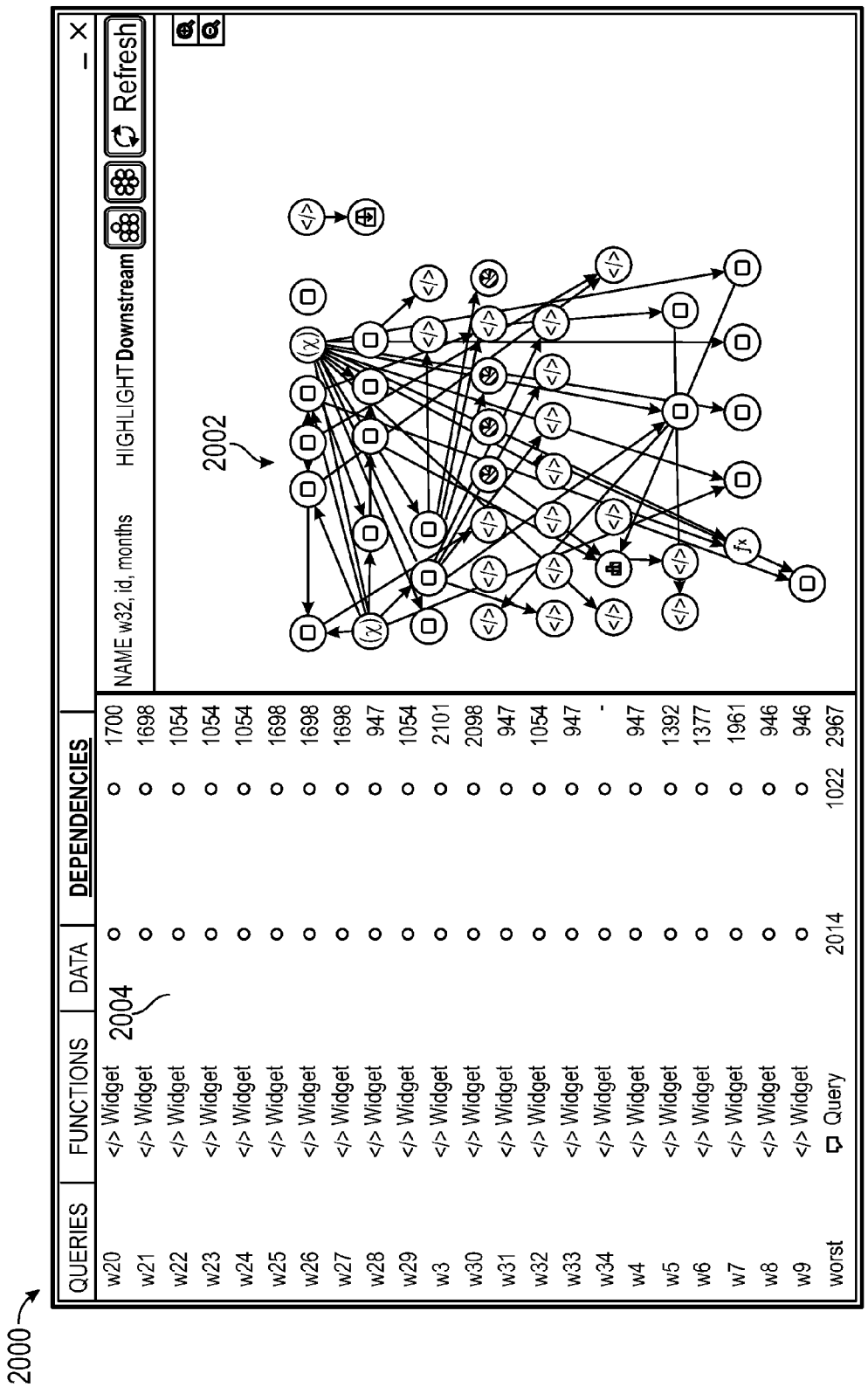
FIG. 20 illustrates one embodiment of a user interface comprising a visual indication of dependencies and a table of execution times.

The visualization 1202 can be generated, at least in part, based on the way that queries are linked to other elements. For example, in some embodiments, variables in a query are coded with a template syntax such as Handlebars or Mustache. A custom function written in the language of the template syntax can be used to link the dependencies, such as a query and a variable. For example, the user creates a query as follows: UPDATE table SET text="newText" WHERE id={{p1.text}}. The function can extract the dependency of the parameter inside of the {{ }} and link the query with p1.text using Handlebar helpers. Accordingly, in some embodiments, a custom Handlebar can be used to determine some dependencies of an underlying language, such as SQL, without needing to execute the underlying SQL code. In some embodiments, the graph is drawn with SVG and managed with D3.js or any library that manages markup. In some embodiments, the layout can be generated as a force directed graph. In some embodiments, the layout or positioning of the nodes uses WebCola and Darge libraries. In some embodiments, the layout can be generated by assigning a "charge" to each node that is used to calculate a repulsion force from other nodes. Nodes in the layout can be iteratively moved until the repulsion forces are balanced and the nodes are settled. In some embodiments, the layout is initially generated as a web of connected nodes, and nodes with the most connections are identified as central nodes. Nodes other than the central nodes can be moved around in each iteration. In some embodiments, unconnected nodes can be identified, grouped, and arranged in a separate area of the layout. In some embodiments, a hierarchical layout (for example, as shown in FIG. 20) can be generated by identifying the most connected nodes as central nodes, and arranging the central nodes toward a first position. The remaining nodes can be iteratively positioning away from the first position. The least connected nodes, nodes with the fewest downstream dependencies, and/or nodes that are most indirectly connected to the central nodes can be laid out toward a second position or direction that is farthest from the first position. In some embodiments, nodes can be arranged according to upstream dependencies. In some embodiments, the length of an edge between a first node and a dependent node can reflect an amount of time needed to execute the dependent node after the first node's dependency is provided. In some embodiments, the factors used to in determining layout or edge length can be used to determine the charge strength assigned to a node.

The dependency information can be stored and updated as the queries, panels, variables, and functions change. This stored dependency information can be used, as described in further detail with respect to other figures, to partially refresh parts of documents affected by changes without needing to refresh parts of documents unaffected by changes. This stored dependency information can also be used to determine options for populating autocomplete fields.

FIG. 13 illustrates embodiments of visual indications of dependencies. Dependency visualization area 1300 shows different arrangements of icons as visualizations of dependencies. Visualization group 1302 shows icons without interconnection arrows because elements underlying the icons have no upstream or downstream dependencies. Visualization groups 1304, 1306, and 1308 show different variations of visualization webs. Visualization group 1310 shows two, two-icon dependency webs. Visualization group 1312 shows a hierarchical view of dependency icons. The icons in the $2^{nd}$ layer of the hierarchy have at least one dependency to an icon in the $1^{st}$ layer. The icons in the $3^{rd}$ layer have at least one dependency to an icon in the $2^{nd}$ layer.

Figure 14:
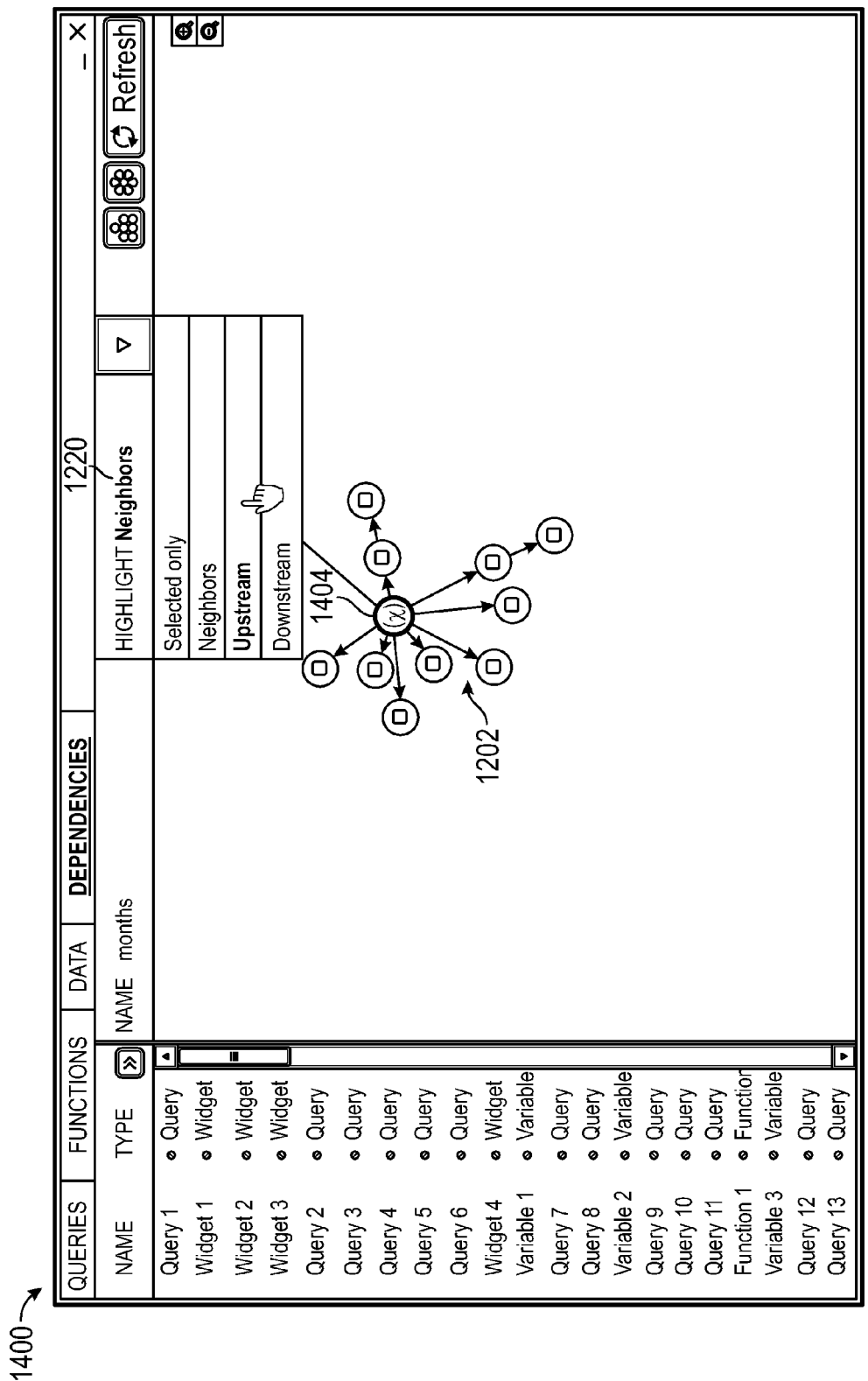
FIG. 14 illustrates one embodiment of a user interface comprising a visual indication of dependencies.

FIG. 14 illustrates one embodiment of a user interface comprising a visual indication of dependencies. FIG. 14 shows the effects of making sub-selections using the dropdown menu 1220 of FIG. 12. The user interface shows a dependency page 1400 that shows visualization 1202 after making a sub-selection of dependencies. Icon 1404 is selected in the visualization 1202. In the dropdown menu 1220, the option "Neighbors" is selected. In response, the visualization updates so that only the icons that are neighbors of the selected icon 1404 are shown. In some embodiments, all of the visualization 1202 is visible, but the neighbors are emphasized or highlighted. Other selections can be made to show or highlight upstream dependencies, downstream dependencies, or only selected icons. Other selections can be made to show only certain types of elements (e.g., only queries and variables).

The dependency visualization can be used to identify the longest dependencies and visualize dataflow. Based on this visualization, dataflow can be restructured so that documents load faster. Long dependency chains can be identified, and code can be rewritten so that elements are loaded in parallel instead of in sequence. The longest loading elements can be prioritized and coded to begin loading earlier. Furthermore, dependency data can be stored as dependency information. The dependency information can be referenced when changes are made to a document and the output of the document is refreshed. By referencing the dependency information, only elements dependent on changes can be refreshed, resulting in faster refresh times.

Example Tool Pages

Figure 15:
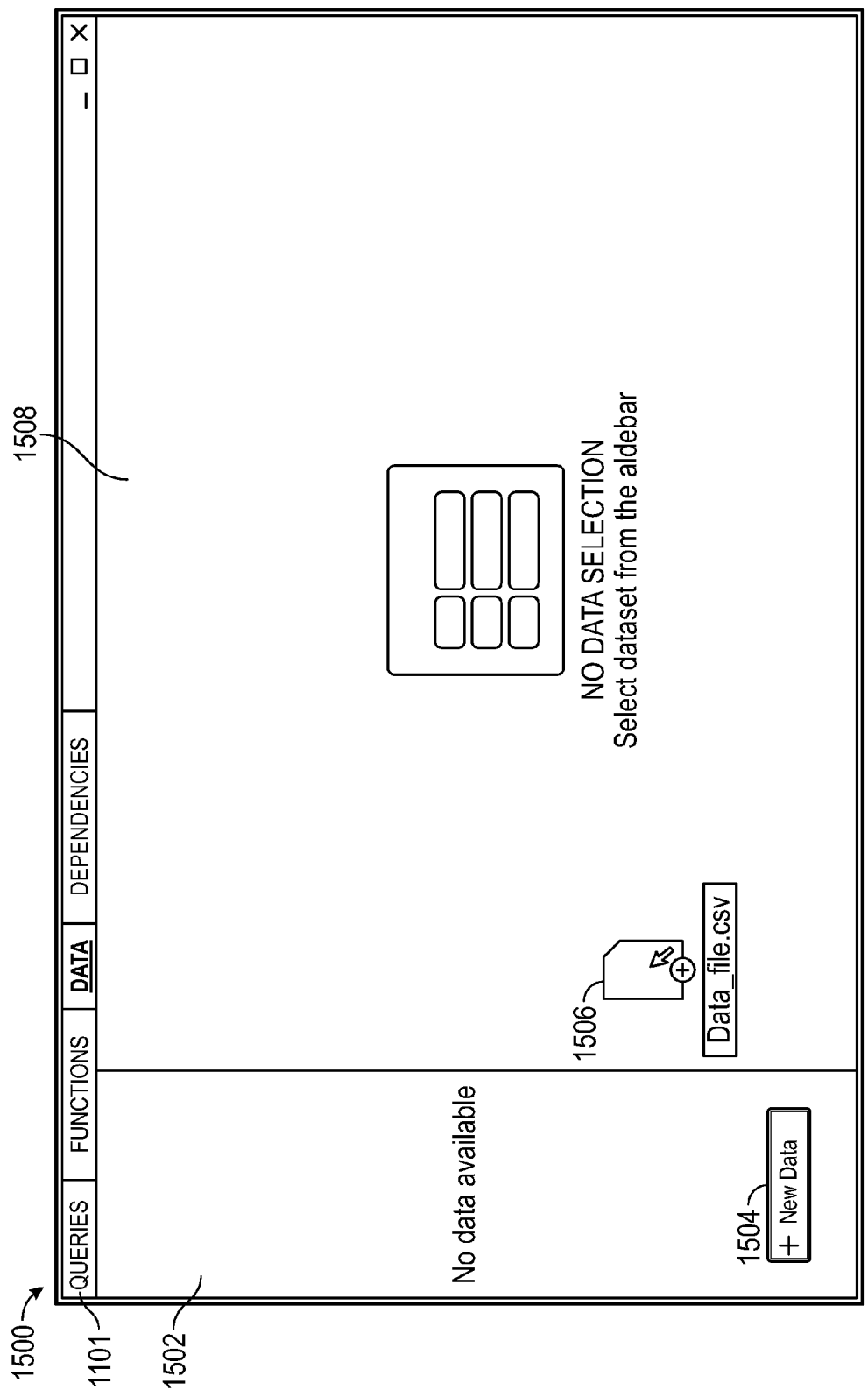
FIG. 15 illustrates one embodiment of a user interface for configuring a dataset.

FIG. 15 illustrates one embodiment of a user interface for configuring a dataset. The user interface in FIG. 15 shows a data page 1500 that allows a user to provide a local dataset. Data page 1500 can appear when the user clicks on the data link in the toolbar 1070 of FIG. 10 or on the data link in the toolbar 1101 at the top of the data page 1500 of FIG. 15. The data page 1500 can display a list 1502 of available datasets. The datasets in the list of datasets 1502 can be datasets that are stored on a local machine instead of being accessed through a network. Accessing a local dataset can allow users to test out code on various datasets without needing to configure a network connection and without needing to access remote databases. This way, a database can continue to be used while local data is experimented with. A user can select a dataset from the list 1502 of datasets or import a new dataset from a file by clicking a button 1504. Users can edit the data using the data page 1500 to see its effect on a user interface, such as user interface 900 of FIG. 9, without needing permissions to write data to or overwrite data on a database and without disturbing the database that might be in use. Alternatively, a user can drag and drop a file 1506 into the data page 1500. The data page 1500 can also include a preview section 1508. The user may update or edit any data from the data page 1100. Selecting a dataset from the list of datasets 1502 can cause the preview section 1508 to show the data contained within the dataset.

When remote databases are accessed, user permissions or authentication can be required. Queries to databases can access databases if appropriate permissions or credentials are configured. Examples of Access Control Lists and ACL features, and systems for generating ACLs as described herein, may be found in U.S. Pat. No. 8,527,461 entitled "CROSS-ACL MULTI-MASTER REPLICATION" filed Nov. 27, 2012, U.S. Pat. No. 8,688,749 entitled "CROSS-ONTOLOGY MULTI-MASTER REPLICATION" filed Mar. 31, 2011, U.S. Pat. No. 9,081,975 entitled "SHARING INFORMATION BETWEEN NEXUSES THAT USE DIFFERENT CLASSIFICATION SCHEMES FOR INFORMATION ACCESS CONTROL" filed Oct. 22, 2012, and U.S. Pat. No. 8,838,538 entitled "TECHNIQUES FOR REPLICATING CHANGES TO ACCESS CONTROL LISTS ON INVESTIGATIVE ANALYSIS DATA" filed Jul. 31, 2013, the entire disclosure of each of which is hereby made part of this specification as if set forth fully herein and incorporated by reference for all purposes, for all that it contains.

FIG. 16 illustrates one embodiment of a dataset shown in a user interface 1600. FIG. 16 shows the data page 1500 after data is loaded from the file 1506. Once imported, queries can be run against the dataset. The list of datasets 1502 includes the first set of imported data. The preview section 1508 shows the data contained within the data file 1506. Add column button 1610 can be clicked to add a column of data to the data set, and the add row button 1612 can be clicked to add a row of data to the data set. The upload button 1614 can be clicked to upload the dataset to the document itself, to a remote computer, or to a remote database. In embodiments where the upload button 1614 is clicked to upload the dataset to the document itself, the dataset can be stored in JSON as part of the document. The refresh button 1616 refreshes the displayed data based on any changes to the underlying source.

In some embodiments, the user interface 1600 can show data retrieved from a database. A name of the data or the database can be listed. When the name is selected, the data can be displayed in the user interface. A list of the available data from databases and from local sources can allow different sources of data to be selected and used. In some embodiments, local data can be edited or renamed, and queries can be directed to execute on the local data or locally edited database data instead of an original target of the query. Data that is locally edited can be uploaded to the document, a database, or a remote server by pressing the upload button 1614. In conjunction with using local data as shown in FIG. 16, the dashboard creation system can be run as an executable or downloaded file instead of being run through a web browser. By using a local executable dashboard creation system and local data files, no internet access is needed.

Figure 17:
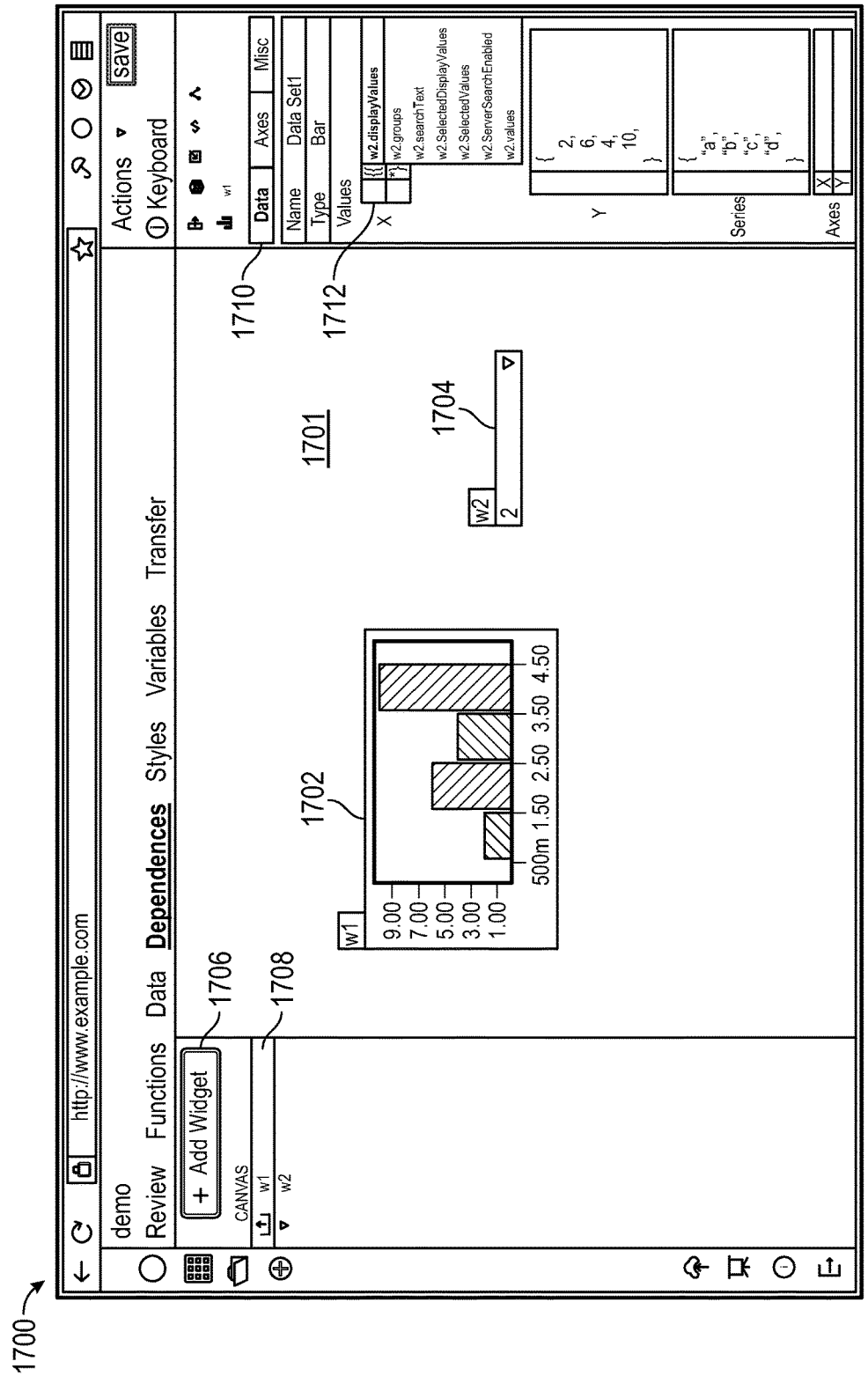
FIG. 17 illustrates one embodiment of a user interface comprising dynamic panels for displaying results of queries performed on one or more data sources with editing tools.

FIG. 17 illustrates one embodiment of a user interface comprising dynamic panels for displaying results of queries performed on one or more data sources with editing tools. The user interface 1700 shows a dashboard creation system with tool pages and a preview of a main page 1701. The main page 1701 includes a first panel 1702 named w1 that shows a bar graph representation of data. The main page 1702 also includes a second panel 1704 named w2 that shows a dropdown menu for a user to select a data source. The selected data source is the data source that is queried by w1 to generate the bar graph.

A tool page along the right side of user interface 1700 includes a number of fields to edit settings of a selected panel, such as w1. Buttons 1701 can be selected to edit the data, axes, or miscellaneous settings of panel w1. Field 1712 allows for code to be written defining the source of the x-axis for panel w1. As a value, such as "w2" is typed into field 1712, a dropdown menu is displayed to provide an autocompleted list of variables, objects, and other properties related to w2 for selection. Widgets can be added to the main page using an add widget button 1706. Tool page 1708 includes a list of selectable elements. In the example of FIG. 17, the list includes w1 and w2.

The field 1712 can populate options in the autocompleted list by referencing the stored dependency information. For example, panel w1 may use, for its x axis, {{SelectedDisplayValues}} of panel w2. This can be stored as a dependency: panel w1 depends on panel w2, which depends on {{SelectedDisplay}}. Accordingly, in the autocomplete list, the option "w2.SelectedDisplayValues" can be determined to be an autocomplete option by looking through data stored in the dependency chain.

Figure 18:
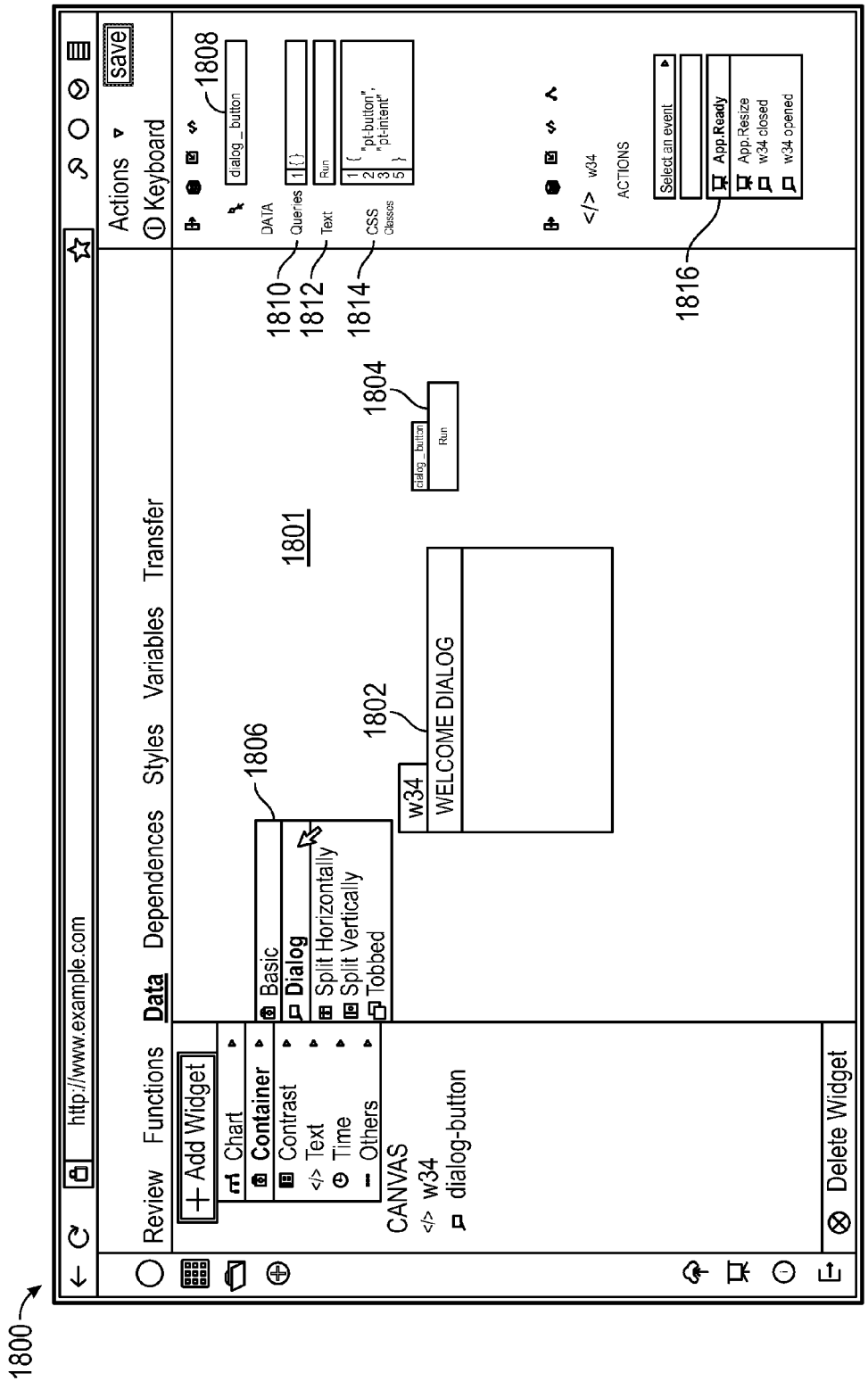
FIG. 18 illustrates one embodiment of a user interface comprising dynamic panels for displaying results of queries performed on one or more data sources with editing tools.

FIG. 18 illustrates one embodiment of a user interface comprising dynamic panels for displaying results of queries performed on one or more data sources with editing tools. The user interface 1800 shows a dashboard creation system with tools pages and a preview of a main page 1801. The main page 1801 includes a first panel 1802 named w34 and a second panel 1804 named dialog_button. The first panel 1802 is configured to display welcome text in a dialog box when the run button 1804 is pressed.

Widgets can be added to the main page 1801 by clicking the add widget button, which then causes a dropdown menu 1806 to display. Different categories of widgets are shown, and a panel type can be selected, dragged, and dropped into a location in the main page. Each widget placed on a main page 1801 can cause HTML, JavaScript, and query code to be coded in the document. Furthermore, tools provide for the entry of query code to be associated with the widget. Accordingly, widgets allow for user-friendly design of documents without needing technical HTML and JavaScript coding skills. In addition, the dashboard creation system provides editable fields to modify and code HTML, JavaScript, query, and other settings so that advanced users are not limited to a widget template.

A tool page along the right side of user interface 1800 includes a number of fields to edit settings of a selected panel, such as the dialog_button. A field 1808 allows the name of the panel to be edited. A query field 1810 allows a query to be written for the dialog button, and is currently shown as a blank set of braces. A text field 1812 causes any entered text to be displayed in the panel 1804. A CSS field 1814 allows a style to be defined for the panel 1804. The panel can refresh the representation of queried data when the text, style, or settings are modified.

An event menu 1816 for dialog panel w34 1802 provides for a selection of events to trigger the execution of one or more queries or other actions related to the dialog panel w34. In some embodiments, a function or query of dialog panel w34 will execute when triggered by the event selected in the event menu 1816. In some embodiments, the panel itself will not display, or will not display a visualization, until the event is triggered. Example events include when the user application is ready, when the user application is resized, when a panel is closed or opened, when a variable is set, when a script or function has started or completed, etc. In the example of FIG. 18, the welcome dialog is set to display when a user clicks the run button.

FIGS. 15 to 18 show additional functionality. Local data can be used where access to remote databases is not available. Local data also allows for data manipulation and experimentation in developing a document when data in the actual database may be in use by another program. For example, local medical data can be manipulated and experimented for designing a document for a hospital because experimenting with a hospital's live database could have undesirable consequences. Having multiple data sources gives document developers flexibility to experiment. The further help with experimenting and document design. Document development tools, such as autocomplete fields and panel displays of queried data, can be determined and shown quickly by partially refreshing elements dependent on changes instead of refreshing entire documents. Changes can also be quickly reflected across different pages by updating dependent elements. The dependencies can be determined by the stored dependency information.

Example Timing Tools

Figure 19:
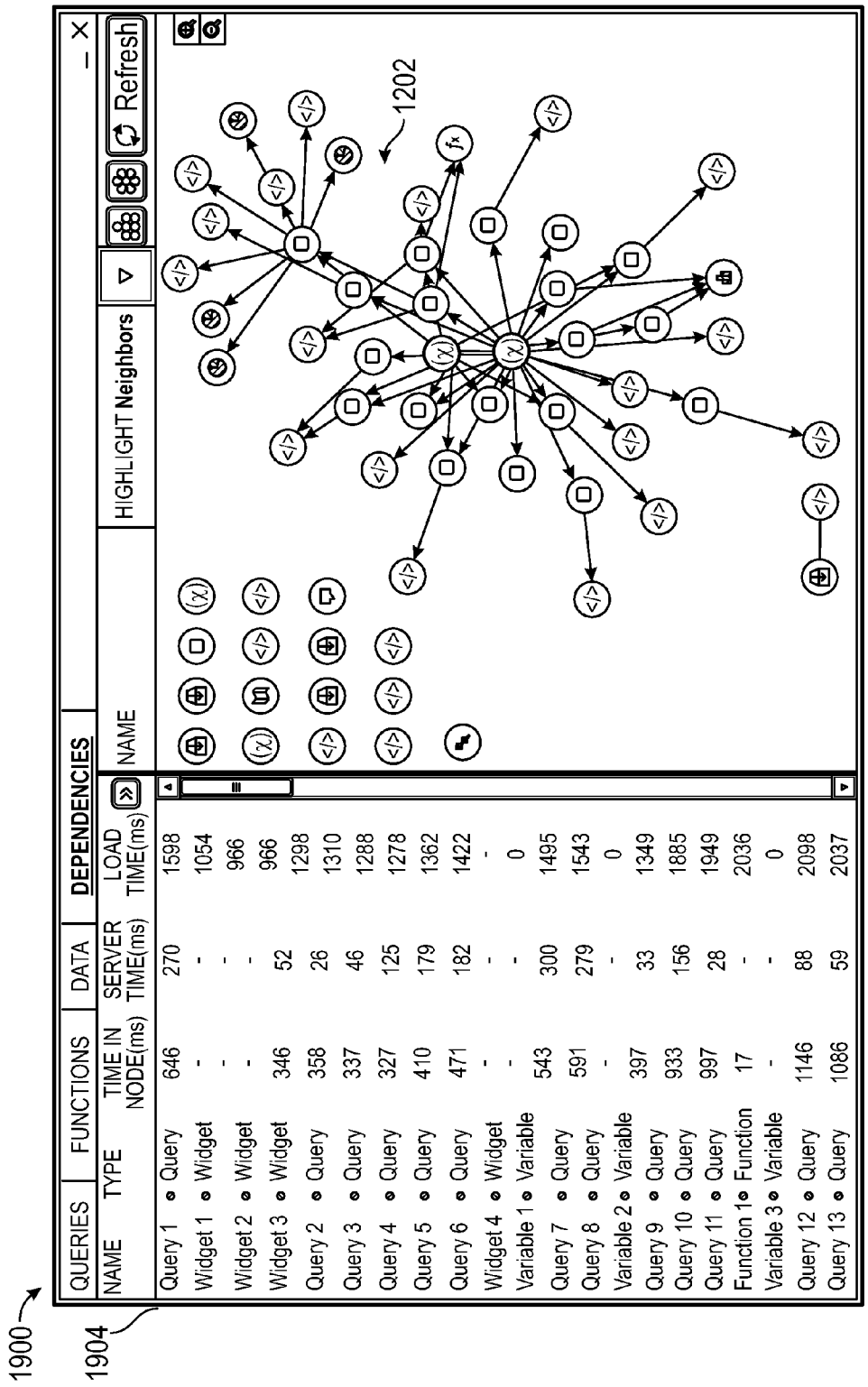
FIG. 19 illustrates one embodiment of a user interface comprising a visual indication of dependencies and a table of execution times.

FIG. 19 illustrates one embodiment of a user interface comprising a visual indication of dependencies and a table of execution times. The user interface shows a dependency page 1900 that shows visualization 1202 of dependencies of queries, functions, variables, and widgets similar to FIG. 12. A timing table 1904 is shown beside the visualization 1202. The timing table 1904 lists the names of the elements shown in the visualization and the type of each element. When a document is loaded, various execution times can be logged and then presented. The timing table lists the time in node for the elements, which includes the time that it took a particular element to load. For example, as shown in FIG. 19, Query 1 took 646 ms to execute. The timing table also lists the server time for a particular element. As part of the 646 ms that it took Query 1 to execute, 270 ms was taken by a server to respond with the data requested by Query 1. The timing table also lists the load time for a particular element. The load time is the total time taken after the document begins loading before an element is completed. For example, Query 1 might not immediately execute when a document is loaded because Query 1 might require other elements to load first due to dependencies. As a result, although Query 1 only took 646 ms to load, it took 1598 ms before Query 1 completed because Query 1 did not start executing during the first 952 ms.

Selecting an element in the timing table 1904 can cause the visualization 1202 to show or highlight the corresponding icon for the selected element, and, in some embodiments, also highlight any dependency chain branches associated with the corresponding icon. The timing table and dependency visualizations can be used in order to quickly identify the elements that take the longest to load and the elements with the longest dependency chains. The table and visualization make it easy to quickly identify the slowest elements.

FIG. 20 illustrates one embodiment of a user interface comprising a visual indication of dependencies and a table of execution times. The user interface shows a dependency page 2000 that shows visualization 2002. Dependency page 2000 shows variations on embodiments of several previously discussed user interfaces. Visualization 2002 shows the dependencies of queries, functions, variables, and widgets similar to visualization 1202 of FIG. 12, but the visualization 2002 is displayed in a hierarchical layout format instead of a web. The timing table 2004 is similar to timing table 1904 of FIG. 19, but the timing table 2004 is rearranged by element name. In some embodiments, the timing table can be arranged to list the elements by speed for any of the time in node, time in server, or load time.

Selecting an element in the timing table 1904 can cause the visualization 1202 to show or highlight the corresponding icon for the selected element, and, in some embodiments, also highlight the dependency chain associated with the corresponding icon. Developers can use the timing table and dependency visualizations in order to quickly identify the elements that take the longest time to load and the elements with the longest dependency chains. The table and visualization make it easy to quickly identify the slowest elements by the highest load time or highest time in node. This can enable certain sections of code be rewritten to remove dependencies or be restructure code so that elements in a document load faster. This can be done, for example, by starting certain slower elements sooner, restricting certain elements to execute in parallel, breaking certain elements into smaller elements, prioritizing the execution of elements from which a lot of other elements depend, etc. To speed up a document completion time, the element with the highest completion time can be coded to execute faster or start executing sooner.

Figure 21:
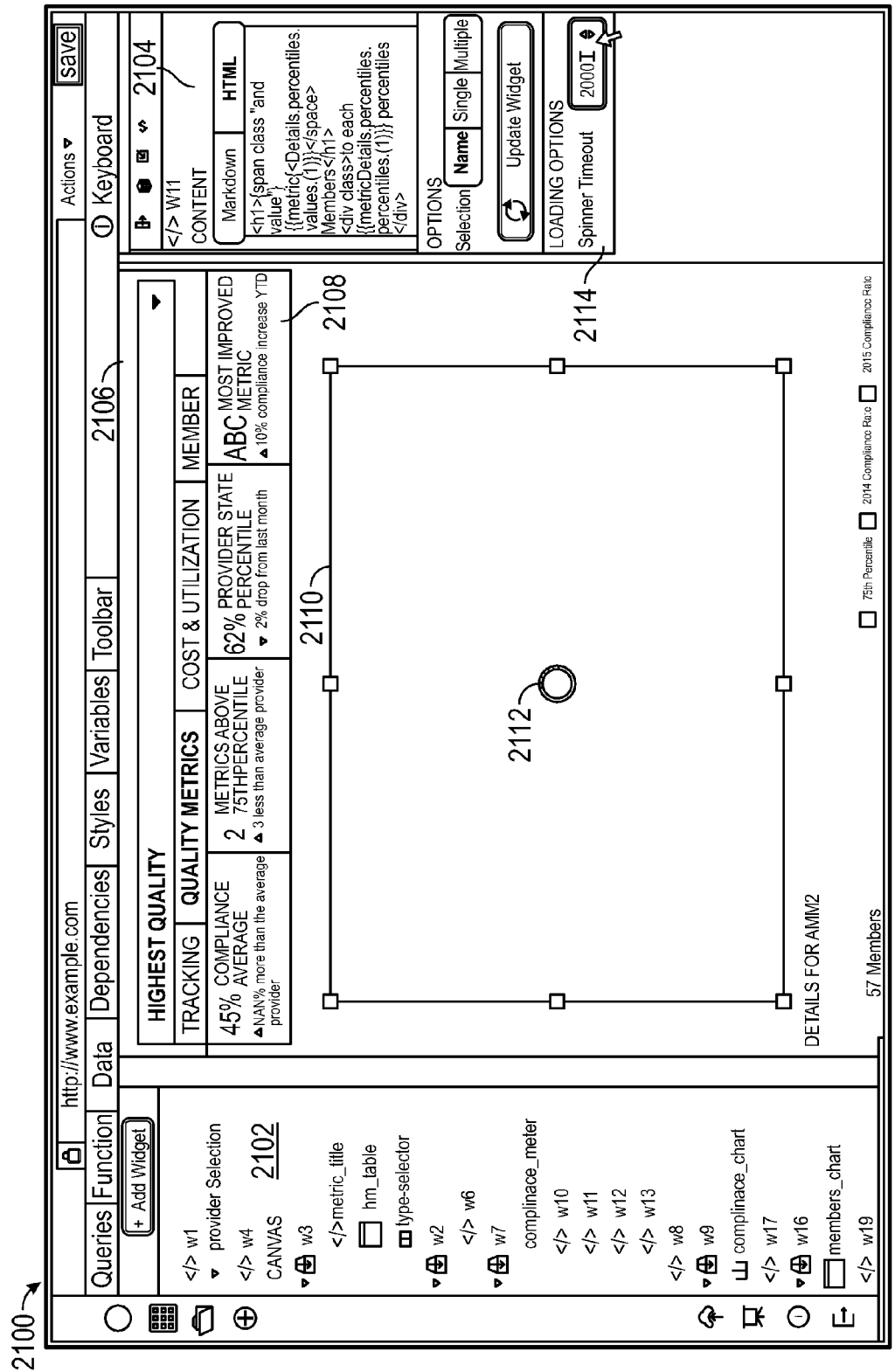
FIG. 21 illustrates one embodiment of a user interface comprising dynamic panels for displaying results of queries performed on one or more data sources with a placeholder visual.

FIG. 21 illustrates one embodiment of a user interface comprising dynamic panels for displaying results of queries performed on one or more data sources with a placeholder visual. User interface 2100 shows a dashboard creation system with tool pages 2102, 2104 and a main page 2106 that includes a plurality of panels such as panel 2108 and panel 2110.

The main page 2106 is being loaded as an end user would see it when trying to access the main page 2106 without tool pages. Some panels, such as 2108, acquire all dependent elements, execute queries, receive query data, and generate an output representation of the queried data. Other panels, such as panel 2110, may still be executing or waiting for dependent data. Because long dependency chains, complex queries, and times for retrieving information from databases can add up to incur significant delays, it can be helpful to indicate in the main page that an element is not finished loading by use of a loading graphic such as loading wheel 2112. Otherwise, without the loading graphic, a blank space might confuse a user into thinking that no panel is present when the panel is actually present but still loading. For the selected panel 2110, a toolbar 2104 shows editable settings such as HTML and Javascript code associated with the panel.

Another toolbar 2114 shows loading options associated with the panel, such as the time (in ms) that the panel can take to complete before a loading graphic appears. For brief amounts of time, no loading graphic might be necessary. In FIG. 21, 2000 ms is selected as the time before the loading graphic appears. In some embodiments, a panel has a default time before the loading graphic appears. In some embodiments, the time before the loading graphic appears can be determined by a computer system based, at least in part, on the timing data collected for a simulated or loaded document. For example, loading times can be set for panels based on the average load time, average time in node, average time in server, an percentage of the max load time, within a few standard deviations of the average load time, or other statistical measurement based on the timing data. In some embodiments, a spinner can be shown when a panel takes an abnormally long time to load. For example, if a panel with a spinner timeout of 2000 ms normally takes 50 ms to load, a spinner can nonetheless load if the panel (perhaps due to querying a database that happens to be busy at the moment) takes 2, 5, or 10 times longer to load. In these instances, the spinner might display at 100 ms, 250 ms, or 1000 ms despite the 2000 ms spinner timeout.

Figure 22:
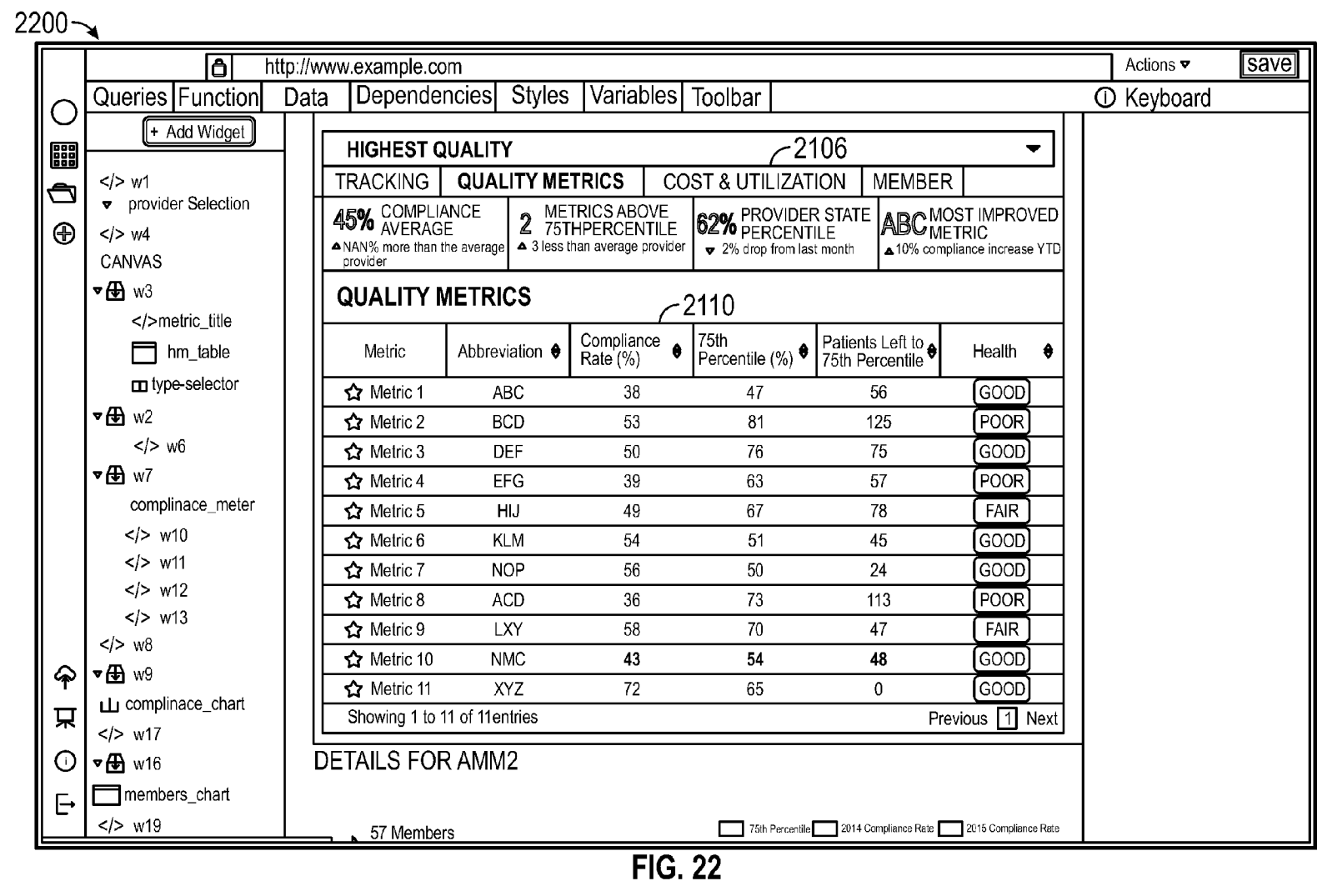

FIG. 22 illustrates one embodiment of a user interface comprising dynamic panels for displaying results of queries performed on one or more data sources. The user interface 2200 shows the same main page 2106 as in FIG. 21, except that in FIG. 22, the panel 2110 has finished loading. In FIG. 22, panel 2110 shows a representation of queried data instead of the loading graphic.

Figure 23:
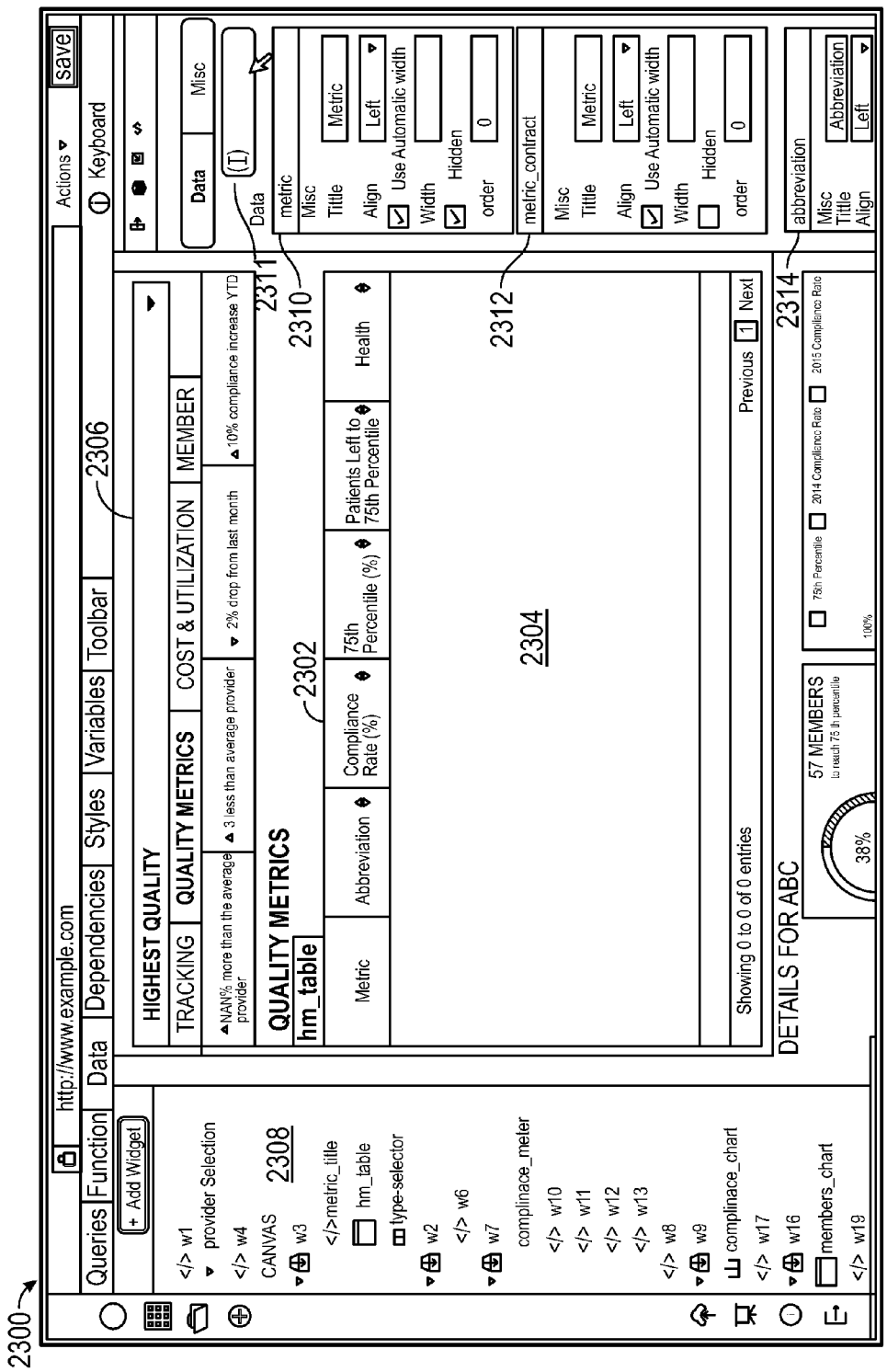
FIG. 23 illustrates one embodiment of a user interface comprising dynamic panels for displaying results of queries performed on one or more data sources while being edited.

FIG. 23 illustrates one embodiment of a user interface comprising dynamic panels for displaying results of queries performed on one or more data sources while being edited. The user interface 2300 shows a main page 2306 that includes panel 2302. Panel 2302 includes an area 2304 for displaying a representation of queried data, but area 2304 can be blank before the queried data is available to the panel 2302. Tool page 2308 includes a list of a number of selectable interface elements. Tool page 2310 includes display formatting options associated with a panel, such as a title, alignment, and width. Tool page 2311 provides a field for data for a selected panel. As data or a data source is entered, the panel associated with the data field will update to render the data. Downstream dependent elements of the panel can also update and refresh as data is entered. The downstream dependent elements can be determined with respect to the stored dependency information. Tool page 2312 includes display formatting options associated with a different panel. Tool page 2314 includes formatting options such as a title and alignment associated with yet another panel.

The timing tools can be used to determine the slowest loading elements. Elements can be selected in the timing tables and their corresponding dependency chains can be viewed, allowing long dependency chains to be identified and restructured. Long loading elements can be indicated to end users by loading graphics. The loading timeouts can be set, adjusted, or automatically populated based on the timing data, and the loading timeouts can be change based on normal and abnormal behaviors.

Example Diff Tools

Figure 24:
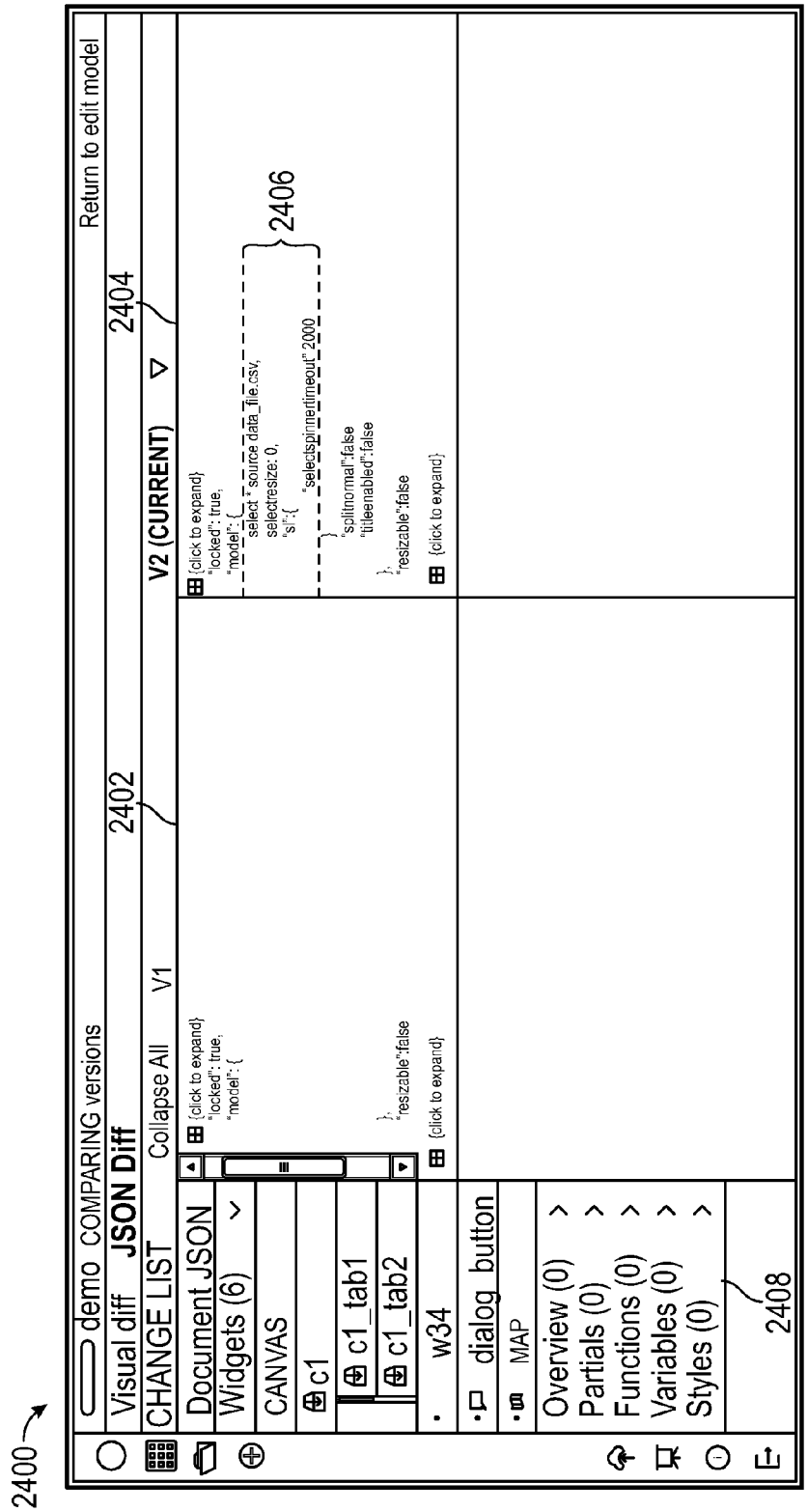
FIG. 24 illustrates one embodiment of a side-by-side difference comparison of query code.
Figure 25:
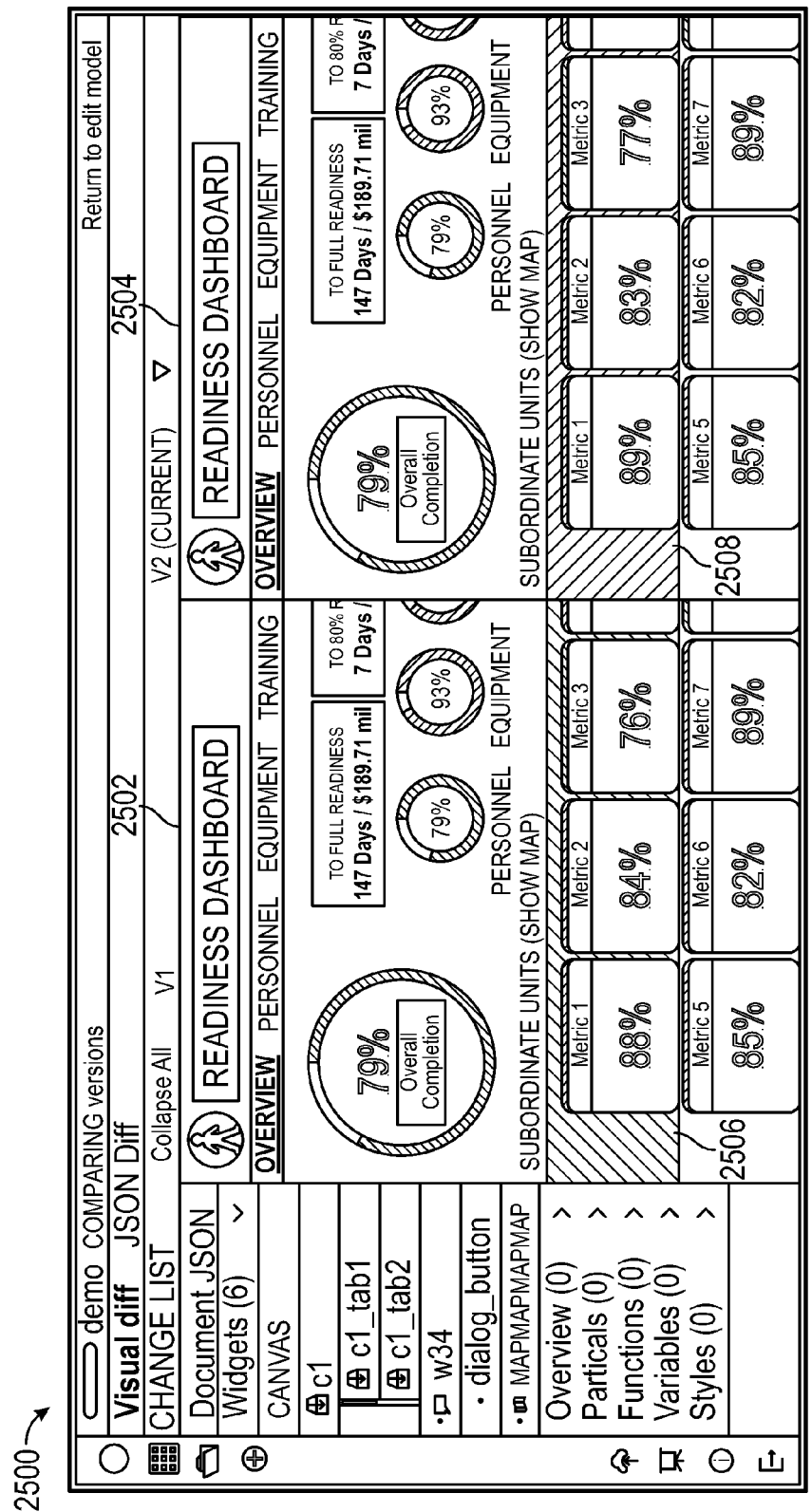
FIG. 25 illustrates one embodiment of a side-by-side difference comparison of a user interface comprising dynamic panels for displaying side-by-side results of different queries performed on one or more data sources.

FIG. 24 illustrates one embodiment of a side-by-side difference comparison of query code. The user interface 2400 shows a side-by-side comparison of two code sections 2402, 2404. The code sections can display query code, JSON code, function code, etc. Code section 2402 can show an original version of code, and code section 2404 can show an updated version of code. A diff script is run to show the differences in the code. The differences between the two version of code are visually indicated 2406. In response to the updated code, the dashboard creation system can also update and show comparisons of the panel outputs affected by the updates to the code. Each code section 2402, 2404 is associated with a version of code. As shown in the example of FIG. 24, code section 2402 is associated with a first version and code section 2404 is associated with a second, more recent version. Different version histories can be selected for comparison in a dropdown menu. The version can be tracked, and the changes in different versions can be approved or checked in. This can be done, for example, by integrating various software versioning or revision history functionality from tools such as Subversion, Revision Control System, Concurrent, Vault, Integrity, git, iManage, etc. A sidebar 2408 provides a number of viewing and organizational tools. At the top of sidebar 2408, an option is provided to view the code diff (shown as JSON diff in FIG. 24) or to view the visual diff (for example, as shown in FIG. 25). A change list can be expanded to display a list of changes for selection, which causes code sections 2402 and 2404 to jump to the line of code relating to the selected change. Widgets and document elements can also be selected to jump to lines of code relating to the widget or document element.

FIG. 25 illustrates one embodiment of a side-by-side difference comparison of a user interface comprising dynamic panels for displaying side-by-side results of different queries performed on one or more data sources. The user interface 2500 shows the WYSIWYG view of user interfaces before and after the code updates described in FIG. 24. Main page 2502 shows the WYSIWYG output based on code section 2402, and main page 2504 shows the WYSIWYG output based on updated code section 2404. Resulting differences in the output can be highlighted or visually indicated as shown by 2506, 2508. Updating the main page outputs can be performed by referencing the stored dependency information to determine dependencies and updating the elements dependent on code changes. Elements not affected by the code changes do not need to be refreshed.

The side-by-side comparisons shown in FIGS. 24 and 25 improve group collaboration when updating code. Sometimes, group members may make branched edits or changes to code. When the branches are being merged, it can be confusing to remember and determine the individual effects of each branched change. The side-by-side comparisons, by showing both the changes in code and then changes in the panel outputs, makes it easier to see the effect of code changes so that groups can determine how to merge in code changes. As highlighted changes are approved or rejected, the panel outputs can correspondingly update to reflect the approvals or rejections.

The diff tools allow for a comparison of different versions of code. Differences in document outputs that result from code differences are also similarly shown. This allows groups to work on different versions of code that can be easily coordinated and merged together. The preview of document changes can be quickly rendered by changing dependent elements instead of refreshing entire documents.

Example Methods

Figure 26:
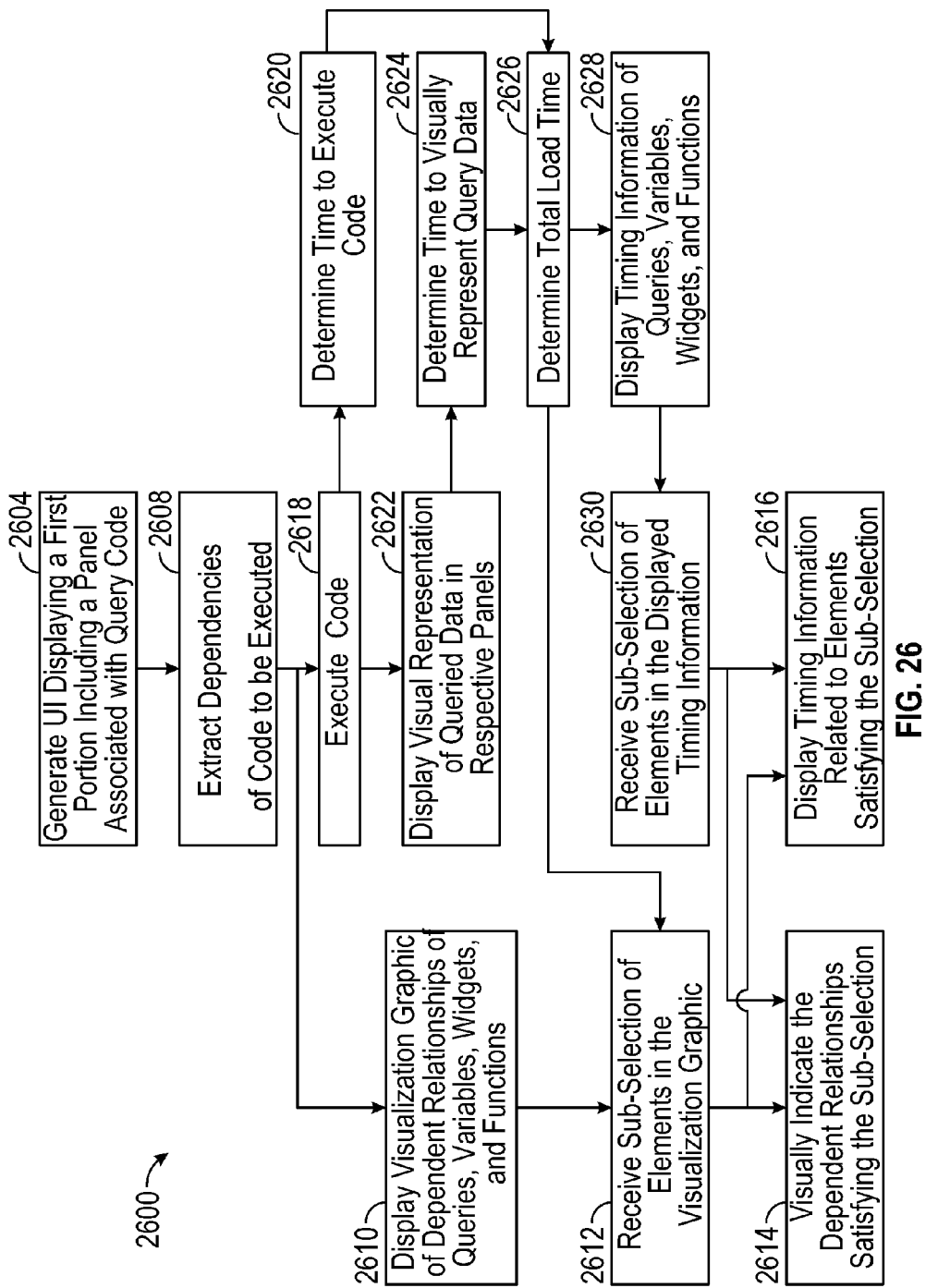
FIG. 26 illustrates a flowchart for creating and displaying a visualization of dependency information and timing data, according to certain embodiments.

FIG. 26 illustrates a flowchart 2600 for creating and displaying a visualization of dependency information and timing data, according to certain embodiments.

At block 2604, a user interface is generated. The user interface displays a first portion that includes a panel associated with query code.

At block 2608, dependencies of code to be executed are extracted. The dependencies can be stored as a hashtable of hashsets. Using the stored dependency information, the dependencies can be determined for queries, variables, widgets, and functions. In some embodiments, for each node (the key node) in the hashtable of hashsets, there are a hash set of nodes that depend on the key node.

At block 2610, a visualization graphic of dependent relationships of queries, variables, widgets, and functions can be displayed. For example, FIGS. 12, 13, 14, 19, and 20 show example visualization graphics.

At block 2612, a sub-selection of elements in the visualization graphic can be received. In some embodiments, icons or arrows in a graphic can be selected by a user. In some embodiments, a sub-selection can be made by selecting a category of elements in the visualization graphic such as neighbors, upstream dependencies, and downstream dependencies.

At block 2614, dependent relationships satisfying the sub-selection made in block 2612 can be visually shown in the visualization graphic. This can be done, for example, by highlighting those relationships that satisfy the sub-selection, or by showing only those relationships.

At block 2616, timing information related to the elements satisfying the sub-selection made in block 2612 can be displayed. In some embodiments where a table of timing elements is presented, the timing information of the elements satisfying the sub-selection made in block 2612 can be highlighted. In some embodiments, the timing information shown in block 2616 is determined, in part, during blocks 2618 to 2626.

At block 2618, code can be executed. In some embodiments, dependent queries, functions, or code can be executed and dependent variables can be defined. In some embodiments, the entire document can be executed instead of just dependent elements.

At block 2620, the execution time of the code can be determined. This measurement is the time in node. The execution time of queries, functions, variable definitions, time in server, and other events depending from the executed code can also be determined. During block 2620, for any action related to a server, the time used by the server can be determined.

At block 2622, a visual representation of queried data in is displayed in respective panels. In some embodiments, this is refreshed for the dependent panels while panels independent of the executed code can but do not need to be refreshed.

At block 2624, the time that it took to visually represent the query data is determined. In some embodiments, this can be the execution time of block 2622.

At block 2626, a total load time is determined for the executed code. In some embodiments, this can be measured from the start of document execution until the code finishes executing. In some embodiments where a first element depends on a second element, the load time for the first element can be calculated by adding the first element's time in node to the load time of the second element's load time. In some embodiments, the load time can be determined for elements depending from the first element as well.

At block 2628, the timing information of queries, variables, widgets, and functions can be displayed. Blocks 2620, 2624, and 2626 can provide information displayed as part of block 2628. The timing information can be used in blocks 2616 and 2628.

At block 2628, the timing information of queries, variables, widgets, and functions can be displayed. For example, the timing information can be displayed in the form of a table as shown in FIG. 19 and FIG. 20.

At block 2630, a sub-selection of elements in the displayed timing information can be received. For example, one or more elements can be selected in a timing table along with a selection of all upstream elements.

At block 2616, timing information can be displayed for the sub-selection made in 2630. In some embodiments, the timing information, if already displayed, can be highlighted.

At block 2614, the visualization graphic can show or highlight the elements satisfying the sub-selection of block 2630.

Figure 27:
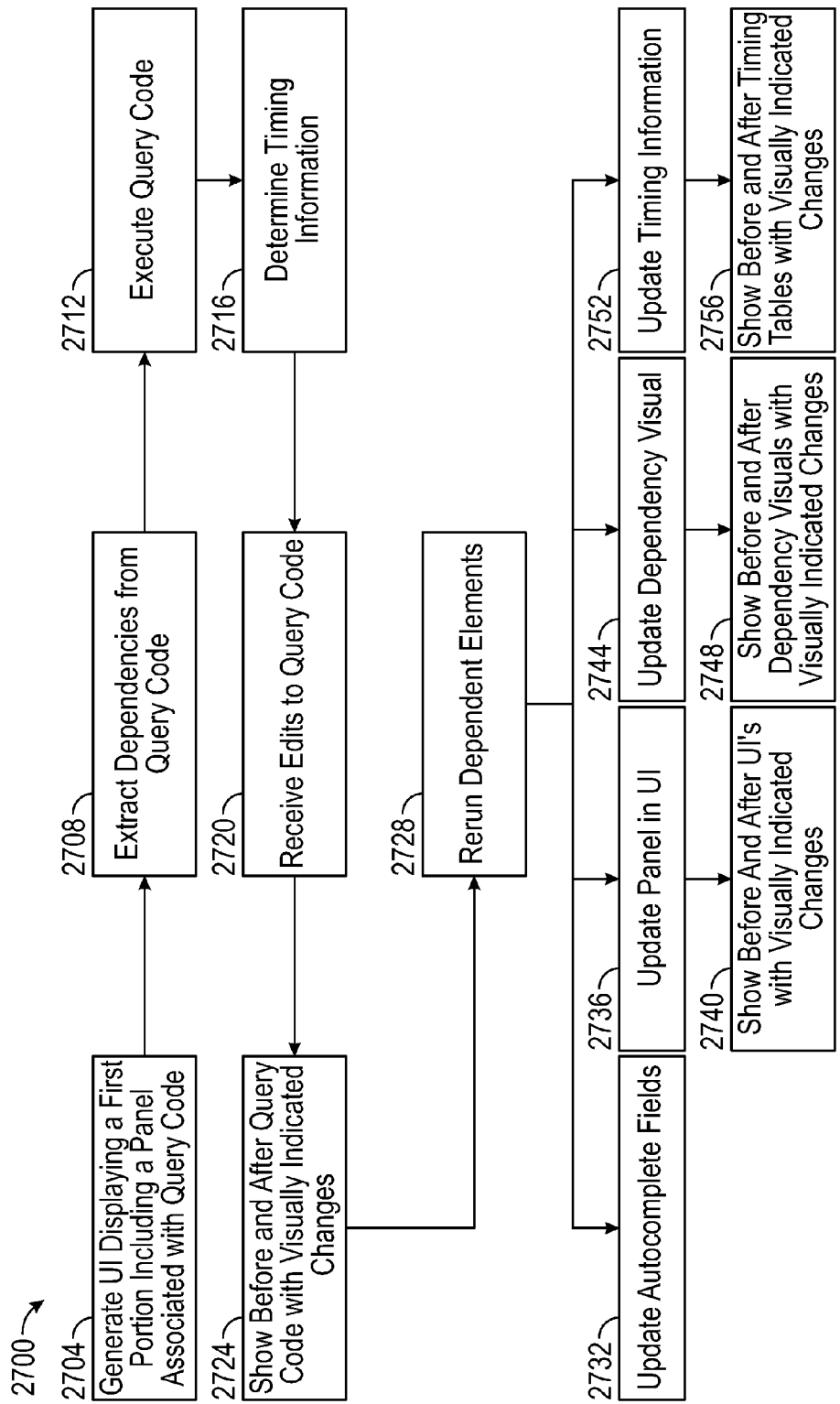
FIG. 27 illustrates a flowchart for creating, updating, and displaying dynamic panels in a user interface, according to certain embodiments.

FIG. 27 illustrates a flowchart 2700 for creating, updating, and displaying dynamic panels in a user interface, according to certain embodiments. Although the example in FIG. 27 relates to query code, it should be understood that the techniques and concepts can apply to any coded element including functions, variables, and panels.

At block 2704, a user interface is generated. The user interface displays a first portion including a panel associated with query code.

At block 2708, dependencies are extracted from the query code, for example, as described with respect to FIG. 12.

At block 2712, the query code is executed. Code dependent on the query code can also be executed.

At block, 2716, timing information relating to the executed code is determined. This can include a time in node, a server time, and a load time.

At block 2720, edits to the query code are received.

At block 2724, code is shown with visually indicated changes to show the query code before and after the edits in block 2720. This can be done, for example, using redline changes, proofreading marks, or as a side-by-side comparison.

At block 2728, the dependent elements can be rerun or executed.

At block 2732, autocomplete fields can be updated. As an example, field 1712 of FIG. 12 can be updated to reflect new elements and their settings. Options in the autocomplete field can be determined based on dependencies and with reference to the stored dependency information.

At block 2736, the panel in the user interface can be updated. The panel's representation of queried data can change after executing the updated query code. In some embodiments, panels dependent on the edits to the query code are updated while panels independent of the query code do not need to be refreshed.

At block 2740, a comparison is shown of user interfaces before and after the panel updates. Changes in panel representations of query data are visually indicated, such as by highlighting.

At block 2744, the dependency visual is updated. The dependency visual can be, for example, the visual indication of dependencies shown in FIGS. 12, 13, 14, 19, and 20.

At block 2748, a comparison is shown of dependency visuals before and after the dependency visual update. Changes in the dependency visuals are visually indicated, such as by highlighting.

At block 2752, timing information can be updated. The timing information can be, for example, timing information shown in FIGS. 19 and 20.

At block 2756, a comparison is shown of timing information before and after the updated timing information. Changes can be visually indicated, such as by highlighting.

Figure 28:
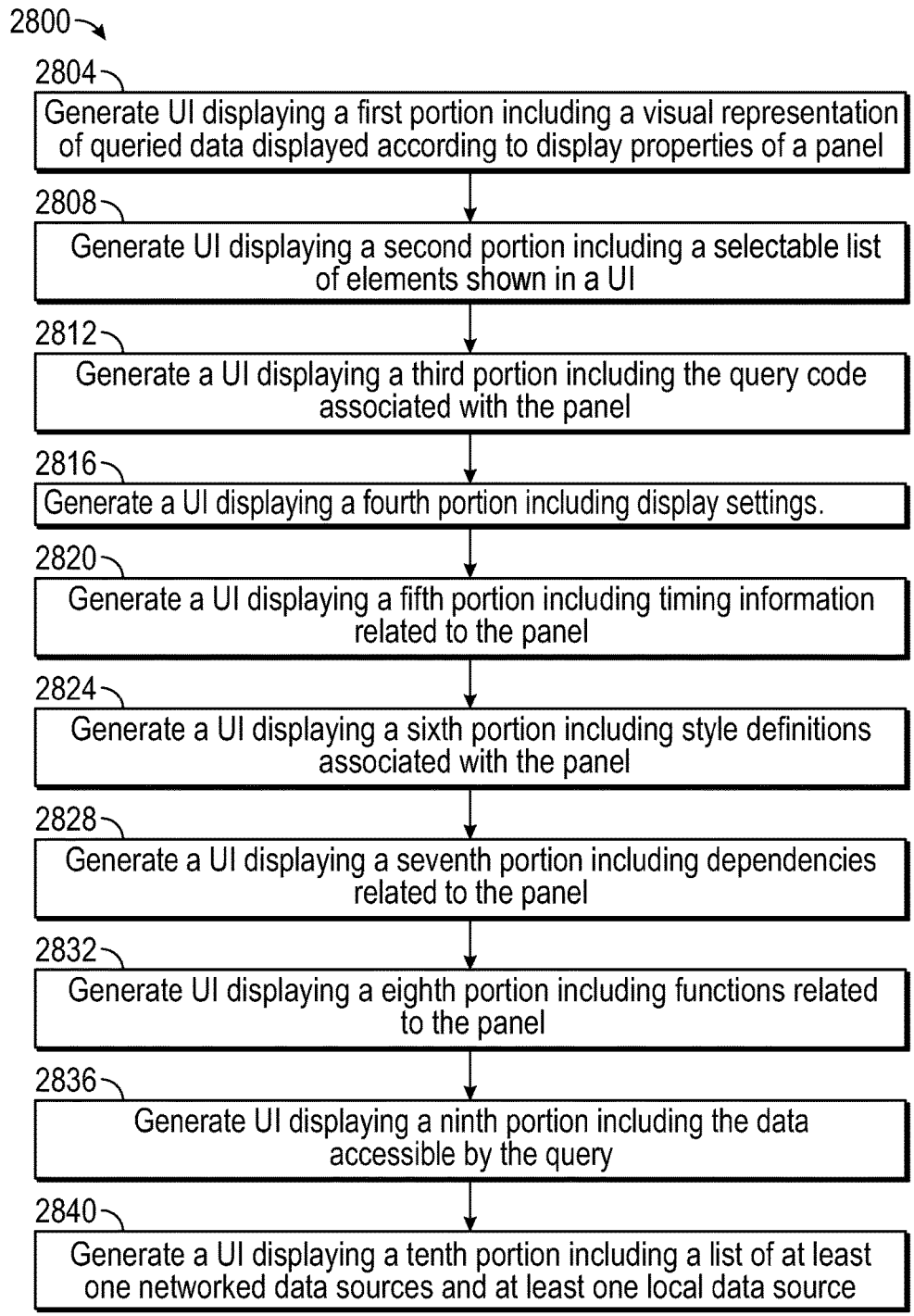
FIG. 28 illustrates a flowchart for creating, updating, and displaying dynamic panels in a user interface, according to certain embodiments.

FIG. 28 illustrates a flowchart 2800 for creating, updating, and displaying dynamic panels in a user interface, according to certain embodiments.

At block 2804, a first user interface is generated. The first user interface displays a first portion including a visual representation of queried data displayed according to display settings of a panel. For example, FIGS. 1, 2, 3, 7, 9, 10, 17, 18, 21, 22, 23, and 25 show user interfaces with portions including visual representations of queried data displayed according to display settings of a panel.

At block 2808, a second user interface is generated. The user interface displays a second portion including a selectable list of elements shown in the first user interface. For example, FIG. 10 shows a second user interface with a selectable list of elements of the user interface in FIG. 9. As another example, FIG. 2 also shows a second user interface with a selectable list of elements of another user interface. As another example, FIG. 22 also shows a second user interface with a selectable list of elements of another user interface. The selectable elements shown in a user interface in can include, for example, queries, widgets, text blocks, HTML structures, etc.

At block 2812, a third user interface is generated. The third user interface displays a third portion including the query code associated with the panel. For example, FIGS. 2, 10, 11, and 24 show query code associated with a panel.

At block 2816, a fourth user interface is generated. The fourth user interface displays a fourth portion including display settings of a panel. The properties can affect how a panel displays queried data. For example, FIGS. 2, 10, 17, 18, 21, and 23 show interfaces including display settings of a panel.

At block 2820, a fifth user interface is generated. The fifth user interface displays a fifth portion including timing information relating to the panel. For example, FIGS. 10, 19, and 20 show timing information related to a panel.

At block 2824, a sixth user interface is generated. The sixth user interface displays a sixth portion including style definitions associated with a panel. The style definitions can include, for example, CSS or custom style definitions. For example, FIGS. 2, 10, and 18 show interfaces including style definitions associated with a panel.

At block 2828, a seventh user interface is generated. The seventh user interface displays a seventh portion including dependencies related to the panel. For example, FIGS. 10, 12, 13, 14, 19, and 20 include portions showing dependencies.

At block 2832, an eighth user interface is generated. The eighth user interface displays an eighth portion including functions related to the panel. For example, FIGS. 10 and 11 show portions including functions.

At block 2836, a ninth user interface is generated. The ninth user interface displays a ninth portion including data accessible by the query associated with the panel. For example, FIGS. 10 and 16 show portions including data accessible by a query.

At block 2840, a tenth user interface is generated. The tenth user interface displays a tenth portion including a list of at least one networked data sources and at least one local data source. For example, FIGS. 10 and 16 show portions listing data sources.

Figure 29:
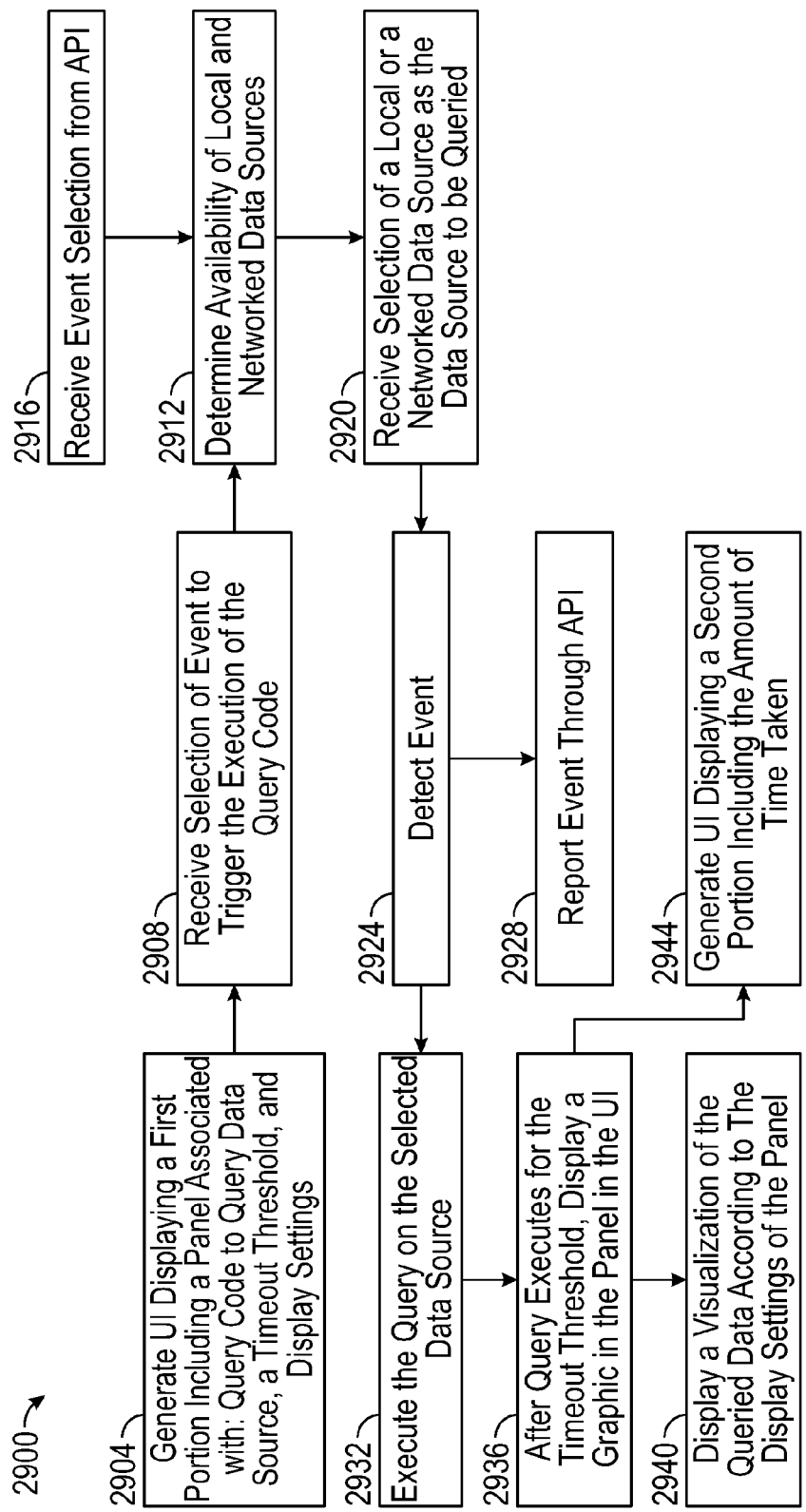
FIG. 29 illustrates a flowchart for creating, triggering, and displaying dynamic panels in a user interface, according to certain embodiments.

FIG. 29 illustrates a flowchart 2900 for creating, triggering, and displaying dynamic panels in a user interface, according to certain embodiments.

At block 2904, a user interface is generated. The user interface can display a first portion that includes a panel. The panel can be associated with query code to query data from a data source such as a database or a local data file. The panel can also be associated with a timeout threshold and display settings.

At block 2908, a selection of an event to trigger the execution of the query code is received. In some embodiments, an event selection can be received through an API in block 2916. The API can be part of a back end Javascript code used for document object model manipulation.

At block 2912, the availability of local and networked data sources is determined. Checking the availability of data sources can include providing authentication credentials to access the data sources. When remote databases might not be accessible, for example due to lack of internet access, due to lack of authentication or privileges, or from being in use, then local data can be provided and used.

At block 2920, a selection of a local or networked data source to be queried is received. This can be a selection, for example, by toggling a button. Alternatively, the selection can be made by changing the names of one or more databases to be queried or by selecting the data source from a list or menu.

At block 2924, an event can be detected. At block 2928, the event can be reported through the API. The event can be the type of event selected in block 2908. By receiving and reporting events through the API, back end document object model manipulation functionality can be brought to the front end. This helps to reduce the technical abilities (e.g., JavaScript coding) required of designers.

At block 2932, the query can execute on the selected data source.

At block 2936, after the query executes for a timeout threshold, a panel in the user interface can display a graphic. The graphic can indicate that the panel is busy executing, but the panel has not completed yet.

At block 2940, a visualization of the queried data can be displayed according to display settings of the panel. When the panel has obtained the data and generated a representation of the data, then the visualization can replace the graphic indicating that the panel is busy.

At block 2944, a user interface can be generated. The user interface can display a second portion including an amount of time taken. The amount of time can be the time to execute the query, the time used by a data source in response to the query, or a load time.

Additional Implementation Details and Embodiments

Accordingly, various embodiments can provide panels coded to query a database and display the queried data according to one or more display settings. The panels can be used to create online documents without needing the same depth of technical skill, and edits to the panels through tool pages cause corresponding document code to change. Documents can be created to load faster by using timing tables and dependency visualizations to identify the slowest loading elements and elements with the longest dependency chains. Then, the document can be restructured to load faster. Elements taking a long time to load can be indicated by a loading graphic that can have a timeout set by a user, by default, or based on timing information. When code or settings are changed, a preview of panel outputs of display representations of queried data can quickly change in response by executing code dependent on changes without needing to refresh entire pages. Document versions can be controlled for and diffs can be run to see differences at the code level and at the document output level.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer system comprising:
one or more hardware computer processors configured to execute code in order to cause the system to:
generate user interface data configured to be rendered as a user interface, the user interface simultaneously including at least a first display portion and a second display portion, wherein:
the first display portion includes a plurality of panels comprising a first panel configured to generate a visual representation of data displayed in the first panel according to display settings for the first panel,
the data is retrievable from a database according to a query associated the first panel,
the first panel is associated with code configured to use the data to assign a value to a variable of the first panel, and
the variable of the first panel is configured for use in a query associated with a second panel of the plurality of panels, and
receive a first user input assigning the value to the variable of the first panel;
in response to receiving the first user input, generate a visual representation of second data displayed in the second panel by executing the query of the second panel using the value of the variable of the first panel to retrieve the second data from the database;
based at least in part on the query of the second panel using the variable of the first panel, determine that the second panel has a downstream dependency on the first panel;
display, in the second display portion, a graphical visualization of relationships among the plurality of panels, the graphical visualization including nodes and edges, at least some of the nodes representing respective ones of the plurality of panels, at least some of the edges representing dependency relationships among respective pairs of the plurality of panels;
receive a second user input selecting the first panel in the first display portion; and
in response to receiving the second user input, visually indicate, in the second display portion, a node associated with the first panel;
receive a selection of a filter criteria indicating downstream or neighboring dependencies, wherein the second display portion is further configured to, in response to the selection of the filter criteria:
display, in the graphical visualization, nodes satisfying the filter criteria; and
filter out from the graphical visualization a node that does not satisfy the filter criteria;
receive an edit to the query of the first panel;
execute the edited query of the first panel;
identify panels that have downstream dependencies on the first panel, wherein the panels that have downstream dependencies on the first panel include the second panel;
execute queries of the panels that have the downstream dependencies on the first panel; and
display the second display portion simultaneously with a third display portion, the third display portion including:
a comparison of first timing information associated with executing the query of the first panel before receiving the edit and updated first timing information associated with executing the edited query of the first panel; and
a comparison of second timing information associated with executing the query of the second panel before receiving the edit and updated second timing information associated with executing the query of the second panel after receiving the edit.

2. The computer system of claim 1, wherein the user interface further comprises:
a third portion including a list of queries and the coding of a query in the list of queries;
a fourth portion including a list of variables and values of variables in the list of variables; and
a fifth portion including a list of functions and the coding of a function in the list of functions.

3. The computer system of claim 1, wherein the graphical visualization further includes indications of relationships among the plurality of panels, queries, variables, and functions.

4. The computer system of claim 3, wherein nodes are represented as icons that are color coded with different colors for queries, variables, functions, and panels.

5. The computer system of claim 1, wherein the filter criteria is selected from a menu indicating for selection at least: upstream dependencies;
downstream dependencies; and
neighboring dependencies.

6. The computer system of claim 1, wherein the one or more hardware computer processors are further configured to execute the code in order to cause the system to:
in response to a selection of the node in the second display portion, the node being associated with the first panel, visually indicate the first panel in the first display portion.

7. The computer system of claim 1, wherein the graphical visualization comprises a force directed graph.

8. The computer system of claim 1, wherein the relationships among the plurality of panels are stored as information, and, in response to receiving the edit to the first panel, the information is referenced to identify the panels that have downstream dependencies on the first panel.

9. The computer system of claim 1, wherein the one or more hardware computer processors are configured to execute code in order to cause the system to, in response to receiving the edit to the first panel, update the graphical visualization included in the second display portion to modify at least one edge connected to the node associated with the first panel.

10. The computer system of claim 1, wherein the first timing information comprises:
a first execution time indicating an amount of time until the query associated the first panel is executed;
a second retrieval time indicating an amount of time until the data from the database is retrieved; and
a third variable time indicating an amount of time until the variable is assigned the value.

11. The computer system of claim 1, wherein the selection of the filter criteria indicates downstream dependencies, and wherein the nodes satisfying the filter criteria is a chain of nodes including a second node separated from the node associated with the first panel by a minimum of two edges.

12. The computer system of claim 1, wherein the second display portion is further configured to, in response to the selection of the filter criteria, filter out from the visual representation a node that does not satisfy the filter criteria by removing the visual representation of the node that does not satisfy the filter criteria from the second display portion.

13. The computer system of claim 1, wherein the one or more hardware computer processors are further configured to execute the code in order to cause the system to:
   update the first timing information based on executing the query of the first panel after receiving the edit;
   update the second timing information based on executing the queries of the panels that have downstream dependencies on the first panel;
   display a comparison of the first timing information before and after updating the first timing information; and
   display a comparison of the second timing information before and after updating the second timing information.

14. The computer system of claim 13, wherein the one or more hardware computer processors are further configured to execute the code in order to cause the system to:
   in response to executing the edited query of the first panel, update the visual representation of data displayed in the first panel according to display settings for the first panel; and
   in response to executing the queries of the panels that have downstream dependencies on the first panel, update visual representations of the panels that have the downstream dependencies on the first panel; and
   display a comparison of the first display portion before and after updating the visual representation of data displayed in the first panel and updating the visual representation of the panels that have downstream dependencies on the first panel.

15. The computer system of claim 14, wherein the one or more hardware computer processors are further configured to execute the code in order to cause the system to:
   display a comparison of the query of the first panel before and after receiving the edit.

16. The computer system of claim 15, wherein the one or more hardware computer processors are further configured to execute the code in order to cause the system to:
   update, in the second display portion, the graphical visualization of relationships among the plurality of panels after receiving the edit; and
   display a comparison of the graphical visualization of relationships among the plurality of panels before and after receiving the edit.

* * * * *